United States Patent (10) Patent No.: US 9,676,419 B2
Furusaki et al. (45) Date of Patent: Jun. 13, 2017

(54) VEHICLE BODY BOTTOM STRUCTURE

(71) Applicant: HONDA MOTOR CO., LTD., Minato-Ku, Tokyo (JP)

(72) Inventors: Yuya Furusaki, Wako (JP); Ken Yasui, Wako (JP); Masaaki Yamane, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/093,072

(22) Filed: Apr. 7, 2016

(65) Prior Publication Data

US 2016/0221609 A1 Aug. 4, 2016

Related U.S. Application Data

(62) Division of application No. 14/376,171, filed as application No. PCT/JP2013/052219 on Jan. 31, 2013, now Pat. No. 9,381,952.

(30) Foreign Application Priority Data

Feb. 13, 2012 (JP) .................................. 2012-027951
Feb. 15, 2012 (JP) .................................. 2012-030110
(Continued)

(51) Int. Cl.
*B61D 25/00* (2006.01)
*B62D 21/15* (2006.01)
(Continued)

(52) U.S. Cl.
CPC ......... *B62D 21/152* (2013.01); *B62D 21/155* (2013.01); *B62D 25/025* (2013.01);
(Continued)

(58) Field of Classification Search
CPC .. B62D 21/155; B62D 21/152; B62D 25/025; B62D 25/082; B62D 25/14; B62D 25/145; B62D 25/30; B62D 25/18; B62D 25/36
(Continued)

(56) References Cited

U.S. PATENT DOCUMENTS 6,193,306 B1 2/2001 Lee
6,905,165 B2 6/2005 Kawabe et al.
(Continued)

FOREIGN PATENT DOCUMENTS

JP S62181976 A 8/1987
JP 5-92063 U 12/1993
(Continued)

OTHER PUBLICATIONS

Extended European Search Report dated Nov. 21, 2016 for European Application No. 16 173 281.3.

*Primary Examiner* — Joseph D Pape
(74) *Attorney, Agent, or Firm* — Carrier Blackman & Associates, P.C.; Joseph P. Carrier; William D. Blackman

(57) ABSTRACT

A vehicle body bottom structure includes left and right side sills which are provided to extend in a vehicle front-rear direction along outside end portions of a vehicle body in a vehicle width direction, a dash cross member which is coupled to front ends of the left and right side sills, and extends in the vehicle width direction, an outrigger which is connected to a rear end of a front side frame, and coupled to each of the front ends of the left and right side sills, to extend in the vehicle width direction, and a dash lower having a wheel housing portion is clamped to be joined between the dash cross member and the outrigger.

7 Claims, 33 Drawing Sheets

(30) Foreign Application Priority Data

Feb. 17, 2012 (JP) .................................. 2012-032878
Feb. 17, 2012 (JP) .................................. 2012-033222

(51) Int. Cl.
*B62D 25/02* (2006.01)
*B62D 25/08* (2006.01)
*B62D 25/14* (2006.01)
*B62D 25/20* (2006.01)
*B62D 25/16* (2006.01)

(52) U.S. Cl.
CPC ........... *B62D 25/082* (2013.01); *B62D 25/14* (2013.01); *B62D 25/145* (2013.01); *B62D 25/16* (2013.01); *B62D 25/20* (2013.01); *B62D 25/2018* (2013.01); *B62D 25/2036* (2013.01)

(58) Field of Classification Search
USPC ............ 296/193.07, 187.08, 187.09, 193.02, 296/203.02, 193.09, 198, 204
See application file for complete search history.

(56) References Cited

U.S. PATENT DOCUMENTS

| | | |
|---|---|---|
| 8,388,048 B2 | 3/2013 | Usuda |
| 2004/0113462 A1 | 6/2004 | Winter et al. |
| 2005/0140179 A1* | 6/2005 | Morsch ............... B62D 25/2018 296/204 |
| 2008/0084092 A1 | 4/2008 | Yokoi et al. |
| 2008/0111397 A1* | 5/2008 | Yamada ................. B62D 25/14 296/193.09 |
| 2010/0026051 A1 | 2/2010 | Tamakoshi |
| 2011/0133518 A1* | 6/2011 | Wanke ............... B62D 25/2018 296/203.02 |

FOREIGN PATENT DOCUMENTS

| | | |
|---|---|---|
| JP | H07187019 A | 7/1995 |
| JP | H07-246950 A | 9/1995 |
| JP | H10316042 A | 12/1998 |
| JP | 2001-158381 A | 6/2001 |
| JP | 2003154968 A | 5/2003 |
| JP | 2003-237636 A | 8/2003 |
| JP | 2005193843 A | 7/2005 |
| JP | 2008-137419 A | 6/2008 |
| JP | 2009173110 A | 8/2009 |
| JP | 2009286181 A | 12/2009 |
| JP | 4438416 B2 | 3/2010 |
| JP | 2010-105538 A | 5/2010 |
| JP | 2010173479 A | 8/2010 |
| JP | 2011084154 A | 4/2011 |
| JP | 2011235688 A | 11/2011 |
| JP | 2011255816 A | 12/2011 |
| JP | 2012011956 A | 1/2012 |

* cited by examiner

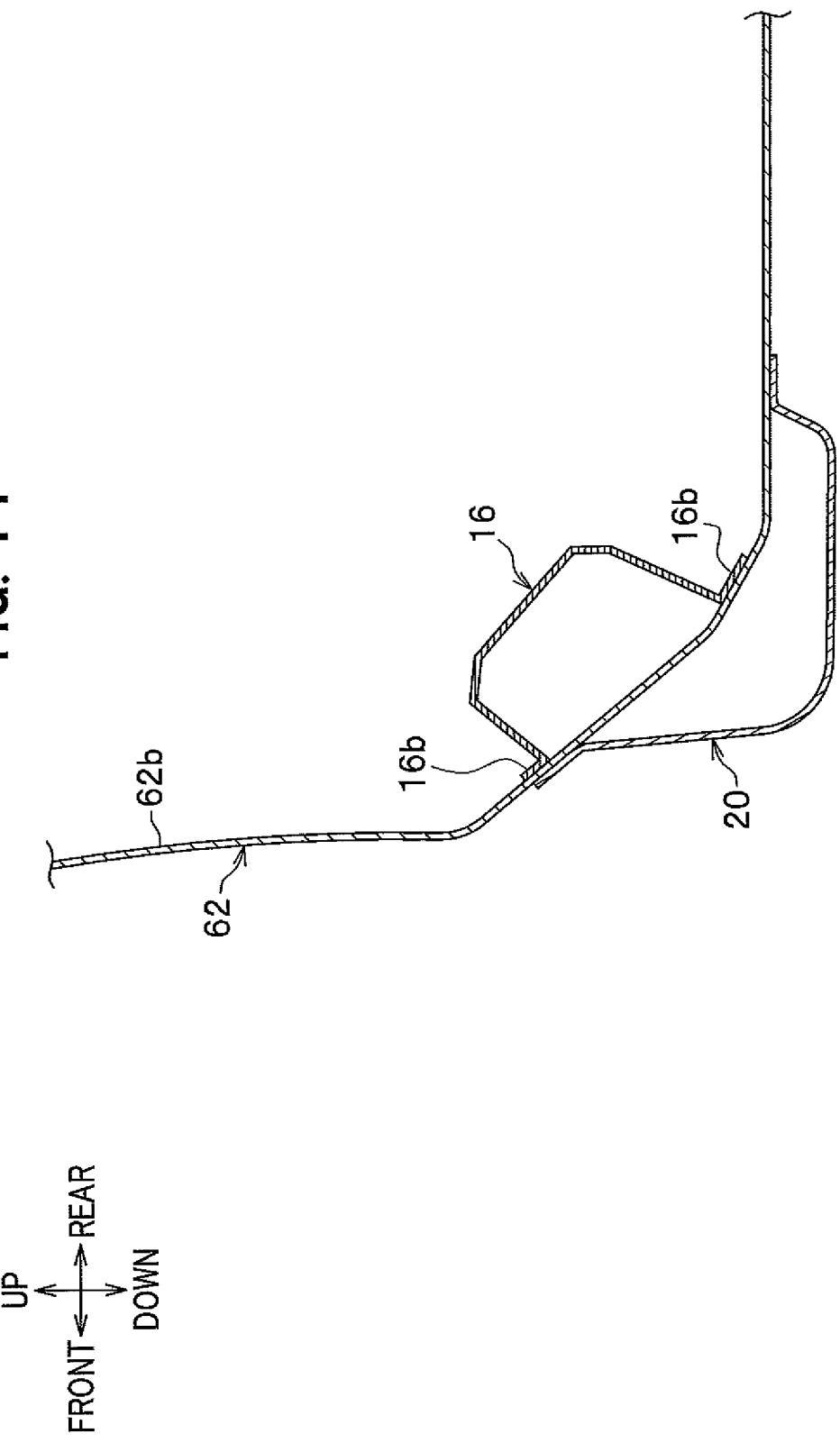

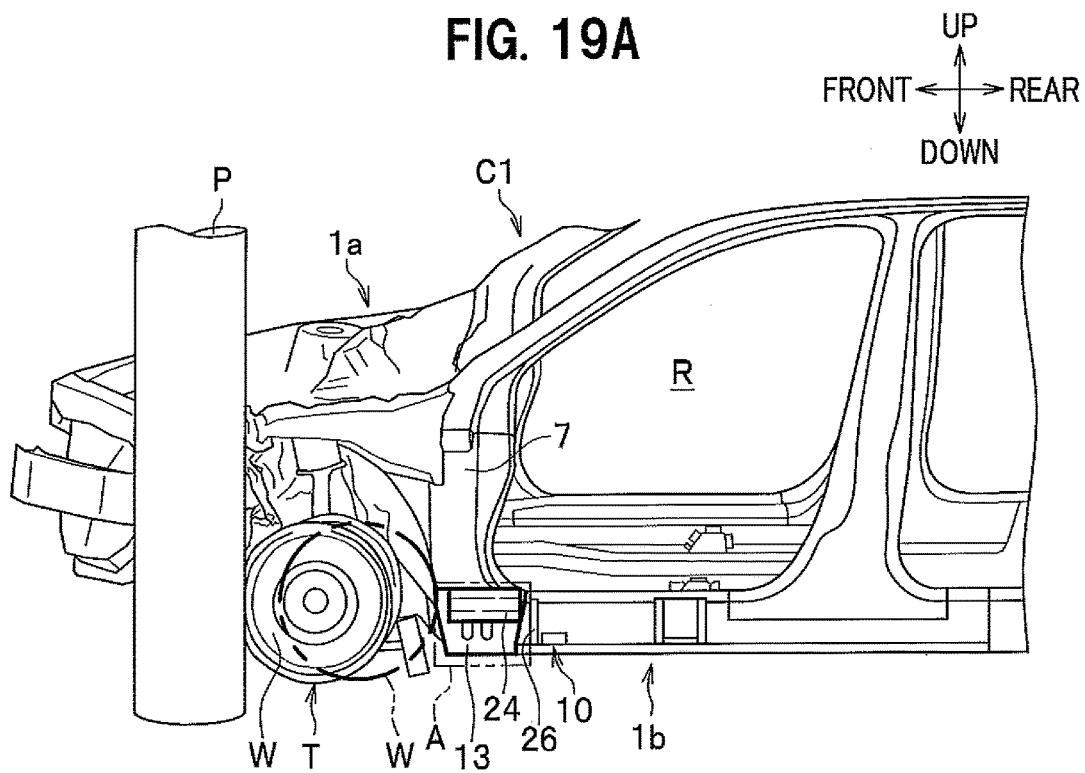
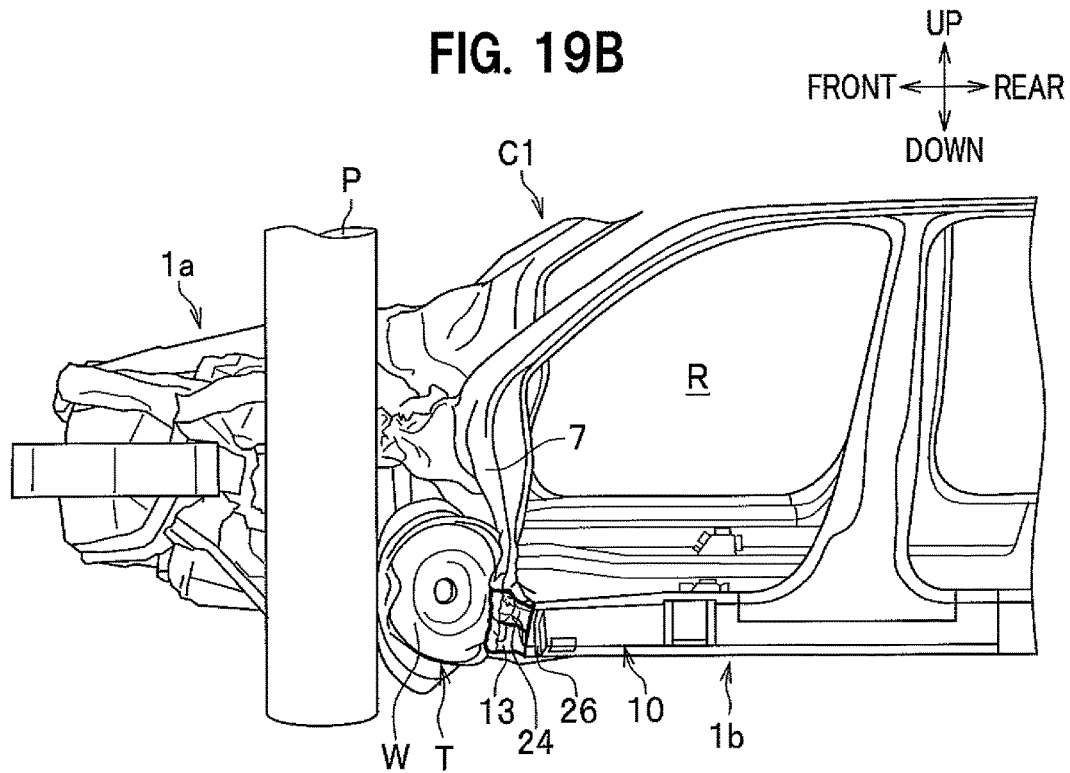

VEHICLE BODY BOTTOM STRUCTURE

CROSS REFERENCE TO RELATED APPLICATIONS

The present application is a divisional application of U.S. Ser. No. 14/376,171, filed 1 Aug. 2014, which is the US National Phase application of International Application PCT/JP2013/052219, filed on 31 Jan. 2013, which claims priority to four Japanese Patent Applications, i.e., No. 2012-027951, filed on 13 Feb. 2012, No. 2012-030110, filed on 15 Feb. 2012, and Nos. 2012-032878 and 2012-033222, both filed on 17 Feb. 2012. The entire subject matter of these priority documents, including specification claims and drawings thereof, is incorporated by reference herein.

TECHNICAL FIELD

The present invention relates to a vehicle body bottom structure, in particular, a vehicle body bottom structure capable of improving absorption performance for a collision load at a time of a so-called narrow offset collision, in which a collision object such as an oncoming vehicle collides with a vehicle in a state of being shifted to the right side or the left side of the front end of the vehicle, specifically, so that a hard structure such as a front side frame of the collision object such as the oncoming vehicle slightly collides with a front portion of a wheel house of the vehicle body.

BACKGROUND ART

For example, Patent Document 1 discloses a vehicle body structure capable of restricting deformation of the vehicle body by increasing the strength of the vehicle body by dispersing the collision load when the vehicle collides with the collision object such as the oncoming vehicle.

FIG. 33 is a schematic plan view of the vehicle body, showing a state in which the collision load is applied at the time of the narrow offset collision of the vehicle described in Patent Document 1, and FIG. 34 is a left side view of a vehicle main part, showing a door state at the time of the narrow offset collision of the vehicle described in Patent Document 1.

As shown in FIG. 33, in the vehicle body structure disclosed in Patent Document 1, a diagonal member 500, which is inclined inwardly in a vehicle width direction and rearwardly from a front end portion of a side sill 100, is provided in order to improve the strength of the vehicle body. The diagonal member 500 connects a connecting corner portion between the side sill 100 and a side-member-outside 200 to a connecting corner portion between a floor frame 300 (center member) and a floor cross member 400.

Further, although not shown, Patent Document 2 discloses a vehicle body structure in which a pillar brace is provided along a corner portion formed by joining a dash lower and a front pillar, while a reinforcing member is provided inside the front pillar at a joint portion of the front pillar and the pillar brace. With this structure, a frontal collision load can be transmitted to the front pillar through the pillar brace, thereby restricting deformation of the front pillar by the reinforcing member.

Patent Document 2 further discloses a vehicle body front structure for preventing crushing of a dash panel as well as preventing the front pillar and the side sill from being inclined to a vehicle compartment side, by connecting three members composed of the front pillar, a side sill upper, and a dash cross member to one another with a single gusset member (cowl side gusset) disposed at a corner portion of a front portion of the vehicle compartment.

Furthermore, in general, on both sides in the vehicle width direction of a lower portion of the vehicle body, the side sills of closed cross-sections extending in a front-rear direction are provided.

For example, Patent Document 3 discloses an invention in which, in a side sill formed by joining a side sill inner disposed on a vehicle interior side and a side sill outer disposed on a vehicle exterior side, the side sill inner is composed of two members of an upper member and a lower member by vertically dividing the side sill inner into two.

CITATION LIST

Patent Literature

Patent Document 1: Japanese Patent Application Publication No. 2003-237636
Patent Document 2: Japanese Patent No. 4254843
Patent Document 3: Japanese Patent No. 4438416

SUMMARY OF THE INVENTION

Problems to be Solved by the Invention

However, in the vehicle body structure of Patent Document 1 shown in FIG. 33, for example, when the collision object such as an oncoming vehicle 2C has the narrow offset collision at a position outside in the vehicle width direction of a front side frame 600, since a collision load F is applied to a front end of the side sill 100, a large load is applied to the side sill 100 in a direction of the frontal collision load, even if the load to be applied to the side sill 100 is reduced by the diagonal member 500. Therefore, the side sill 100 is bent in a substantial dogleg shape, to be deformed in a state of being compressed by a length L100, as a side sill 100A shown by a two-dot chain line in FIG. 33.

In this case, as shown in FIG. 34, a front pillar 700 connected to an upper portion of the front end of the side sill 100 is also moved to the rear side of the vehicle body in accordance with the deformation of the side sill 100. Therefore, a front-side mounting portion 710 of a door 800 which is provided on the front pillar 700 moves rearward, and the door 800 becomes hard to be opened in some cases.

Further, in a case of a vehicle not including the diagonal member 500 shown in FIG. 33, since a front wheel T moves into the vehicle compartment side while retracting, there is a possibility that the side sill 100 is bent toward a vehicle interior side like a side sill 100B shown by a two-dot chain line in FIG. 33 and thus a vehicle compartment shape is deformed.

Further, in the vehicle body structure described in Patent Document 2, at the time of the narrow offset collision, the load is transmitted to the front pillar from the pillar brace, however, since the reinforcing member is disposed inside the front pillar, the front pillar itself is not crushed, but the front pillar retracts while keeping its shape. Therefore, as in the case of Patent Document 1, the front-side mounting portion of the door which is provided on the front pillar retracts and the door becomes hard to be opened in some cases.

Further, the vehicle body structure disclosed in Patent Document 2 is weak owing to only a coupling between the dash cross member and the gusset member, and, for example, when the collision load is applied to the front end of the side sill upon the narrow offset collision, there is a possibility that a front end of a floor panel is deformed, to increase a retraction amount of the dash lower toward the vehicle compartment side.

Furthermore, in the invention described in Patent Document 3, since only one ridge portion is formed in the upper member, there has been a problem that a flexural rigidity of the upper member against the load at a time of a side collision and a crushing load at a time of a frontal collision is low. Further, since a portion, which is formed substantially horizontally in the lower member, is disposed so as to be shifted vertically with respect to the floor panel, there has been a problem that the lower member cannot transmit the load to the floor panel without releasing the load at the time of the side collision, and thus a flexural rigidity of the lower member is low.

Hence, in the invention described in Patent Document 3, in order to increase the crushing load and the flexural rigidity of the side sill, a reinforcing member is separately provided between the side sill outer and the side sill inner (inside the side sill), however, there has been a problem that the weight of the vehicle body is increased by an amount of the reinforcing member. Incidentally, it is considered to employ a means for increasing the crushing load and the flexural rigidity of the side sill by setting large plate thicknesses of the lower member and the upper member, but it will lead to an increase in the weight of the vehicle body.

The present invention has been made in view of these problems, and the first object of the present invention is to provide a vehicle body bottom structure capable of restricting retraction of the front pillar by improving absorption performance for the collision load at the time of the narrow offset collision. Further, the second object of the present invention is to provide the vehicle body bottom structure capable of reducing the retraction amount of the dash lower when the collision load is applied. Further, the third object of the present invention is to provide the vehicle body bottom structure capable of further improving absorption performance for the collision load at the time of the narrow offset collision. Furthermore, the fourth object of the present invention is to provide the vehicle body bottom structure capable of reducing the weight of the vehicle body while improving the crushing load and the flexural rigidity of the side sill inner.

Solution to the Problem

A vehicle body bottom structure according to the present invention includes a dash lower for separating a vehicle compartment from a power mounted room as well as separating the vehicle compartment from a wheel house, a front pillar which is erected at vehicle-widthwise end portion of the dash lower, and a gusset which is bridged between the dash lower and the front pillar, wherein the gusset is joined to the dash lower at one end thereof, and is spaced apart from the dash lower as the gusset approaches the front pillar, to be joined to the front pillar at the other end thereof, and wherein a crushing space of a substantially triangular shape in a plan view is formed in a portion surrounded by the dash lower, the front pillar, and the gusset.

With this configuration, since the vehicle body bottom structure has the crushing space of the substantially triangular shape in the plan view in the portion surrounded by the dash lower, the front pillar, and the gusset, the crushing space is crushed by a wheel in the wheel house, to absorb the collision load at the time of the narrow offset collision. Therefore, the collision load to be transmitted to the front pillar is decreased, and the retraction of the front pillar is restricted. As a result, since a retraction amount of the front-side mounting portion of the door provided on the front pillar is reduced, it is possible to eliminate a disadvantage that opening and closing of the door is difficult.

Further, in the present invention, the vehicle body bottom structure is preferably configured such that a front side frame which is provided to extend in a vehicle front-rear direction is disposed in the power mounted room, wherein the one end of the gusset is secured to a position in the dash lower, the position corresponding to a joint portion between the dash lower and a rear end portion of the front side frame, and wherein a top portion of the crushing space which is formed with the gusset and the dash lower is disposed at a position where an inner rear end edge of a wheel provided in the wheel house collides with the dash lower at a time of a narrow offset collision.

With this configuration, at the time of the narrow offset collision, the inner rear end edge of the wheel provided in the wheel house collides to be supported at the position where a top portion of the crushing space is disposed, the crushing space being formed by the gusset and the dash lower out of the dash lower. Then, the inner rear end edge of the wheel which is supported by the top portion becomes a fulcrum, to rotate the wheel outwardly in the vehicle width direction, and an outer rear end edge of the wheel is guided toward the top portion of the crushing space which is formed with the front pillar and the dash lower. As a result, since one side (the dash lower) of the crushing space of the substantially triangular shape is pressed by a rear end surface of the wheel, it is possible to sufficiently crush the crushing space of the substantially triangular shape.

Further, in the present invention, the gusset is preferably configured such that a site which is joined to the dash lower has a larger rigidity against bending deformation than that of a site which is spaced apart from the dash lower.

With this configuration, in the gusset, since the rigidity of the portion which is joined to the dash lower is increased, a supporting rigidity of the top portion of the crushing space formed by the gusset and the dash lower is improved. In addition, in the gusset, since the portion which is spaced apart from the dash lower is relatively easily deformed, it is possible to favorably crush the crushing space of the substantially triangular shape.

Further, in the present invention, the vehicle body bottom structure is preferably configured such that a dash cross member which is provided to extend in the vehicle width direction is coupled to a lower end side of the dash lower, and an inner rear end edge of a wheel provided in the wheel house collides with the dash lower, to be supported by the gusset and the dash cross member at a time of a narrow offset collision.

With this configuration, since a supporting force (reaction force) of the inner rear end edge of the wheel at the time of the narrow offset collision is increased, and the retraction amount of the dash lower is reduced, it is possible to more favorably rotate the wheel around the inner rear end edge of the wheel.

Further, in the present invention, it is preferable that the vehicle body bottom structure further includes a floor frame, which is provided to extend in a vehicle front-rear direction and is joined to the dash lower at a front end portion thereof, a side sill which is provided to extend in the front-rear direction at an outside in the vehicle width direction of the floor frame, and is joined to a lower end portion of the front pillar and a vehicle-widthwise end portion of the dash lower at a front end portion thereof, and a reinforcing frame which is bridged between the floor frame and the side sill, and disposed to be inclined so as to be located on a front side as the reinforcing frame approaches the side sill, wherein the side sill is configured to include a crushing area in front of a connecting portion with the reinforcing frame.

With this configuration, since the side sill includes the crushing area in front of the connecting portion with the reinforcing frame, it is possible to further improve absorption performance for the collision load at the time of the narrow offset collision.

Further, in the present invention, it is preferable that the vehicle body bottom structure further including left and right side sills which are provided to extend in a vehicle front-rear direction along outside end portions of a vehicle body in a vehicle width direction, further includes a dash cross member which is coupled to front ends of the left and right side sills, and extends in the vehicle width direction, and an outrigger which is connected to a rear end of a front side frame, and coupled to each of the front ends of the left and right side sills, to extend in the vehicle width direction, wherein a dash lower having a wheel housing portion is clamped to be joined between the dash cross member and the outrigger.

According to the present invention, since the dash lower having the wheel housing portion is sandwiched to be joined between the dash cross member and the outrigger, the strength of the wheel housing portion is reinforced. As a result, it is possible to reduce the retraction amount of the dash lower toward the rear of the vehicle body by increasing a wheel collision reaction force due to the narrow offset collision.

Further, in the present invention, it is preferable that the side sill includes a side sill inner and a side sill outer, and in a lower portion of the front pillar, a jack-up reinforcing plate is sandwiched between the side sill inner and the side sill outer, and the outrigger extends outwardly more than the dash cross member, to be joined to the side sill outer while sandwiching the side sill inner and the jack-up reinforcing plate therebetween.

With this configuration, it is possible to increase a coupling strength between the dash cross member and the front end portion of the side sill.

Further, in the present invention, the dash cross member is preferably coupled along with the outrigger and a lateral frame.

With this configuration, it is possible to favorably support a narrow offset collision load and an offset collision load.

Further, in the present invention, the dash cross member is preferably disposed in a forward position than an overlapping portion of a floor frame and the rear end of the front side frame.

With this configuration, it is possible to ensure a constant closed cross-section in the dash cross member, and not to protrude the dash cross member at the feet of passengers.

Further, in the present invention, an inner rear end edge of a wheel is preferably supported by two upper and lower members, which are a gusset member on an upper side and the dash cross member on a lower side.

With this configuration, at the time of the narrow offset collision, it is possible to support the narrow offset collision load by sufficiently crushing the crushing space of the substantially triangular shape in the plan view, the crushing space being formed by the gusset member and the dash lower, and to support the narrow offset collision load at the same time, by the dash cross member which is disposed below the gusset.

Further, in the present invention, a vertical member connecting a cowl portion and a tunnel portion in an up-down direction is preferably coupled to the dash lower.

With this configuration, it is possible to generate a sufficient reaction force against a frontal collision load, and to reduce the retraction amount of the dash lower at the feet of the passengers. In addition, load noises can be reduced.

Further, in the present invention, a reinforcing frame connecting a side sill and a floor frame is preferably provided behind the dash cross member.

With this configuration, it is possible to support the collision load by holding a vehicle interior side surface of the side sill, so that the side sill does not deform to be inclined inwardly.

Further, in the present invention, the vehicle body bottom structure further including a side sill which is provided to extend in a vehicle front-rear direction along an outside end portion of a vehicle body in a vehicle width direction, is preferably configured such that the side sill includes a crushing area, which is provided at a front end portion of the side sill, and is crushed upon receiving a collision load so as to absorb the collision load at a time of a vehicle collision, and a bulkhead which is disposed in the side sill behind the crushing area, wherein a reinforcing frame is provided on a vehicle interior side surface of the side sill, the reinforcing frame being inclined inwardly and rearwardly in the vehicle width direction, one end thereof being connected to an outer surface on the vehicle interior side of an installation site of the bulkhead in the side sill, and the other end thereof being coupled to a floor frame, wherein a jack-up reinforcing plate, which is strong against a load in an up-down direction of the vehicle body and weak against a load in the front-rear direction of the vehicle body, is provided in the crushing area, and wherein the jack-up reinforcing plate is integrally provided with a deformable member, which is located at substantially the same height as a center of a front wheel and extends in the front-rear direction of the vehicle body.

According to the present invention, the crushing area which absorbs the collision load is located in the front of the bulkhead, and at the time of the narrow offset collision of the vehicle, the deformable member absorbs a collision energy by being deformed to be bent by a rear end surface of a front wheel, then the jack-up reinforcing plate is deformed by a rear surface except for the rear end surface of the wheel. Therefore, in the present invention, it is possible to restrict deformation in the rear of the crushing area, while increasing an absorption amount of the collision energy as compared with the conventional amount by an amount of the collision energy to be absorbed by the deformable member.

Further, in the present invention, it is preferable that the side sill includes a side sill inner which is disposed inside the vehicle body, and the side sill inner is provided with a deformation restricting member for restricting deformation of the deformable member. With this configuration, it is possible to restrict bending deformation to the vehicle interior side of the deformable member.

Further, in the present invention, a dash cross member is preferably coupled to the side sill inner on the front end of the side sill. It is possible to reduce an ingression amount of the front wheel to the vehicle interior side, by the dash cross member at the time of the narrow offset collision.

Further, in the present invention, it is preferable that a bending plate which is the deformable member is coupled to a side surface of the jack-up reinforcing plate, and a closed cross-section, which extends in the front-rear direction of the vehicle body between the bending plate and the jack-up reinforcing plate and is made of a constant cross-section, is formed, while an upper end of the jack-up reinforcing plate is coupled to a lower end of a front pillar inner, and an lower end of the jack-up reinforcing plate is coupled to a lower flange of the side sill inner.

With this configuration, the crushing area is formed at a corner portion which is constituted by the front end of the side sill and the lower end of the front pillar inner, and at the time of the narrow offset collision, the jack-up reinforcing plate and the deformable member are integrally deformed to be bent, thereby increasing the absorption amount of the collision energy.

Furthermore, with a hat-shaped cross-section of the deformable member, it is possible to make a difference in strength between the up-down direction and the front-rear direction of the jack-up reinforcing plate, thereby achieving all of a jack-up function, weight reduction, and absorption performance for the collision energy.

Further, in the present invention, it is preferable that the vehicle body bottom structure further includes a floor panel constituting a floor surface of a vehicle body, and a side sill which is joined to a side portion in the vehicle width direction of the floor panel and has a closed cross-section extending in a front-rear direction, wherein the side sill includes a side sill outer which is disposed on an outer side in a vehicle, and a side sill inner which is disposed on an inner side in the vehicle and joined to the side sill outer, wherein the side sill inner is configured to be vertically divided into two, to include an upper member disposed on the upper side, and a lower member disposed on the lower side, wherein the upper member is formed at substantially the same height as the height of the side sill outer, and has a plurality of ridge portions formed in the front-rear direction, and wherein the lower member is formed with a plate thickness or material different from that of the upper member, and is disposed substantially horizontally between the floor panel and the side sill outer.

According to the present invention, the side sill inner is configured to be vertically divided into two, and the lower member on the lower side is disposed substantially horizontally between the floor panel and the side sill outer, and thus it is possible to form the upper member on the upper side at substantially the same height as the height of the side sill outer, thereby forming a plurality of ridge portions in the front-rear direction in the upper member. Thus, it is possible to improve the flexural rigidity (bending proof stress) of the upper member against the load at the time of the side collision, and the crushing load at the time of the frontal collision. Further, according to the present invention, the lower member is disposed substantially horizontally between the floor panel and the side sill outer, and thus it is possible to transmit the load at the time of the side collision to the floor panel without releasing the load, thereby improving the flexural rigidity of the lower member against the load at the time of the side collision. Therefore, according to the present invention, compared to the prior art (for example, the invention in Patent Document 1), it is possible to improve the crushing load and the flexural rigidity of the side sill inner.

Further, according to the present invention, by including the above configuration, it is possible to improve the crushing load and the flexural rigidity of the side sill inner, and thus it is possible to minimize the plate thicknesses of the lower member and the upper member, and also to omit the reinforcing member which has been used in the prior art, thereby achieving weight reduction of the vehicle body.

Further, the upper member is preferably configured to include an inner upper wall portion, which is disposed at a position lower than an upper wall portion of the side sill outer and has a predetermined width in the vehicle width direction, and an inclined wall portion which extends downwardly and toward the vehicle interior side from an inside in the vehicle width direction of the inner upper wall portion.

With this configuration, since the inner upper wall portion of the upper member is disposed at the position lower than the upper wall portion of the side sill outer, it is possible to ensure a space for placing a harness above the inner upper wall portion. Further, since the upper member has the inclined wall portion which extends downwardly and to the vehicle interior side from the inside in the vehicle width direction of the inner upper wall portion, it is possible to reduce a volume of the upper member, thereby achieving expansion of an interior space. Furthermore, if the upper member has the inclined wall portion and the inner upper wall portion having the above-described configuration, and the plate thickness of the entire side sill is uniform, a neutral axis of the side sill does not coincide with a cross-sectional center where a proof stress against a bending moment is maximized. However, in the present invention, since adopting a configuration in which the plate thicknesses or materials of the upper member and the lower member are different from each other, even in a case of adopting a configuration, in which the space for placing the harness is ensured and the volume of the upper member is reduced, it is possible to adjust the neutral axis of the side sill to coincide with the cross-sectional center where the proof stress against the bending moment is maximized.

Further, it is preferable that the vehicle body bottom structure further includes a floor cross member which is disposed over the floor panel and extends in the vehicle width direction, wherein the upper member further includes a vertical wall portion which extends downwardly from an inside in the vehicle width direction of the inclined wall portion, wherein the vertical wall portion includes a flat surface portion to which one end of the floor cross member is joined, and a recessed portion having a bottom surface, which is continuous to the inside in the vehicle width direction of the inclined wall portion and is located outside in the vehicle width direction of the flat surface portion, and wherein the side sill is provided with a deformation restricting member which extends in the front-rear direction across the inner upper wall portion, the inclined wall portion, and the recessed portion.

With this configuration, the side sill is provided with the deformation restricting member, which extends in the front-rear direction across the inner upper wall portion, the inclined wall portion, and the recessed portion, and thus the rigidity of the side sill against the load at the time of the side collision is increased. Therefore, it is possible to restrict deformation to the vehicle interior side of the side sill, thereby restricting deformation of the floor panel. Further, the vertical wall portion of the upper sill member includes the recessed portion having a bottom surface located outside in the vehicle width direction of the flat surface portion to which the floor cross member is joined, and the recessed portion is provided with a part of the deformation restricting member, and thus it is possible to set an inside surface in the vehicle direction of the deformation restricting member so as to be flush with the flat surface portion to which the floor cross member is joined, or it is possible to set the inside surface in the vehicle direction of the deformation restricting member outside in the vehicle width direction of the flat surface portion. Thus, even in a case of providing the deformation restricting member, it is possible to avoid interference between the floor cross member and the deformation restricting member, thereby suitably providing the floor cross member from above.

Further, it is preferable that the side portion in the vehicle width direction of the floor panel is clamped between the upper member and the lower member, wherein the floor panel, the upper member, and the lower member are joined together through a plurality of spot welding portions, and wherein a seal member is disposed between the floor panel and the lower member.

In general, between the spot welding portions for joining the floor panel and the side sill, since a gap is inevitably formed, a waterproof spot sealer (seal member) is coated in advance. In the prior art, since a flange portion formed by bending upwardly the side portion in the vehicle width direction of the floor panel is secured to the inside in the vehicle width direction of the lower member substantially in the up-down direction, and the flange portion is coated with the seal member, there is a possibility that a sealing failure occurs, because the seal member and the side sill rub together and the seal member is abraded (damaged) when mounting the floor panel on the side sill from above. In contrast, according to the present invention, since the side portion in the vehicle width direction of the floor panel is clamped between the upper member and the lower member disposed substantially horizontally, and the seal member is disposed between the floor panel and the lower member, it is possible to mount the floor panel on a horizontal surface of the lower member from above, for example, after coating the lower member with the seal member and temporarily joining the upper member to the floor panel. Thus, it is possible to reduce abrasion of the seal member by preventing the seal member and the side sill from rubbing each other, thereby preventing the sealing failure.

Further, since the side portion in the vehicle width direction of the floor panel is clamped between the upper member and the lower member, a coupling force between the side sill and the floor panel is increased. Therefore, it is possible to improve toughness against a spot peeling at the time of the side collision. Further, by joining a center pillar inner to the upper member, it is possible to integrally connect the floor panel, the upper member, and the center pillar inner and then to assemble them to the lower member, thereby performing installation work of the floor panel and the like simply and in a short time.

Further, the sites, which are joined to one another through the spot welding portions, of the floor panel, the upper member, and the lower member, are preferably configured to be formed in a horizontal shape.

In the prior art, since the flange portion formed by bending upwardly the side portion in the vehicle width direction of the floor panel is secured to the inside in the vehicle width direction of the lower member substantially in the up-down direction through the spot welding portion, a welding direction (stacking direction of the members) of the spot welding portion and a load input direction at the time of the side collision becomes substantially parallel to each other, and there has been a problem that the spot welding portion is easily peeled off, when the load in the shear direction is applied to the spot welding portion. In contrast, according to the present invention, the sites, which are joined to one another through the spot welding portions, of the floor panel, the upper member, and the lower member, are formed in a horizontal shape, and thus each member is vertically stacked, to be joined to each other through the spot welding portion. Therefore, it is possible to set the welding direction (stacking direction of the members) of the spot welding portion and the load input direction at the time of the side collision so as to be substantially perpendicular to each other. Thus, at the time of the side collision, even if the load in the shearing direction is applied to the spot welding portion, the spot welding portion is hard to be peeled off, and it is possible to improve toughness against the spot peeling at the time of the side collision. Further, since the floor panel is mounted on the horizontal surface of the lower member, the positioning of the floor panel with respect to the lower member can be facilitated.

Further, it is preferable that the vehicle body bottom structure further includes a dash lower for separating the vehicle compartment from an engine room, wherein a front end of the upper member is formed with a flange portion extending in a direction perpendicular to the front-rear direction, and wherein the flange portion is joined to a rear surface of the dash lower by spot welding.

With this configuration, since the front end of the upper member is formed with the flange portion extending in the direction perpendicular to the front-rear direction, and the flange portion is joined to the rear surface of the dash lower by spot welding, it is possible to increase joint strength between the upper member and the dash lower. Further, it is possible to support the front wheel which retracts at the time of the narrow offset collision by the side sill of the closed cross-section, thereby restricting deformation of the floor panel.

Further, it is preferable that the inner upper wall portion includes a horizontal surface parallel to the vehicle width direction, and the bottom surface of the recessed portion includes a vertical surface parallel to an up-down direction.

With this configuration, since the inner upper wall portion includes the horizontal surface, and the bottom surface of the recessed portion includes the vertical surface, the positioning of the deformation restricting member with respect to the upper member can be facilitated.

Advantageous Effects of the Invention

According to the present invention, it is possible to provide a vehicle body bottom structure capable of restricting retraction of the front pillar by improving absorption performance for the collision load at the time of the narrow offset collision. Further, in the present invention, it is possible to obtain a vehicle body bottom structure capable of reducing a retraction amount of the dash lower when the collision load is applied. Further, in the present invention, it is possible to obtain a vehicle body bottom structure capable of further improving absorption performance for the collision load at the time of the narrow offset collision. Furthermore, according to the present invention, it is possible to provide a vehicle body bottom structure capable of reducing the weight of the vehicle body while improving the crushing load and the flexural rigidity of the side sill inner.

BRIEF DESCRIPTION OF THE DRAWINGS

FIG. 14 is an end view taken along a line XIV-XIV in FIG. 12;

FIG. 19A is a perspective view showing the initial state when the vehicle applied with the vehicle body bottom structure according to the present embodiment has the narrow offset collision with the utility pole;

FIG. 19B is a perspective view showing the late state when the vehicle has the narrow offset collision;

DETAILED DESCRIPTION OF EMBODIMENTS FOR CARRYING OUT THE INVENTION

<First Embodiment>

Figure 1:
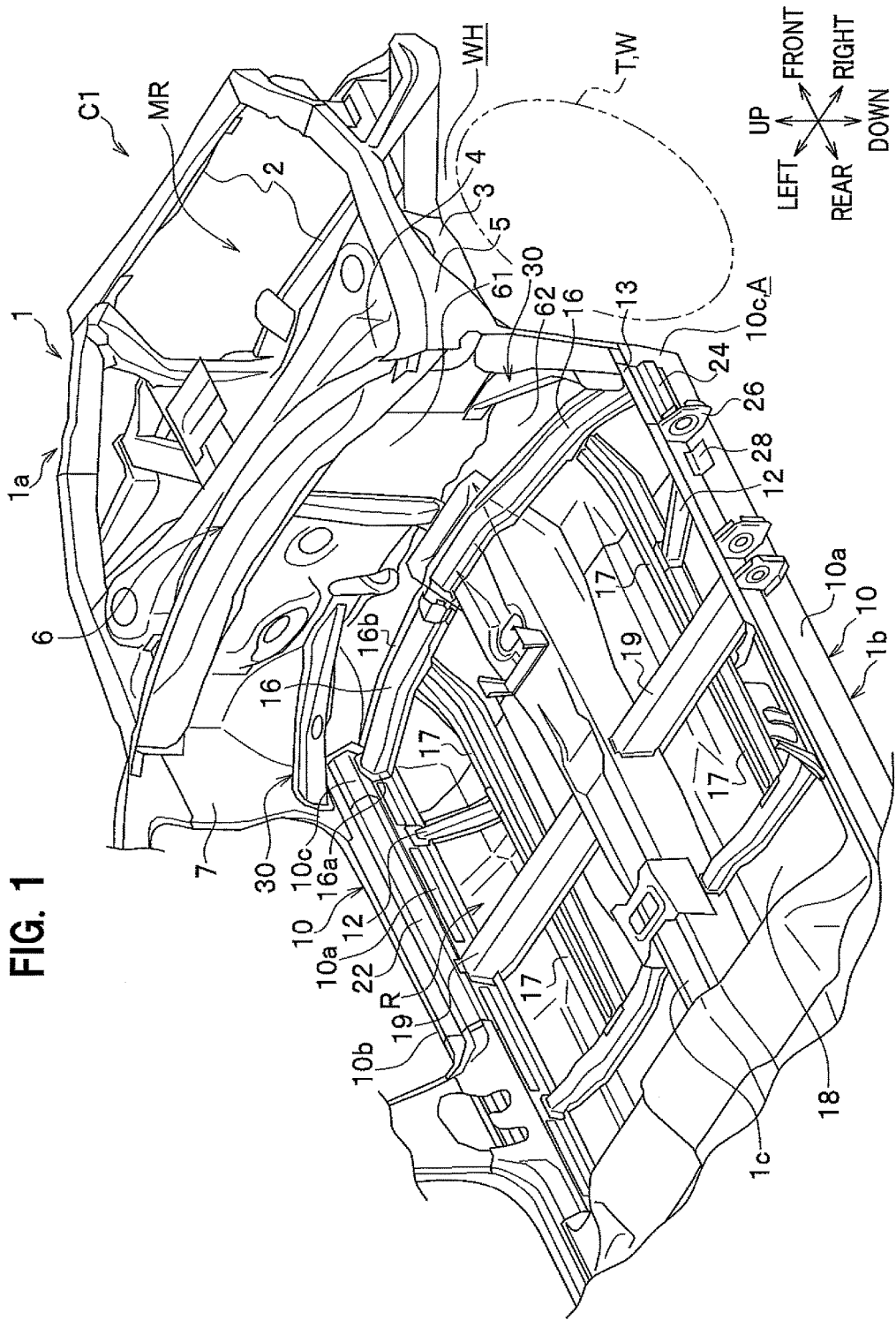
FIG. 1 is a perspective view showing a vehicle body front portion applied with a vehicle body bottom structure according to a present embodiment.

A first embodiment of the present invention will be described in detail with reference to FIGS. 1 to 9. In the description, the same elements are denoted by the same reference numerals, and redundant description will be omitted. Further, when describing directions, those will be described with reference to the front, rear, left, right, up, and down of a vehicle viewed from a driver.

As shown in FIG. 1, a vehicle C1 is made of an automobile, which includes a power mounted room MR disposed in a vehicle body front portion 1a, a front wheel house WH, and a vehicle compartment R disposed to be separated by a partition wall 6 from the power mounted room MR and the front wheel house WH. The automobile includes automobiles such as a FR (Front engine Rear drive) type, a FF (Front engine Front drive) type, and a four wheel drive type.

Incidentally, as for the vehicle C1 which is applied with the present invention, it is sufficient to have a pair of left and right front pillars 7 disposed on the left and right outsides of a vehicle body 1, and the partition wall 6 (more specifically, a dash lower 62) provided in a vehicle width direction between the front pillars 7. Hereinafter, a case in which the vehicle body bottom structure according to the present embodiment is applied to the FR type automobile will be described as an example.

As shown in FIG. 1, the vehicle body 1 is for forming the entire vehicle C1, and mainly includes, for example, a variety of metallic vehicle body frames such as a side sill 10, a floor frame 17, and a front side frame 3, metallic vehicle body panels (not shown) such as an engine hood and a fender panel, and a bumper face made of resin or metal.

The vehicle body front portion 1a and a vehicle body bottom portion 1b of the vehicle body 1 respectively includes components such as a front bulkhead 2, a bumper beam (not shown), the front side frame 3, a windshield lower 4, a front wheel house upper member 5, the partition wall 6, a front pillar 7, the side sill 10, a reinforcing frame 12, the floor frame 17, a floor panel 18, an outrigger 20 (see FIGS. 5, 6), a dash cross member 16, and a gusset 30, which will be described later. The components are provided to extend in a vehicle front-rear direction in a left-right pair, or are laterally disposed to be substantially bilaterally symmetrical. Since the vehicle body bottom portion 1b is arranged to be substantially bilaterally symmetrical in this manner, hereinafter, the left side part of the vehicle body 1 will be mainly described, and the description of the right side part of the vehicle body 1 will be omitted.

The power mounted room MR is a so-called engine room such as a housing space, in which a power unit (not shown) composed of an electric motor, an engine, a transmission, and the like is disposed, and is defined by panel members and frames which are arranged in a periphery of the housing space. In the power mounted room MR, the front bulkhead 2, the bumper beam (not shown), and the like are disposed on the front side, and the partition wall 6 is disposed on the rear side. Further, on the left and right upper sides of the power mounted room MR, the front wheel house upper members 5, the front pillars 7, and the like are disposed. On the left and right lower side of the power mounted room MR, a pair of front side frames 3 extending in the front-rear direction of the vehicle body 1 is disposed.

As shown in FIG. 1, the front bulkhead 2 is a frame member made of a frame body having a substantially rectangular shape so as to surround a radiator (not shown) in a vehicle body front portion of the power mounted room MR, and the whole is disposed in the vehicle width direction.

As shown in FIG. 1, the front side frame 3 is a pair of left and right frame members, which is disposed in the vehicle body front portion 1a and extends in the front-rear direction of the vehicle body 1, and is, for example, composed of a steel rectangular pipe material or the like of a cross-sectional rectangular shape (rectangular tube shape) having a rigidity up to a rear end from a front end thereof. To the front end of the front side frame 3, the bumper beam is connected via a bumper beam extension which is not shown. The rear end of the front side frame 3 is joined to the dash lower 62 of the partition wall 6.

The front wheel house upper member 5 is a frame member disposed in the vehicle front-rear direction on the upper side of the vehicle body side portion of the power mounted room MR. The front wheel house upper member 5 is connected to a head upper side of the front bulkhead 2 at a front end thereof, and is connected to the front pillar 7 at a rear end thereof, and is formed with the front wheel house WH at a lower side thereof. The front wheel house WH is, as shown in FIG. 1, a space for housing a front wheel T, and is provided on the left and right of the power mounted room MR. The front wheel house WH covers the vehicle body side, the front and rear, and the upper portion of the front wheel T via the space.

Each front pillar 7 is a hollow shape frame member, which is provided to extend from a front end portion 10c (crushing area A) of the side sill 10 disposed in the vehicle body bottom portion 1b to a left or right side portion of a windshield (not shown) over the front end portion 10c. As described later, an end portion on a vehicle exterior side of the gusset 30 is connected to a lower end of a front pillar inner 7a (see FIG. 2) which is disposed in the vehicle interior side.

The partition wall 6 is a partition member for partitioning the vehicle compartment R on the rear side and the power mounted room MR on the front side, and is, for example, composed of a dash upper 61 made of a steel plate or the like, the dash lower 62 which is joined to inner side walls (the front pillar inners 7a) of the front pillars 7 at left and right end portions thereof, the dash cross member 16 made of a frame member, a reinforcing member for reinforcement, and the like.

Figure 2:
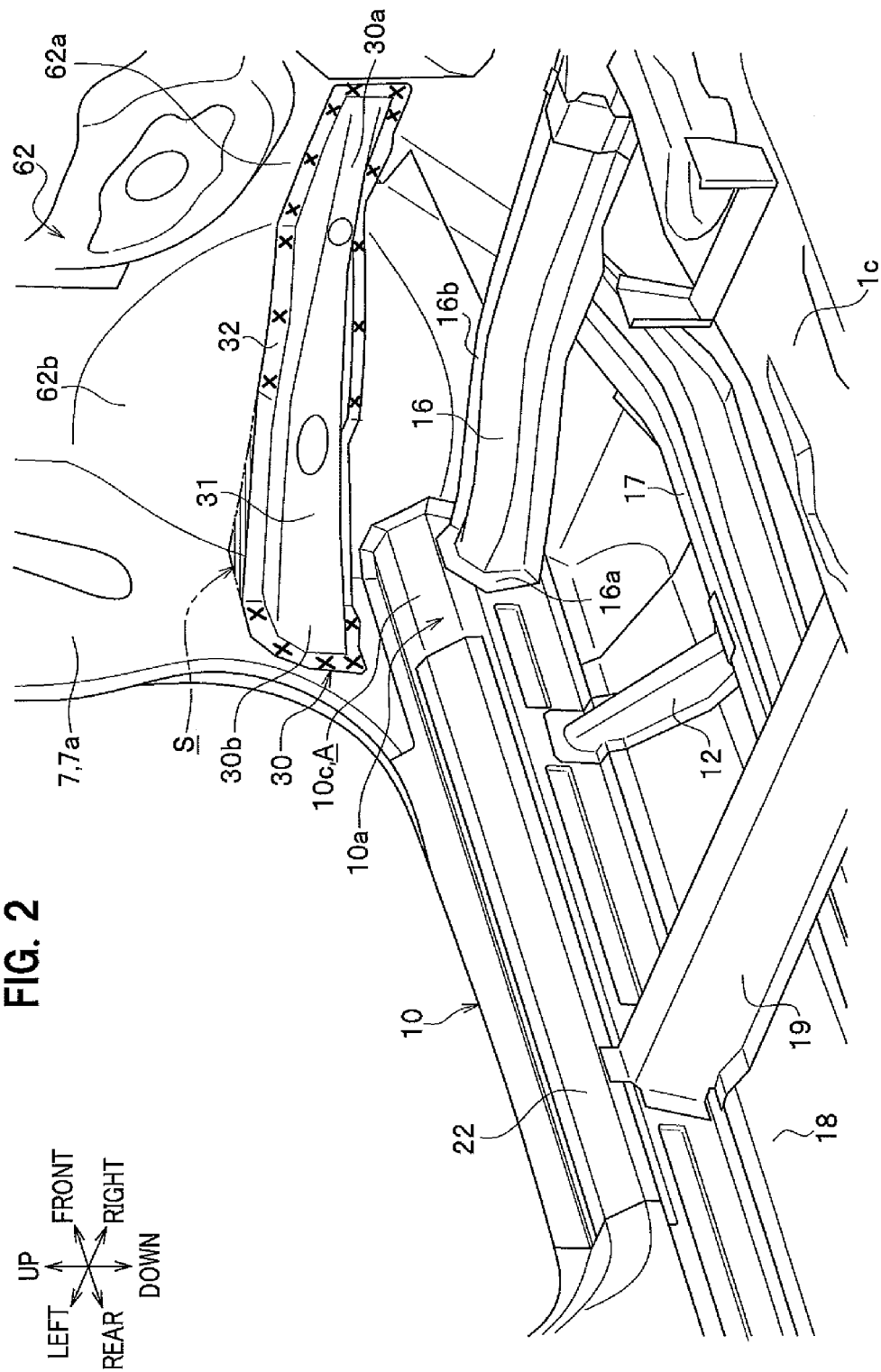
FIG. 2 is a partially enlarged perspective view including a left side gusset of the vehicle body bottom structure shown in FIG. 1.

As shown in FIG. 2, the dash lower 62 includes a board body portion 62a for partitioning the vehicle compartment R and the power mounted room MR, and a wheel housing portion 62b for partitioning the vehicle compartment R and the front wheel house WH. The wheel housing portion 62b is formed in a dome shape (spherical surface shape) bulging to the vehicle compartment R side. The dash cross member 16 is secured by welding to a lower end portion of the dash lower 62 along the vehicle width direction. The gusset 30 is bridged between the dash lower 62 and the front pillar 7.

Figure 3:
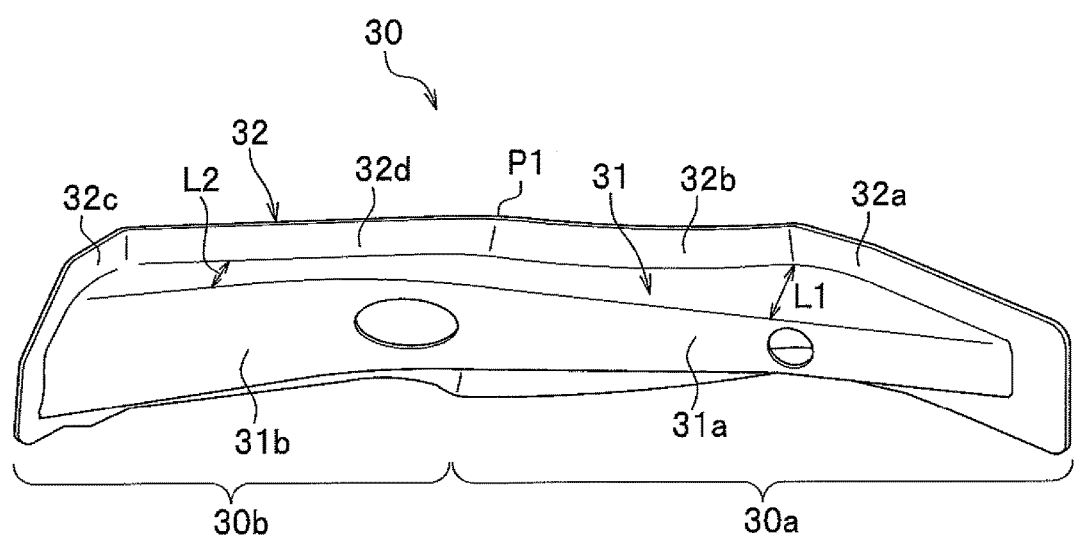
FIG. 3 is a perspective view of the gusset.
Figure 4:
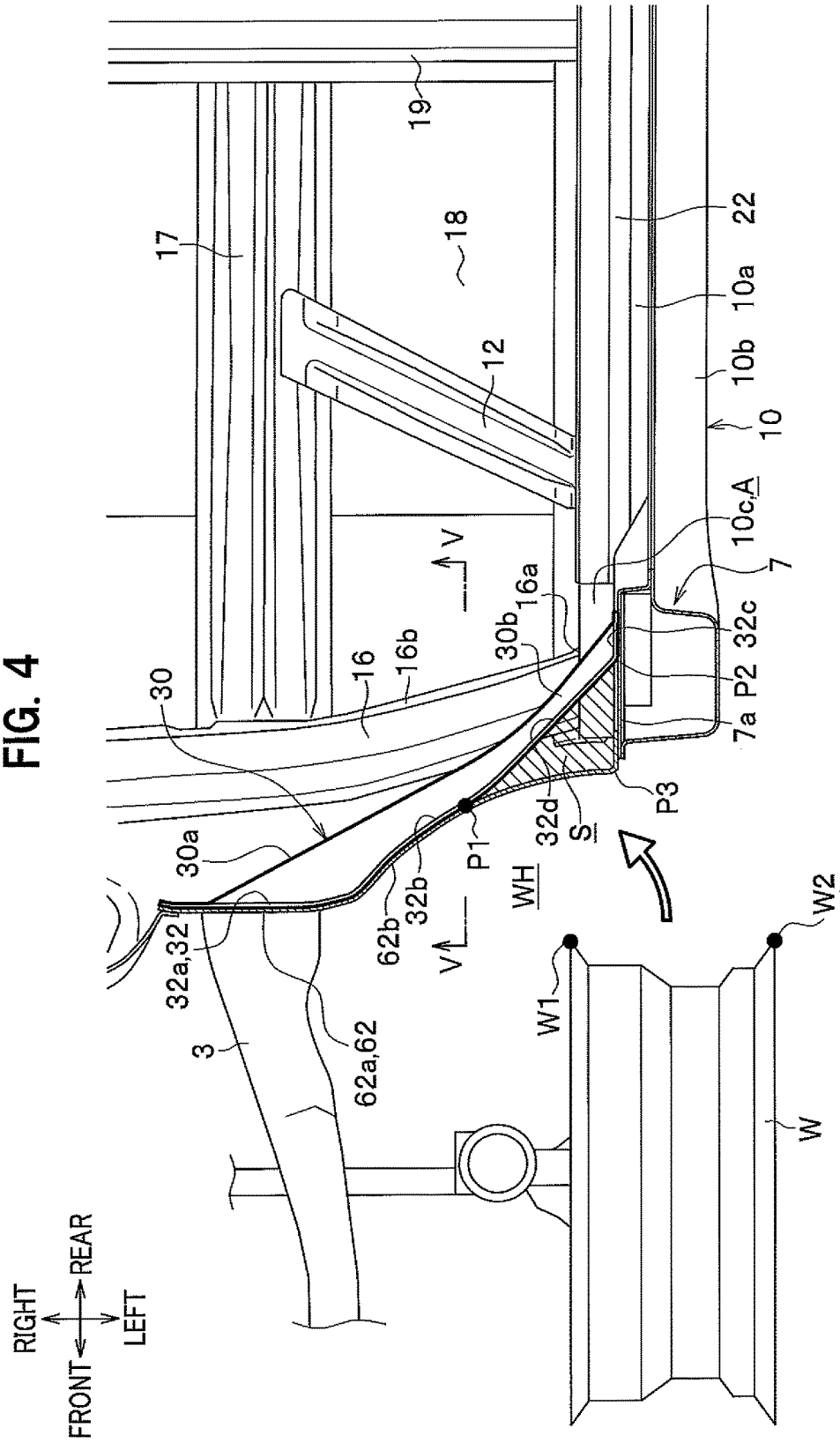
FIG. 4 is a partially enlarged plan view including the left side gusset of the vehicle body bottom structure shown in FIG. 1.

As shown in FIGS. 2, 3, and 4, the gusset 30 is a frame member having a substantially hat-shaped cross-section, which is joined to the board body portion 62a and the wheel housing portion 62b at a vehicle interior side end portion (one end) thereof, and is spaced apart from the wheel housing portion 62b as the gusset 30 approaches the front pillar 7, to be joined to the inner side wall (front pillar inner 7a) of the front pillar 7 at a vehicle exterior side end portion (the other end) thereof. The gusset 30 includes a dashboard joint portion 30a which is a portion joined to the dash lower 62, and a dashboard spacing portion 30b which is a portion spaced apart from the dash lower 62. The dashboard spacing portion 30b is disposed to be inclined away from the wheel housing portion 62b as it approaches the front pillar 7. Hereby, a crushing space S (refer to hatching portions in FIGS. 2, 4) of a substantially triangular shape in a plan view is formed in a portion surrounded by the dashboard spacing portion 30b, the wheel housing portion 62b, and the front pillar 7.

As shown in FIG. 3, the gusset 30 includes a gusset body 31 having a substantially U-shaped cross-section, and a flange portion 32 extending outwardly from an end edge portion of the gusset body 31. In the gusset 30, the dashboard joint portion 30a has a larger rigidity against bending deformation in a horizontal direction than that of the dashboard spacing portion 30b. In other words, out of the gusset body 31, a portion 31a corresponding to the dashboard joint portion 30a has a larger width dimension in a direction perpendicular to a longitudinal direction of the gusset 30 in a plan view compared to that of a portion 31b corresponding to the dashboard spacing portion 30b (L1>L2). Incidentally, out of the gusset body 31, the portion 31a corresponding to the dashboard joint portion 30a is formed in a substantially triangular shape in the plan view. As shown in FIG. 3, the gusset body 31 has a larger height dimension as it approaches the front pillar.

Further, as shown in FIGS. 3, 4 (mainly FIG. 3), the flange portion 32 includes a first portion 32a which is joined by spot welding to the board body portion 62a, a second portion 32b which is joined by spot welding to the wheel housing portion 62b, a third portion 32c which is joined by spot welding to the front pillar 7, and a fourth portion 32d between the second portion 32b and the third portion 32c. Incidentally, in FIG. 2, welding points by spot welding are schematically shown by "x" marks.

As shown in FIG. 4, the first portion 32a of the flange portion 32 is secured by welding to a position (vehicle compartment R side) corresponding to the joint portion between the dash lower 62 and the front side frame 3. The second portion 32b is curved in a spherical surface shape to fit a surface shape of the wheel housing portion 62b. A boundary portion between the second portion 32b and the fourth portion 32d is a first top portion P1 of the crushing space S (more specifically, a top portion P1 formed by the dash lower 62 and the gusset 30). Further, a boundary portion between the third portion 32c and the fourth portion 32d is a second top portion P2 of the crushing space S (more specifically, a top portion P2 formed by the front pillar inner 7a and the gusset 30). Furthermore, a boundary portion between the wheel housing portion 62b and the front pillar inner 7a is a third top portion P3 of the crushing space S (more specifically, a top portion P3 formed by the front pillar inner 7a and the wheel housing portion 62b).

The first top portion P1 of the crushing space S is disposed at a position where an inner rear end edge W1 of a wheel W provided in the wheel house WH collides with the dash lower 62 (more specifically, the wheel housing portion 62b) at a time of a narrow offset collision. In other words, a distance to the inner rear end edge W1 from a rotational center (for example, a junction point between a lower arm and the front side frame 3) of the wheel W at the time of the narrow offset collision and a distance to the first top portion P1 from the rotational center are substantially equal to each other. At the top portion P1 of the crushing space S, the dashboard joint portion 30a of the gusset 30 supports the inner rear end edge W1 of the wheel W which has collided. Further, below the top portion P1 of the crushing space S, the dash cross member 16 supports the inner rear end edge W1 of the wheel W which has collided.

Figure 5:
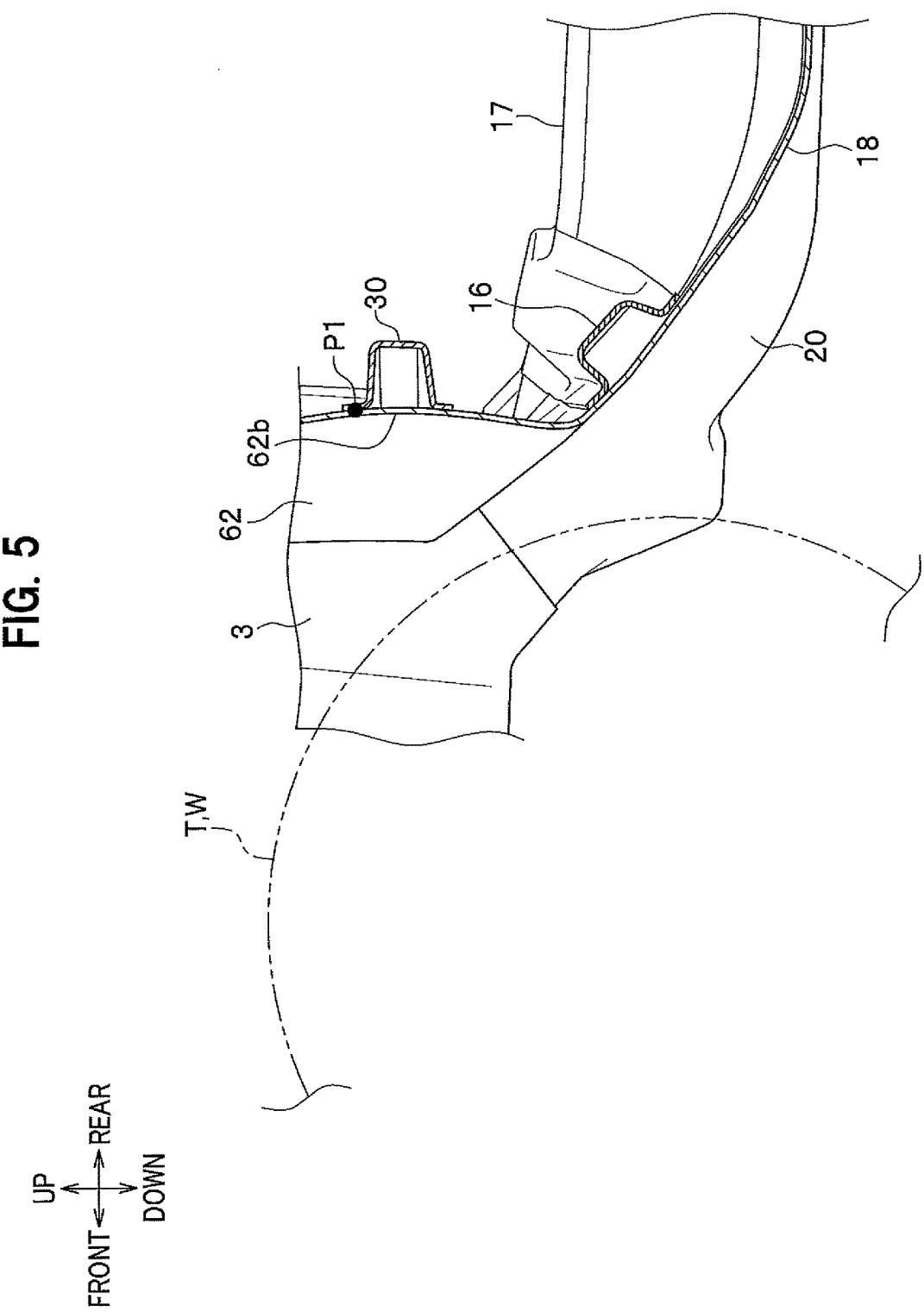
FIG. 5 is a cross-sectional view taken along a line V-V in FIG. 4.

As shown in FIGS. 2, 4, and 5, the dash cross member 16 is joined to the lower end of the dash lower 62. The dash cross member 16 is a lateral bridge member which is laterally bridged in the vehicle width direction between the side sills 10, 10 on both the left and right sides, and is made of a metal thick plate such as a rigid steel plate which is open on the lower side thereof and has a substantially hat-shaped cross-section.

The dash cross member 16 is formed with flange portions 16a, 16b for reinforcing and joining, respectively on the left and right end portions and the front and rear lower end portions. Specifically, the joint flange portions 16a, which are formed on both the left and right end portions of the dash cross member 16, are joined to inner side surfaces of the side sills 10, and the joint flange portions 16b, which are formed on the lower end portions of the dash cross member 16, are joined to the dash lower 62, to be provided to extend in the vehicle width direction.

As shown in FIG. 5, the dash cross member 16 is disposed substantially under the first top portion P1. In other words, the position in the vehicle front-rear direction of the dash cross member 16, in a vertical cross-sectional view through the first top portion P1 of the substantially triangular crushing space S, is substantially equal to the position in the vehicle front-rear direction of the first top portion P1. Therefore, at the time of the narrow offset collision, the inner rear end edge W1 of the wheel W collides with the wheel housing portion 62b of the dash lower 62, and is adapted to be supported by two members of the gusset 30 disposed at the first top portion P1 and the dash cross member 16 under the first top portion P1. Hereby, it is possible to reduce an ingression amount of the front wheel T to the vehicle interior side at the time of the narrow offset collision.

Returning to FIGS. 1 and 2, the side sill 10 is a hollow frame member, which is provided to extend in the vehicle front-rear direction along an outside end portion in the vehicle width direction of the floor panel 18 of the vehicle body 1 from a lower end portion of the front pillar 7, and is made of a metal plate such as a steel plate of a substantially rectangular shape in a cross-sectional view. In the side sill 10, a side sill inner 10a, which is disposed inside the vehicle body and is made of a high-strength steel plate substantially U-shaped in a cross-sectional view, and a side sill outer 10b, which is disposed outside the vehicle body and is substantially U-shaped in a cross-sectional view, are joined to each other so as to form a closed cross-section.

Further, the side sill inner 10a is provided with a deformation restricting member 22 which extends in the front-rear direction. The deformation restricting member 22 is provided such that a front end thereof in the front-rear direction extends up to a substantially central portion of the crushing area A, and a rear end thereof extends up to a rear end of the side sill inner 10a. By providing this deformation restricting member 22, it is possible to restrict bending deformation of a deformable member 24 to be described later toward the vehicle interior side.

Figure 6:
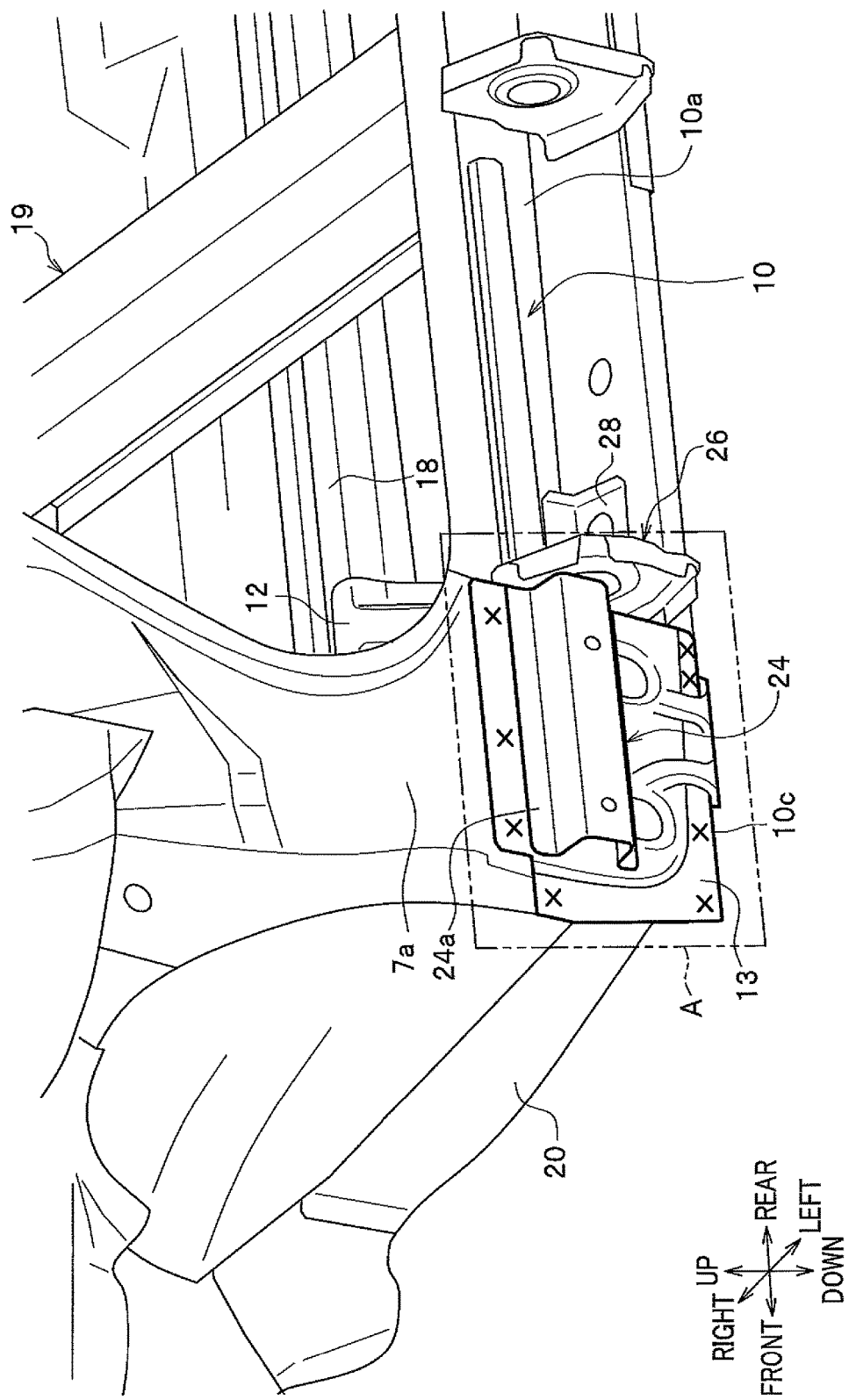
FIG. 6 is a partially enlarged perspective view of a front end portion of the side sill viewed from a vehicle outside.

As shown in FIGS. 1 and 6, the crushing area A is provided at the most forward position of the front end portion 10c of the side sill 10, and a jack-up reinforcing plate 13 and the deformable member 24 are provided to be integrally joined to the crushing area A. A bulkhead 26 and a side sill reinforcing bracket 28 are provided inside a zone behind the crushing area A.

A front side of the front end portion 10c of the side sill 10 is connected to the lower end portion of the front pillar 7, and the outrigger 20 is connected to the lower end of the front pillar 7 in the vehicle width direction substantially perpendicular to the front pillar 7 (see FIGS. 5 and 6). Further, in the front end portion 10c of the side sill 10, the bulkhead 26 is provided behind the crushing area A to be described later so as to partition an inside of the side sill 10 in the front-rear direction. Vehicle interior side surfaces of the side sills 10 are joined with the dash cross members 16, the outriggers 20, and the reinforcing frames 12, which are respectively arranged in the vehicle width direction, and hold the left and right end portions of the floor panel 18.

As shown in FIGS. 1 and 6 (mainly FIG. 6), the crushing area A is a portion which is formed so as to absorb a collision load by being crushed upon receiving the collision load, for example, when a collision object such as a oncoming vehicle collides with the vehicle C1 from the front. The reinforcing frame 12 is connected to the side sill 10 at a rear position apart by a predetermined distance from the front end of the side sill 10, and the crushing area A is set such that the strength of the front end portion 10c in front of the connecting portion is smaller than the strength obtained by combining the reinforcing frame 12 and the side sill 10 in the rear of the connecting portion.

The crushing area A is composed of a range in the front-rear direction to the front end of the side sill 10 from an installation position (the connecting portion) of the bulkhead 26 provided in the side sill 10, and a range in the up-down direction to the upper end from the lower end of the side sill 10. In the crushing area A, provided is the jack-up reinforcing plate 13 for reinforcing a portion where an unillustrated jack that is used when raising the vehicle body 1 is set. The deformable member 24 having a hat-shaped cross-section (see FIG. 6) is integrally joined to a vehicle exterior side surface of the jack-up reinforcing plate 13.

As shown in FIGS. 1 and 2, the reinforcing frame 12 is a reinforcing frame member for receiving the collision load while holding the vehicle interior side surface of the side sill 10, so that the side sill 10 does not deform to be inclined inwardly when the collision object has the narrow offset collision with the vehicle C1. The reinforcing frame 12 is made of a steel plate which is bent by a press or the like in a substantial hat-shape in a cross-sectional view. One end side of the reinforcing frame 12 is joined to an outer surface on the vehicle interior side of the side sill 10 to which the bulkhead 26 is provided inwardly, and the reinforcing frame 12 is provided to be inclined inwardly and rearwardly in the vehicle width direction from the joint portion. The other end side of the reinforcing frame 12 is joined to the floor frame 17.

As shown in FIG. 1, floor cross members 19 are frame members made of steel plates having substantially hat-shaped cross-sections, which are respectively bridged between a tunnel portion 1c and the left and right side sills 10, 10. On a bottom surface of a substantially middle portion in the vehicle width direction of each floor cross member 19, each floor frame 17 is disposed to be perpendicular to the corresponding floor cross member 19.

As shown in FIG. 1, the floor frames 17 are frame members having substantially hat-shaped cross-sections which hold the floor panel 18 of the vehicle body floor, and are respectively joined to the same positions on both top and bottom floor surfaces of the floor panel 18. The floor frames 17 are connected to rear portions of the front side frames 3 at the front ends thereof, and connected to bottom surfaces of the floor cross members 19 and vehicle interior side joint portions of the reinforcing frames 12 at vehicle body center sides thereof, and are bent outwardly at the rear ends thereof, to be joined to the vehicle interior side surfaces of the left and right side sills 10 at vehicle body outsides thereof.

As shown in FIG. 1, the floor panel 18 is a metal plate member for forming the floor surface of the vehicle compartment R, and is bridged between the tunnel portion 1c and the side sill 10.

The vehicle C1, which is applied with the vehicle body bottom structure according to the present embodiment, is basically constructed as described above, and its operation and effects will be described in the following with reference to FIGS. 7 to 9 (FIGS. 1 to 6, as appropriate).

Figure 7:
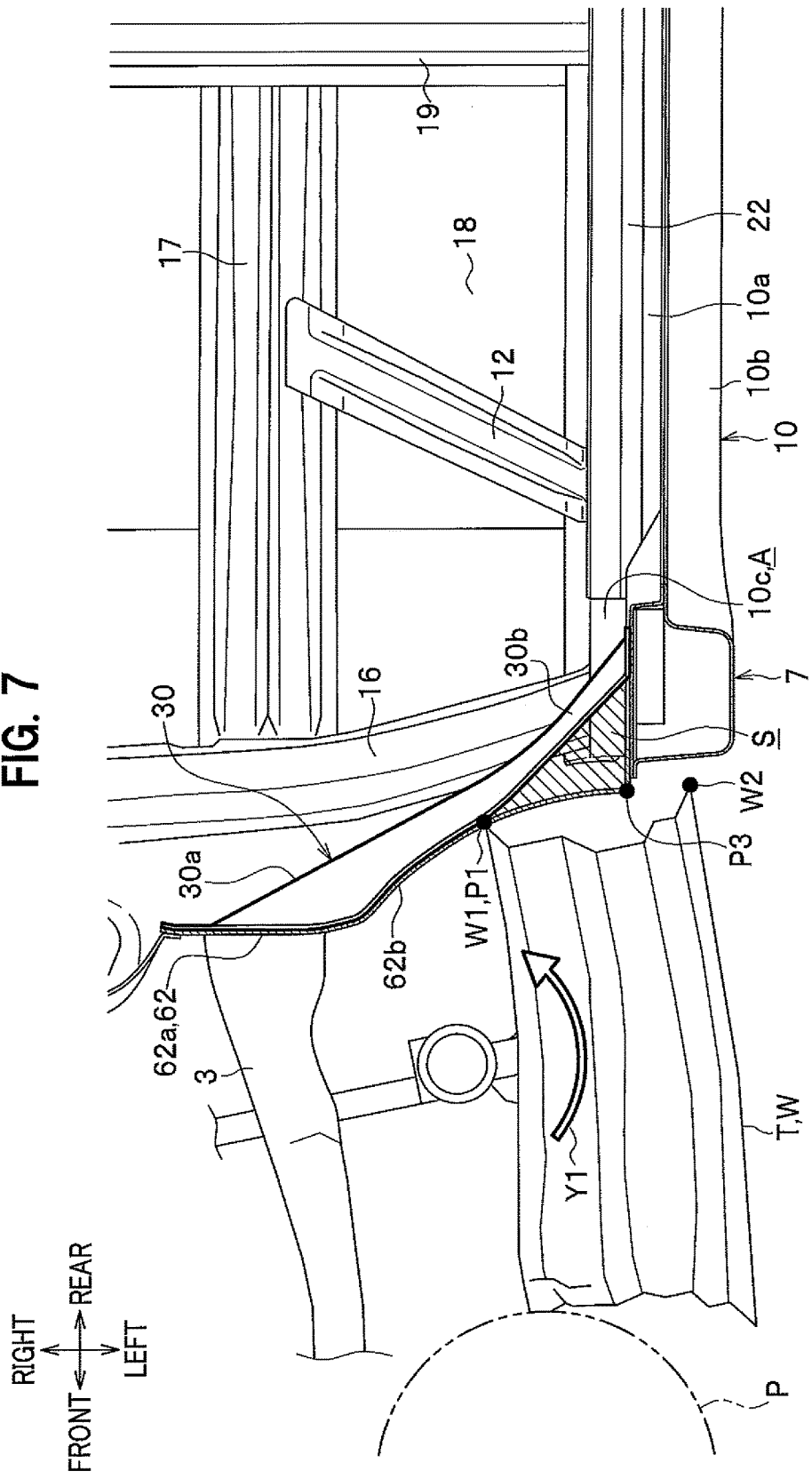
FIG. 7 is a plan view showing an initial state when the vehicle applied with the vehicle body bottom structure according to the present embodiment has a narrow offset collision with a utility pole.

FIG. 7 is a plan view showing an initial state when the vehicle applied with the vehicle body bottom structure according to the present embodiment has a narrow offset collision with a utility pole. FIG. 8 is a plan view showing a middle state when the vehicle applied with the vehicle body bottom structure according to the present embodiment has the narrow offset collision with the utility pole. FIG. 9 is a plan view showing a late state when the vehicle applied with the vehicle body bottom structure according to the present embodiment has the narrow offset collision with the utility pole.

As shown in FIG. 7, when the vehicle C1 according to the present embodiment has the narrow offset collision, for example, with a utility pole P which is the collision object, the collision load is transmitted to the left end portion of the front bulkhead 2 on the vehicle body front left side and the outside of the front side frame 3, and the front wheel house upper member 5, the front wheel T, the front pillar 7, the front end portion 10c of the side sill 10, and the jack-up reinforcing plate 13 are pushed toward the rear of the vehicle to be crushed by the utility pole P which is in contact with the vehicle C1. In particular, the utility pole P pushes the wheel W of the front wheel T in front of the side sill 10, and then the wheel W pushes the dash lower 62 toward the rear side.

In the present embodiment, when the wheel W of the front wheel T is pushed by the utility pole P to move rearwardly (refer to an arrow Y1 in FIG. 7), the inner rear end edge W1 of the wheel W comes into contact with the first top portion P1 of the crushing space S formed by the wheel housing portion 62b and the gusset 30. In this case, since the gusset 30 is secured by welding to the wheel housing portion 62b at the first top portion P1, and the dashboard joint portion 30a of the gusset 30 has a larger rigidity against bending deformation in the horizontal direction than that of the dashboard spacing portion 30b, the dashboard joint portion 30a is restricted from moving to the rear side of the vehicle. Therefore, the inner rear end edge W1 of the wheel W is supported by the first top portion P1.

Further, since the dash cross member 16, which is secured by welding to the dash lower 62, exists substantially under the first top portion P1 (the same position in the vehicle front-rear direction) (see FIG. 5), the inner rear end edge W1 of the wheel W is also supported by the dash cross member 16. Hereby, the wheel W is further restricted from moving rearwardly.

Figure 8:
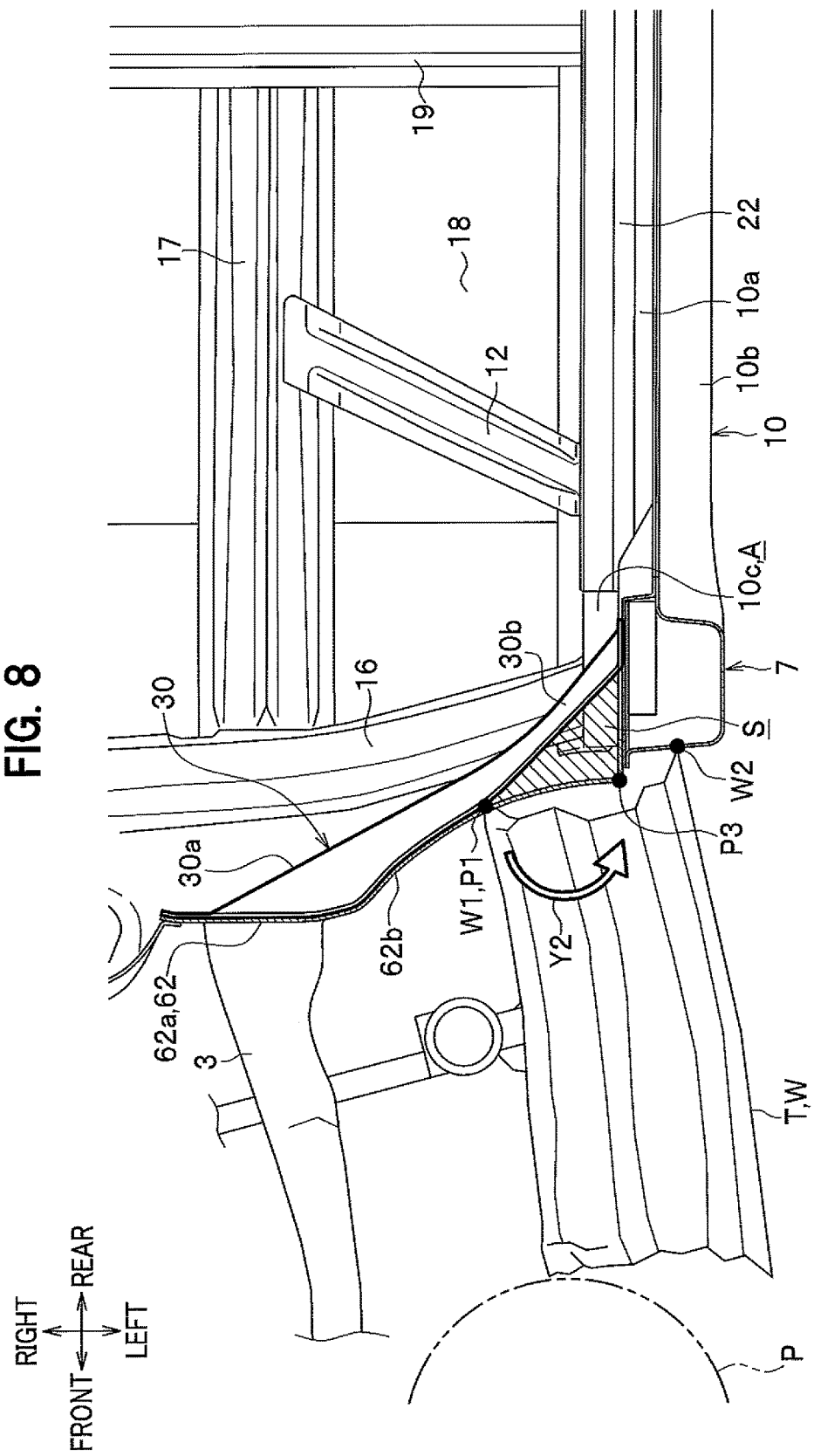
FIG. 8 is a plan view showing a middle state when the vehicle applied with the vehicle body bottom structure according to the present embodiment has the narrow offset collision with the utility pole.

As shown in FIG. 8, when the wheel W is further pushed by the utility pole P1, the wheel W rotates about the first top portion P1 toward the outside of the vehicle (refer to an arrow Y2 in FIG. 8). Hereby, an outer rear end edge W2 of the wheel W is guided to the front surface of the front pillar 7 and the front end portion 10c (crushing area A) of the side sill 10, and the crushing space S is disposed between the inner rear end edge W1 and the outer rear end edge W2 of the wheel W.

Figure 9:
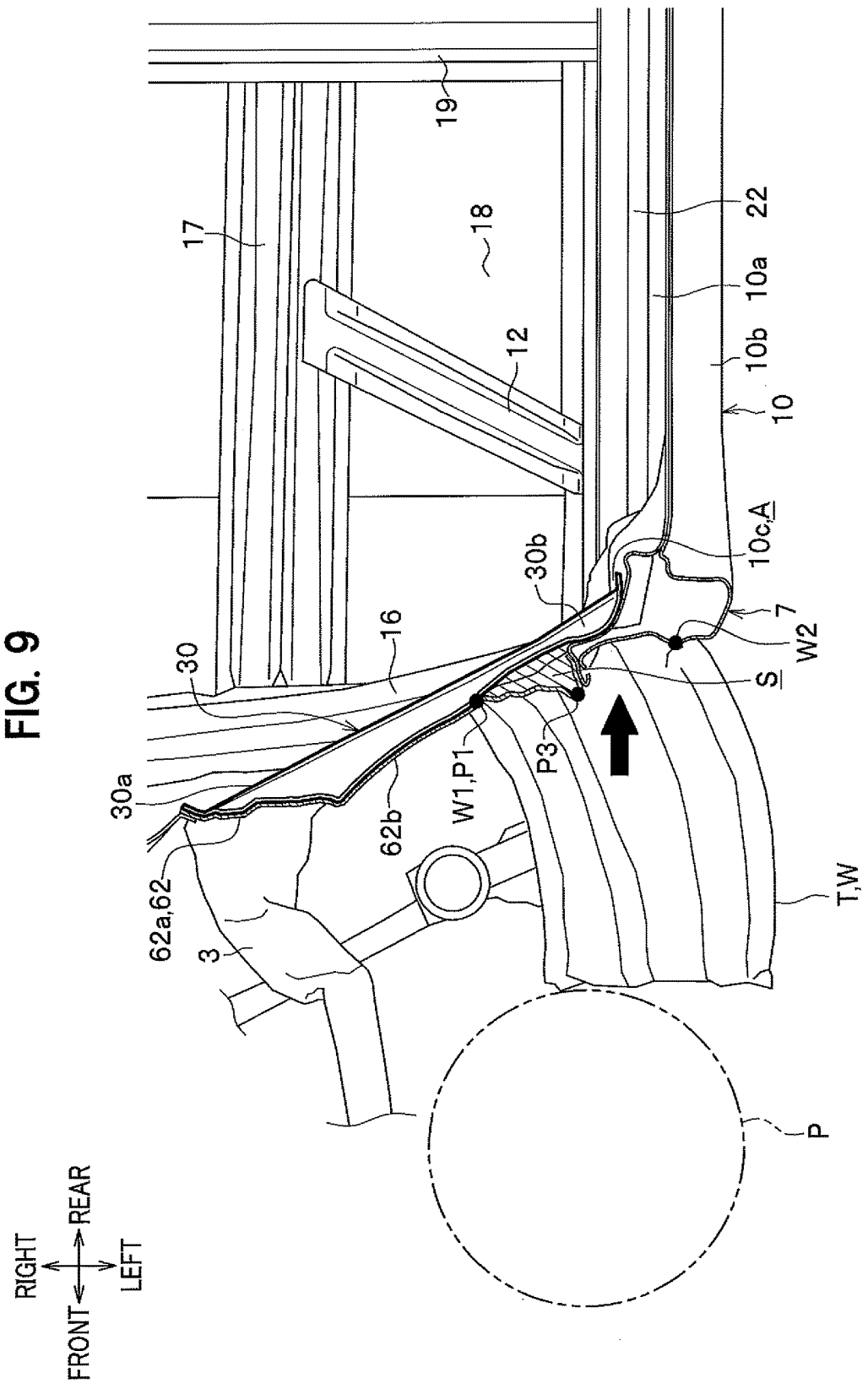
FIG. 9 is a plan view showing a late state when the vehicle applied with the vehicle body bottom structure according to the present embodiment has the narrow offset collision with the utility pole.

As shown in FIG. 9, when the wheel W is further pushed by the utility pole P, the crushing space S is crushed by a rear end surface of the wheel W. Therefore, since the crushing space S can be sufficiently crushed by the wheel W, it is possible to improve absorption performance for the collision load. Further, since the front pillar 7 and the crushing area A are crushed by the outer rear end edge W2 of the wheel W, it is possible to further absorb the collision load.

Further, since the front pillar 7 and the crushing area A are crushed to restrict the retraction of the front pillar 7 itself, it is possible to reduce a retraction amount of a front-side mounting portion of a door (not shown) provided on the front pillar 7, thereby eliminating a disadvantage that opening and closing of the door is difficult.

As described above, since a vehicle body bottom structure b1 according to the present embodiment includes the crushing space S surrounded by the wheel housing portion 62b of the dash lower 62, the dashboard spacing portion 30b of the gusset 30, and the front pillar inner 7a of the front pillar 7, the crushing space S is crushed by the wheel W in the wheel house WH at the time of the narrow offset collision, and the collision load is absorbed. Therefore, the collision load transmitted to the front pillar 7 is reduced, and the retraction of the front pillar 7 is restricted. As a result, since the retraction amount of the front side mounting portion of the unillustrated door provided on the front pillar 7 is reduced, it is possible to eliminate the disadvantage that opening and closing of the door is difficult.

<Second Embodiment>

Next, a second embodiment of the present invention will be described in detail with reference to the accompanying drawings appropriately. Note that, "front and rear" and "up and down" indicated by arrows in each FIG. respectively indicate the vehicle front-rear direction and the vehicle up-down direction, and "left and right" indicates the left-right direction (vehicle width direction) viewed from the driver's seat. Further, in the present embodiment, a longitudinal cross-section means a vertical cross-section. Note that, since a gusset 30 has the same structure as the first embodiment, a detailed description thereof will be omitted.

Figure 10:
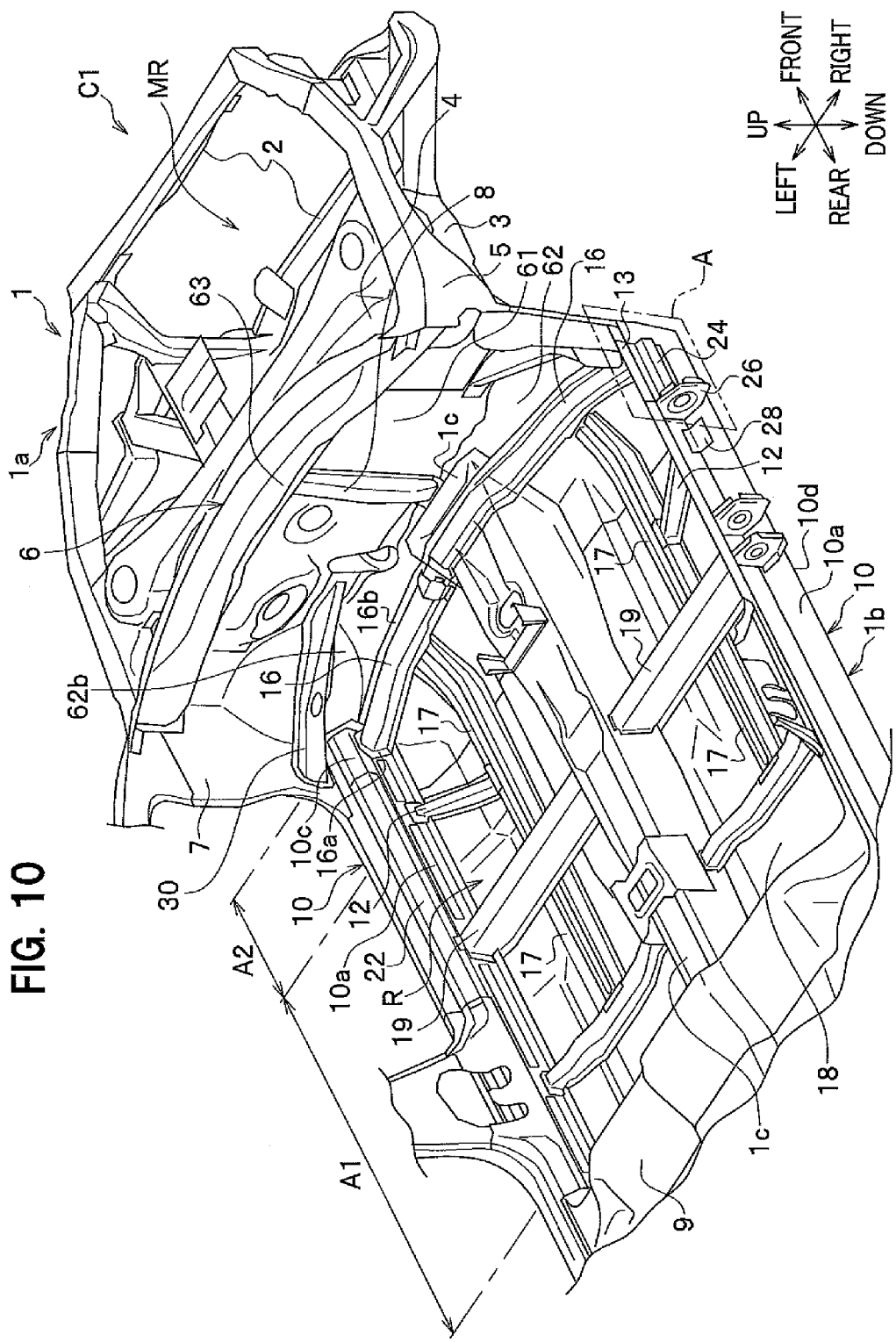
FIG. 10 is a perspective view of a vehicle body front portion applied with a vehicle body bottom structure according to an embodiment of the present invention.

As shown in FIG. 10, a vehicle C1 is made of an automobile, which includes a power mounted room MR disposed in a vehicle body front portion 1a, and a vehicle compartment R disposed to be separated by a partition wall 6 from the power mounted room MR. The automobile includes an automobile such as a FR (Front engine Rear drive) type, a FF (Front engine Front drive) type, and a four wheel drive type. Incidentally, as for the vehicle C1 which is applied with the present invention, it is sufficient to have a pair of left and right side sills 10 disposed on the left and right outsides of a vehicle body 1, and a floor frame 17 disposed on the vehicle body center side of the side sills 10. Hereinafter, a case of the FR type automobile will be described as an example.

As shown in FIG. 10, the vehicle body 1 is for forming the entire vehicle C1, and mainly includes, for example, a variety of metallic vehicle body frames such as a side sill 10, the floor frame 17, and a front side frame 3, metallic vehicle body panels (not shown) such as an engine hood and a fender panel, and a bumper face made of resin or metal.

The vehicle body front portion 1a and a vehicle body bottom portion 1b of the vehicle body 1 respectively includes components such as a front bulkhead 2, a bumper beam (not shown), the front side frame 3, a windshield lower 4, a front wheel house upper member 5, the partition wall 6, a front pillar 7, the side sill 10, a reinforcing frame 12, the floor frame 17, a jack-up reinforcing plate 13, an outrigger 20, a dash cross member 16, and the like, which will be described later. The components are provided to extend in a vehicle front-rear direction in a left-right pair, or are laterally disposed to be substantially bilaterally symmetrical. Since the vehicle body bottom portion 1b is arranged to be substantially bilaterally symmetrical in this manner, hereinafter, the left side part of the vehicle body 1 will be mainly described, and the description of the right side part of the vehicle body 1 will be omitted.

The power mounted room MR is, for example, a housing space, in which a power unit (not shown) composed of an electric motor, an engine, a transmission, and the like is disposed, and is defined by panel members and frames which are arranged in a periphery of the housing space. In the power mounted room MR, the front bulkhead 2, the bumper beam (not shown), and the like are disposed on the front side, and the partition wall 6 is disposed on the rear side. Further, on the left and right upper sides of the power mounted room MR, the windshield lowers 4, the front wheel house upper members 5, the front pillars 7, and the like are disposed. On the left and right lower sides of the power mounted room MR, a pair of front side frames 3 extending in the front-rear direction of the vehicle body 1 is disposed.

As shown in FIG. 10, the front bulkhead 2 is a frame member made of a frame body having a substantially rectangular shape so as to surround a radiator (not shown) in a vehicle body front portion of the power mounted room MR, and the whole is disposed in the vehicle width direction.

Figure 12:
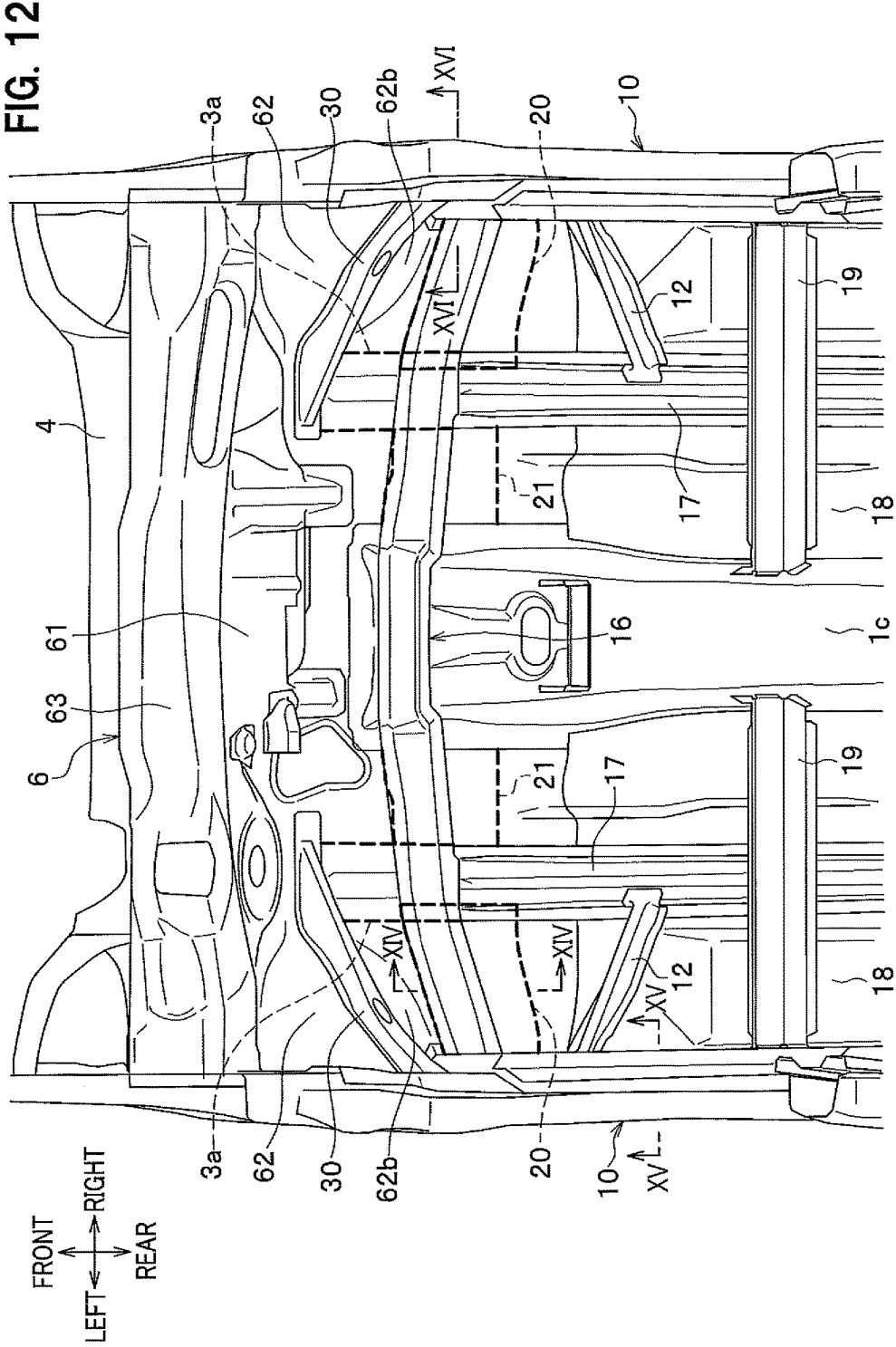
FIG. 12 is a plan view of the vehicle body front portion including a front end of the side sill.
Figure 13:
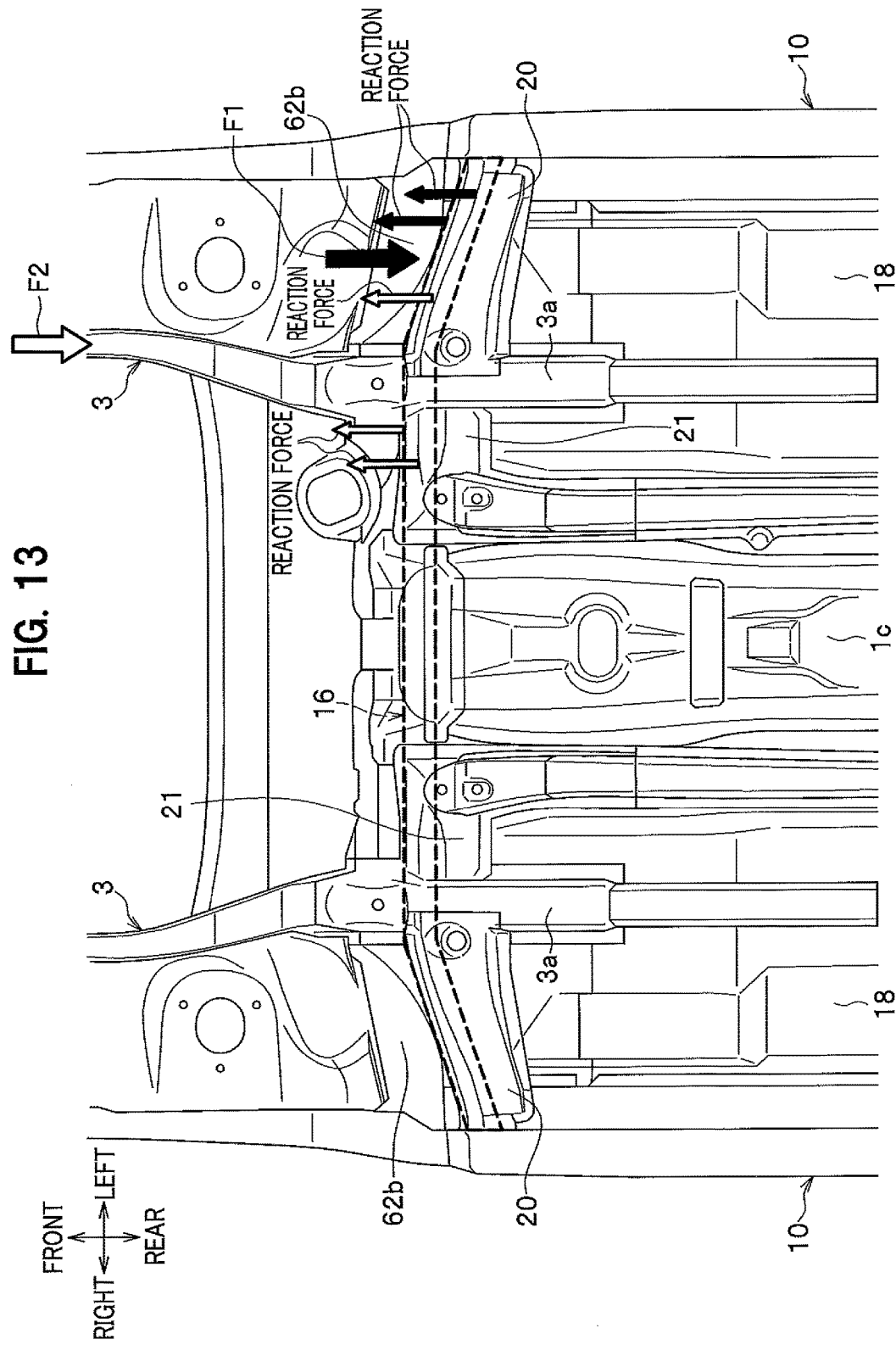
FIG. 13 is a bottom view of the vehicle body front portion including a front end of the side sill.

As shown in FIG. 10, the front side frame 3 is a pair of left and right frame members, each of which is disposed in the vehicle body front portion 1a and extends in the front-rear direction of the vehicle body 1, and is, for example, composed of a steel rectangular pipe material or the like of a cross-sectional rectangular shape (rectangular tube shape) having a rigidity up to a rear end from a front end thereof. To the front end of the front side frame 3, the bumper beam is connected via a bumper beam extension which is not shown. As shown in FIG. 12 or 13, the floor frame 17 is provided consecutively to a rear end portion 3a of the front side frame 3 and extends toward the rear, and an end portion on the vehicle interior side of the outrigger 20 extending in the vehicle width direction is joined. Besides, the partition wall 6 is bridged between the front side frames 3, 3.

The front wheel house upper member 5 is a frame member disposed in the vehicle front-rear direction on the upper side of the vehicle body side portion of the power mounted room MR. The front wheel house upper member 5 is connected to a head upper side of the front bulkhead 2 at a front end thereof, and is connected to the front pillar 7 at a rear end thereof.

As shown in FIG. 10, the partition wall 6 is a partition member for partitioning the vehicle compartment R and the power mounted room MR, and includes, for example, a dash upper 61 made of a steel plate or the like, and a dash lower 62 which is joined to inner side walls of the side sills 10 at left and right end portions thereof. Further, the partition wall 6 includes a vertical member 8 made of a frame member which connects in the up-down direction a cowl portion 63 on an upper end thereof and a tunnel portion 1c of a floor panel 18 on a lower end side thereof, the dash cross member 16 made of a frame member, a reinforcing member for reinforcement, and the like. The dash lower 62 includes a wheel housing portion 62b, which partitions the vehicle compartment R and the power mounted room MR and is made of a curved portion projecting toward the vehicle interior side.

The front pillars 7 are frame members, which are provided to extend from front end portions 10c (crushing areas A) of the side sills 10 disposed in the vehicle body bottom portion 1b up to left and right side portions of a windshield (not shown) over the front end portions 10c. As described later, an upper end of the jack-up reinforcing plate 13 is joined to a lower end of a front pillar inner 7a.

As shown in FIG. 10, the side sill 10 is a hollow frame member, which is provided to extend in the vehicle front-rear direction along an outside end portion in the vehicle width direction of the floor panel 18 of the vehicle body 1 from a lower end portion of the front pillar 7, and made of a metal plate such as a steel plate of a substantially rectangular shape in a vertical cross-sectional view. In the side sill 10, a side sill inner 10a, which is disposed inside the vehicle body and is made of a high-strength steel plate substantially U-shaped in a vertical cross-sectional view, and a side sill outer 10b, which is disposed outside the vehicle body and is substantially U-shaped in a vertical cross-sectional view, are joined to each other so as to form a closed cross-section 34 (see FIG. 16).

Figure 15A:
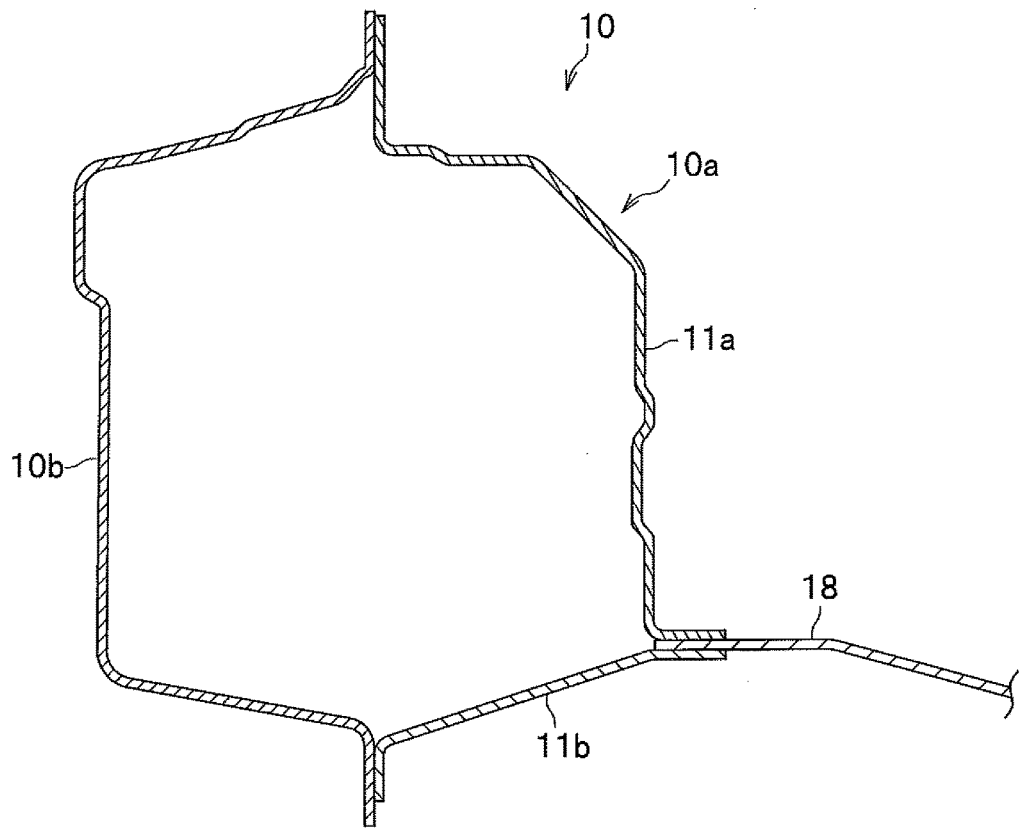
FIG. 15A is an end view taken along a line XV-XV in FIG. 12.
Figure 15B:
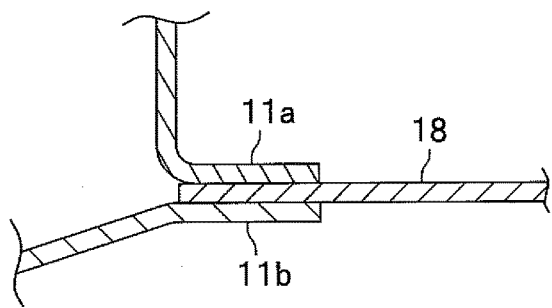
FIG. 15B is a partial cross-sectional view of a range A1 in FIG. 10.

Further, as shown in FIG. 15A, the side sill inner 10a is configured to be divided into two parts of a side sill inner upper 11a having a high strength at an upper portion side thereof and a side sill inner lower 11b having a low strength at a lower portion side thereof. In a range A1 (see FIG. 10) in the front-rear direction of the side sill 10, up to a rear floor cross member 9 from a joint site between the side sill inner 10a and the reinforcing frame 12, as shown in FIG. 15B, the floor panel 18 is sandwiched to be clamped between the side sill inner upper 11a and the side sill inner lower 11b. Further, three pieces of stacked members of the side sill inner upper 11a, the floor panel 18, and the side sill inner lower 11b are, for example, joined together by welding, and thus it is possible to restrict deformation of the side sill inner 10a to the vehicle interior side by increasing a proof stress against a shearing load at the time of the narrow offset collision.

Figure 15C:
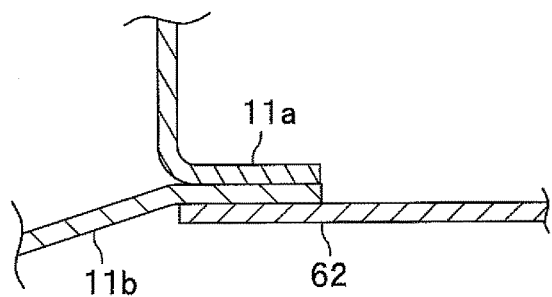
FIG. 15C is a partial cross-sectional view of a range A2 in FIG. 10.

On the other hand, in a range A2 (see FIG. 10) in the front-rear direction of the side sill 10, up to the gusset 30 in the front from a joint site between the side sill inner 10a and the reinforcing frame 12, as shown in FIG. 15C, the dash lower 62 is, for example, integrally joined by welding to a bottom surface of the joint site between the side sill inner upper 11a and the side sill inner lower 11b.

Figure 11:
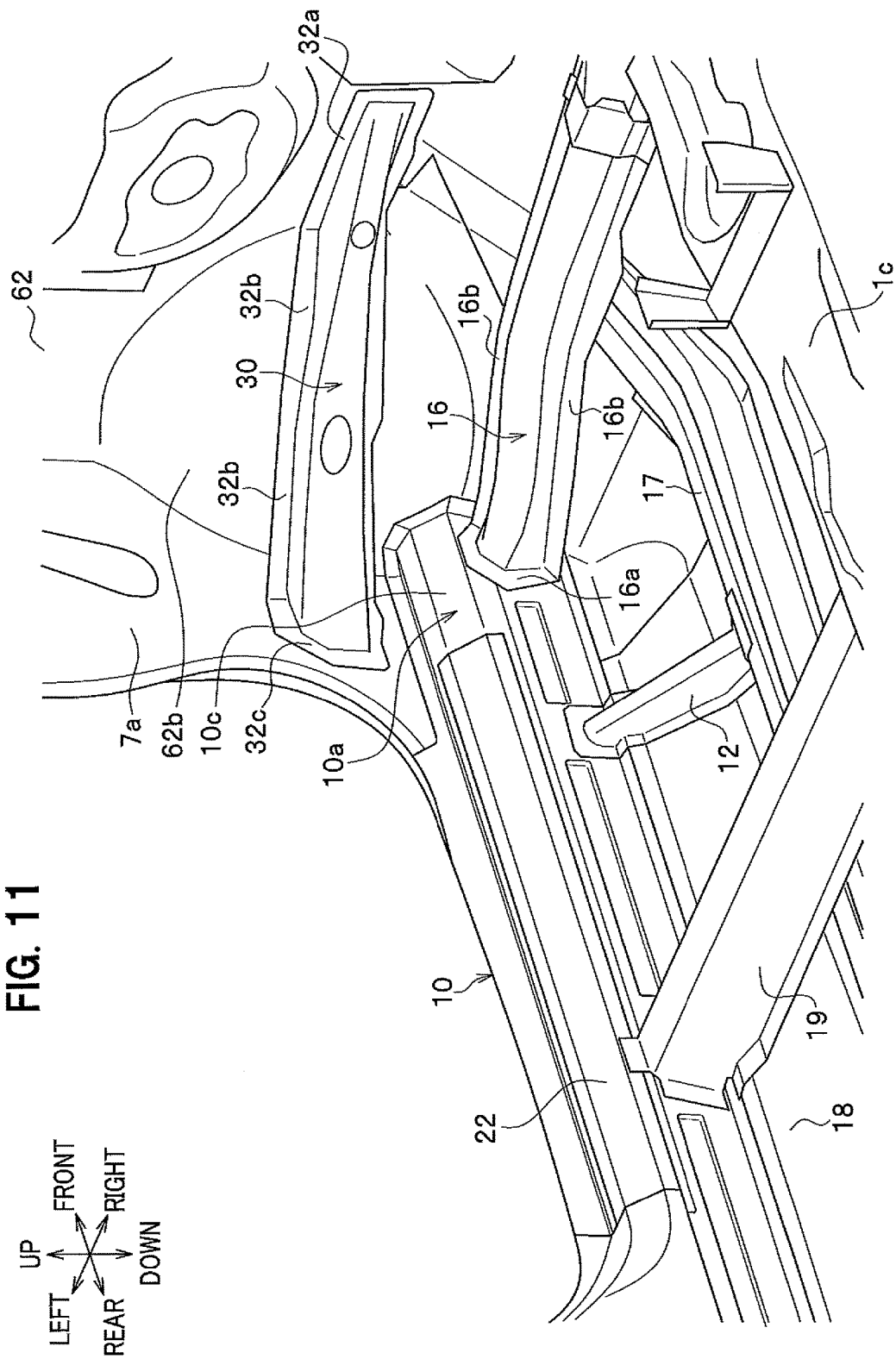
FIG. 11 is a partially enlarged perspective view including a left side sill of the vehicle body front portion shown in FIG. 10.

Further, as shown in FIGS. 10 and 11, the side sill inner 10a (side sill inner upper 11a) is provided with a deformation restricting member 22 extending in the front-rear direction. The front end in the front-rear direction of the deformation restricting member 22 extends up to a substantially central portion of the crushing area A (see FIG. 10), and the rear end of the deformation restricting member 22 extends up to a rear end of the side sill inner 10a. By providing this deformation restricting member 22, it is possible to restrict bending deformation of a deformable member 24 to be described later toward the vehicle interior side.

The crushing area A is provided at the most forward position of the front end portion 10c of the side sill 10, and a jack-up reinforcing plate 13 and the deformable member 24 are provided to be integrally joined to the crushing area A. A bulkhead 26 and a side sill reinforcing bracket 28 are provided inside a zone behind the crushing area A.

A front side of the front end portion 10c of the side sill 10 is connected to the lower end of the front pillar 7, and the outrigger 20 is connected to the rear end portion 3a of the front side frame 3 in the vehicle width direction substantially perpendicular to the front side frame 3. Further, in the front end portion 10c of the side sill 10, the bulkhead 26 is provided behind the crushing area A to be described later so as to partition the inside of the side sill 10 in the front-rear direction. The vehicle interior side surfaces of the side sills 10 are joined with the dash cross members 16, the outriggers 20, and the reinforcing frames 12, which are respectively arranged in the vehicle width direction, and hold the left and right end portions of the floor panel 18.

Figure 16:
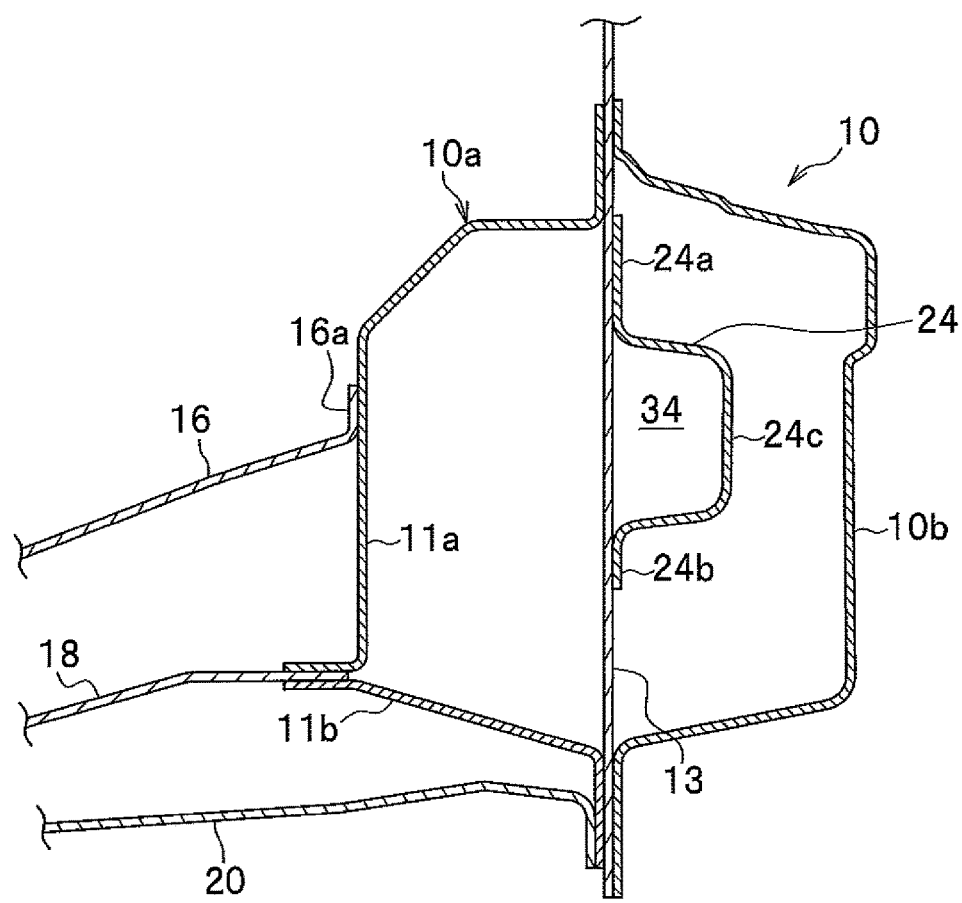
FIG. 16 is an end view taken along a line XVI-XVI in FIG. 12.

As shown in FIG. 16, in the lower portion of the front pillar 7, the jack-up reinforcing plate 13 is clamped between the side sill inner 10a and the side sill outer 10b, and the outrigger 20 extends to the outside ("LEFT" side in FIG. 16) of the dash cross member 16 in the left-right direction, so that four members composed of the side sill inner lower 11b, the jack-up reinforcing plate 13, the side sill outer 10b, and the outrigger 20 are, for example, joined by spot welding. By joining the four members as described above, it is possible to increase a coupling strength between the front end portion 10c of the side sill 10 and the dash cross member 16.

As shown in FIG. 10, the bulkhead 26 is a reinforcing member for reinforcing the front end portion 10c of the side sill 10 on the rear side of the crushing area A, and is made of a metallic plate member disposed so as to form a knot in the side sill 10. The bulkhead 26 is provided in order to prevent the U-shaped vertical cross-section of the side sill inner 10a from being open or recessed to crush, in particular, at the time of the narrow offset collision.

The bulkhead 26 has a function of restricting cross-sectional deformation 24 due to the collision load by supporting the side sill inner 10a from the vehicle compartment side so as to concentrate the collision load on the crushing area A, as well as transmitting the collision load, which is applied to the side sill 10, to the reinforcing frame 12, so that the collision load is dispersed, at the time of the narrow offset collision.

The crushing area A is, for example, a portion formed to absorb the collision load by crushing upon receiving the collision load when a collision object such as an oncoming vehicle collides with the vehicle C1. The reinforcing frame 12 is connected to a position rearward by a predetermined distance from the front end of the side sill 10, and the strength of the front end portion 10c (crushing area A) in front of the connecting portion is set smaller than the strength obtained by combining the reinforcing frame 12 with the side sill 10 behind the connecting portion.

The crushing area A is composed of a range in the front-rear direction to the front end of the side sill 10 from an installation position (a connecting portion) of the bulkhead 26 provided in the side sill 10, and a range in the up-down direction to the upper end from the lower end of the side sill 10. In the crushing area A, provided is the jack-up reinforcing plate 13 for reinforcing a portion where an unillustrated jack that is used when raising the vehicle body 1 is set.

The jack-up reinforcing plate 13 is made resistant to a load in the up-down direction, for example, by forming a plurality of parallel through-holes of a substantially elliptical shape whose major axis is formed in the up-down direction, and is formed of a metal plate material, which is weak against a load in the front-rear direction, so as to be easily crushed at the time of the narrow offset collision.

The upper end of the jack-up reinforcing plate 13 formed in a substantially rectangular shape in a side view is joined to the lower end of the front pillar inner 7a, and the lower end of the jack-up reinforcing plate 13 is joined to a lower flange 10d (see FIG. 10) provided on a vehicle exterior side surface of the front end portion of the side sill inner 10a.

With this configuration, the crushing area A is provided in a corner portion formed by the lower end of the front pillar inner 7a and the front end of the side sill 10, and the deformable member 24 and the jack-up reinforcing plate 13 provided inside the crushing area A are integrally deformed to be bent at the time of the narrow offset collision, and thus it is possible to increase the absorption amount of the collision energy.

The deformable member 24 having a hat-shaped vertical cross-section is integrally joined to a vehicle exterior side surface of the jack-up reinforcing plate 13. The deformable member 24 is, for example, made of a bent plate which is formed by bending a vertical cross-section thereof in a substantially hat-shape, to form a closed cross-section of a constant cross-section extending in the front-rear direction. The central axis of the bent plate is substantially the same height as the center of the front wheel, and the bent plate is provided to extend by a predetermined length in the front-rear direction.

As shown in FIG. 16, the deformable member includes a pair of upper-side joint flange portion 24a and lower-side joint flange portion 24b, which are respectively joined to the side surface of the jack-up reinforcing plate 13 at upper and lower positions, and a hollow projection portion 24c, which is continuous to the upper-side and lower-side joint flange portions 24a, 24b and forms the closed cross-section 34 together with the side surface of the jack-up reinforcing plate 13.

With the hat-shaped cross-section of the deformable member 24, it is possible to make a difference in strength between the up-down direction and the front-rear direction of the jack-up reinforcing plate 13, thereby achieving all of a jack-up function, weight reduction, and absorption performance for the collision energy.

Note that, in the present embodiment, the bent plate of a hat-shaped vertical cross-section is shown as an example of the deformable member 24, but it is not limited thereto. For example, it is sufficient to have the closed cross-section 34 which extends in the front-rear direction and is made of a constant cross-section, and the hollow projection portion 24c can have various shapes including, for example, a vertical cross-section V-shape, a vertical cross-section U-shape, a vertical cross-section W-shape, a vertical cross-section semi-circular shape, a vertical cross-section arc shape, and a vertical cross-section semi-elliptical shape.

As shown in FIGS. 10 to 12, the reinforcing frame 12 is a reinforcing frame member for receiving the collision load by holding the vehicle interior side surface of the side sill 10, so that the side sill 10 does not deform to be inclined inwardly when the collision object has the narrow offset collision with the vehicle C1. The reinforcing frame 12 is made of a steel plate which is bent by a press or the like in a substantial hat-shape in a vertical cross-sectional view. One end side of the reinforcing frame 12 is joined to an outer surface on the vehicle interior side of an installation site where the bulkhead 26 is provided inside the side sill 10, and the reinforcing frame 12 is provided to be inclined inwardly and rearwardly in the vehicle width direction from the joint portion. The other end side of the reinforcing frame 12 is joined to the floor frame 17.

As shown in FIGS. 10 to 12, the dash cross member 16 is joined to the side sill inner 10a on the front end of the side sill 10. The dash cross member 16 is a lateral bridge member which is laterally bridged in the vehicle width direction between the side sills 10, 10 on both the left and right sides, and is made of a metal thick plate such as a rigid steel plate which is open on the lower side thereof and has a substantially hat-shaped vertical cross-section.

As shown in FIG. 11, the dash cross member 16 is formed with flange portions 16a, 16b for reinforcing and joining, respectively on the left and right end portions and the front and rear lower end portions. Specifically, the joint flange portions 16a, which are formed on both the left and right end portions of the dash cross member 16, are joined to inner side surfaces of the side sills 10, and the joint flange portions 16b, which are formed on the lower end portions of the dash cross member 16, are joined to the dash lower 62, to be provided to extend in the vehicle width direction.

As shown in FIG. 14, the dash lower 62 is clamped between the joint flange portion 16b on the upper side of the dash cross member 16 and the outrigger 20 which is joined to the rear end portion 3a of the front side frame 3, and three of the dash cross member 16, the dash lower 62, and the outrigger 20 are integrally joined to one another in a state of being vertically stacked. Further, the joint flange portion 16b on the lower side of the dash cross member 16 shown in FIG. 14 is joined only to the dash lower 62.

Therefore, the dash lower 62 including the wheel housing portion 62b is clamped between the dash cross member 16 and the outrigger 20, and thus the strength of the wheel housing portion 62b is reinforced. As a result, it is possible to increase a wheel collision reaction force due to the narrow offset collision, thereby reducing a retraction amount of the dash lower 62 toward the rear of the vehicle body.

In other words, as shown in FIG. 12, the dash cross member 16 is coupled along with each of the outrigger 20 and a lateral frame 21, which is joined to the rear end portion 3a of the front side frame 3 and extended in the left and right direction, and thus the dash cross member 16 can support a narrow offset collision load F1 and an offset collision load F2.

Specifically, as shown in FIG. 13, when the narrow offset collision load F1 is applied, reaction forces are respectively generated in the dash cross member 16 and the outrigger 20. Further, when the offset collision load F2 is applied, reaction forces are respectively generated in the dash cross member 16, the outrigger 20, and the lateral frame 21. By the reaction forces generated in this manner, it is possible to support the narrow offset collision load F1 and the offset collision load F2.

As shown in FIG. 11, in corner portions on the left and right of the front end of the vehicle compartment, gusset members 30 made of frame members, which are positioned above the dash cross member 16 and extended in a substantially horizontal direction, are respectively provided. The gusset members 30 is joined to the front pillar inner 7a at one end thereof, and joined to the dash lower 62 at the other end thereof, and further joined to the curving wheel housing portion 62b at a middle portion between one end portion and the other portion thereof.

The gusset 30 includes a third portion 32c which is joined to the front pillar inner 7a, a first portion 32a which is joined to the dash lower 62, a second portion 32b which is provided between the third portion 32c and the first portion 32a and is joined to the wheel housing portion 62b, and a fourth portion 32d between the second portion 32b and the third portion 32c.

Figure 18:
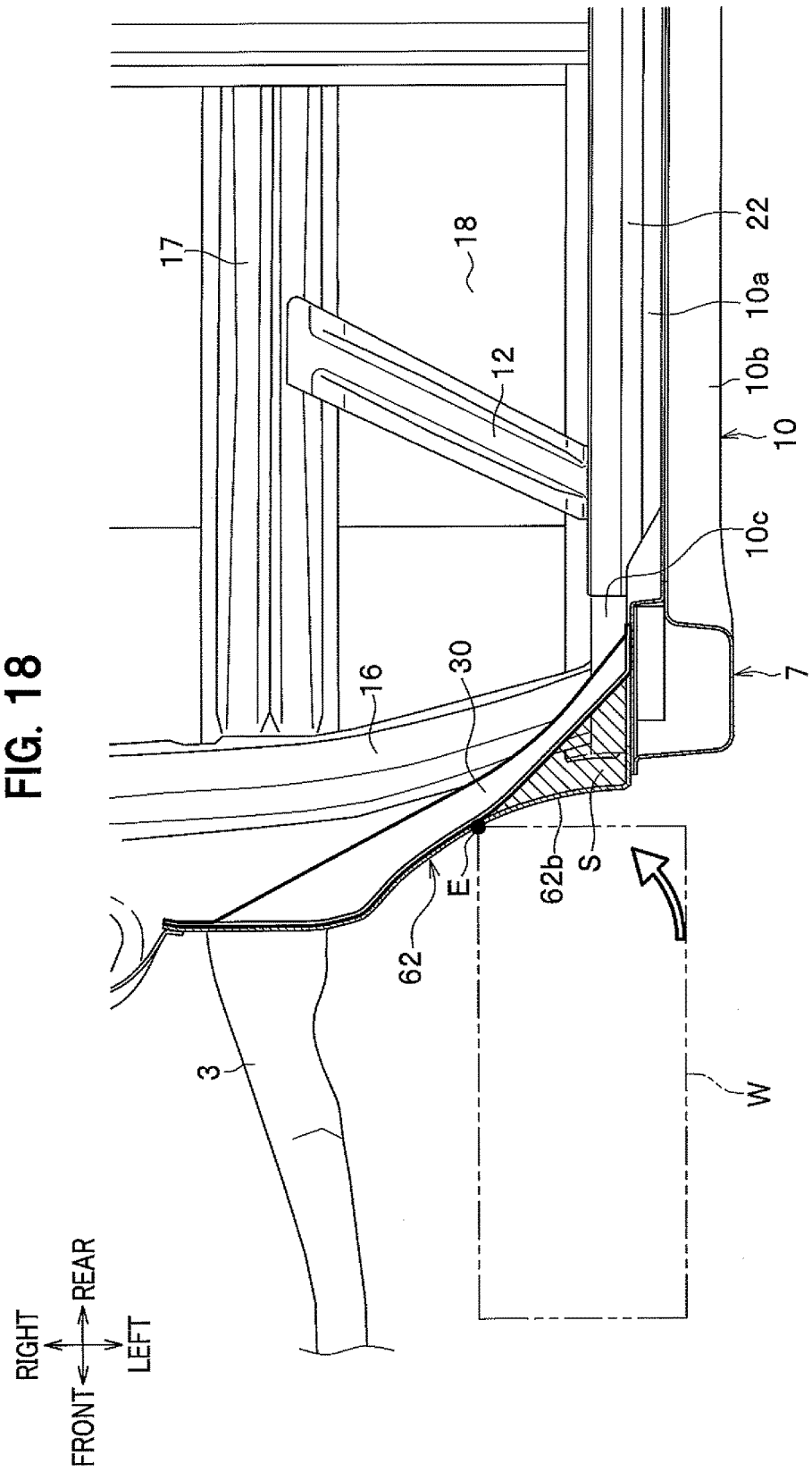
FIG. 18 is a partially cutaway plan view showing a state in which an inner rear end edge is in contact with a gusset member disposed on an upper side of a dash cross member.

For example, at the time of the narrow offset collision, an inner rear end edge E of the wheel W for supporting a tire (not shown) can be supported by two upper and lower members, which are the gusset 30 disposed on the upper side and the dash cross member 16 disposed on the lower side (see FIG. 18).

Specifically, at the time of the narrow offset collision, it is possible to absorb the narrow offset collision load by sufficiently crushing the crushing space S (see FIG. 18), which is formed with the dash lower 62 and the gusset 30 and has a substantially triangular shape in a plan view, and also to support the narrow offset collision load by the dash cross member 16 disposed on the lower side of the gusset 30.

The dash cross member 16 is connected to both the side sill inners 10a, 10a on the front ends of a pair of side sills 10, 10, and thus it is possible to reduce an ingression amount of the front wheel T to the vehicle interior side at the time of the narrow offset collision.

As shown in FIG. 10, the vertical member 8, which connects in the up-down direction the cowl portion 63 and the tunnel portion 1c, is disposed on the dash lower 62, while the dash cross member 16 is joined to the tunnel portion 1c, and thus the tunnel portion 1c is reinforced by the dash cross member 16. As a result, the vertical member 8 and the dash cross member 16 work together, and thus it is possible to generate a sufficient reaction force against a frontal collision load when the vehicle body front portion 1a of the vehicle C1 collides with the collision object, and also to reduce the retraction amount of the dash lower 62 at the feet of passengers. In addition, a load noise can be reduced.

As shown in FIGS. 10 and 12, the floor cross members 19 are frame members made of steel plates having substantially hat-shaped vertical cross-sections, which are respectively bridged between the tunnel portion 1c and the left and right side sills 10, 10. On a bottom surface of a substantially middle portion in the vehicle width direction of each floor cross member 19, each floor frame 17 is disposed to be perpendicular to the corresponding floor cross member 19.

As shown in FIGS. 10 and 12, the floor frames 17 are frame members having substantially hat-shaped vertical cross-sections which hold the floor panel 18 of the vehicle body floor, and are respectively joined to the same positions on both top and bottom floor surfaces of the floor panel 18. The floor frames 17 are connected to rear portions of the front side frames 3 at the front ends thereof, and connected to bottom surfaces of the floor cross members 19 and vehicle interior side joint portions of the reinforcing frames 12 at vehicle body center sides thereof, and are bent outwardly at the rear ends thereof, to be joined to the vehicle interior side surfaces of the left and right side sills 10 at vehicle body outsides thereof.

As shown in FIG. 10, the floor panel 18 is a metal plate member for forming the floor surface of the vehicle compartment R, and is bridged between the tunnel portion 1c and the side sill 10.

Figure 17:
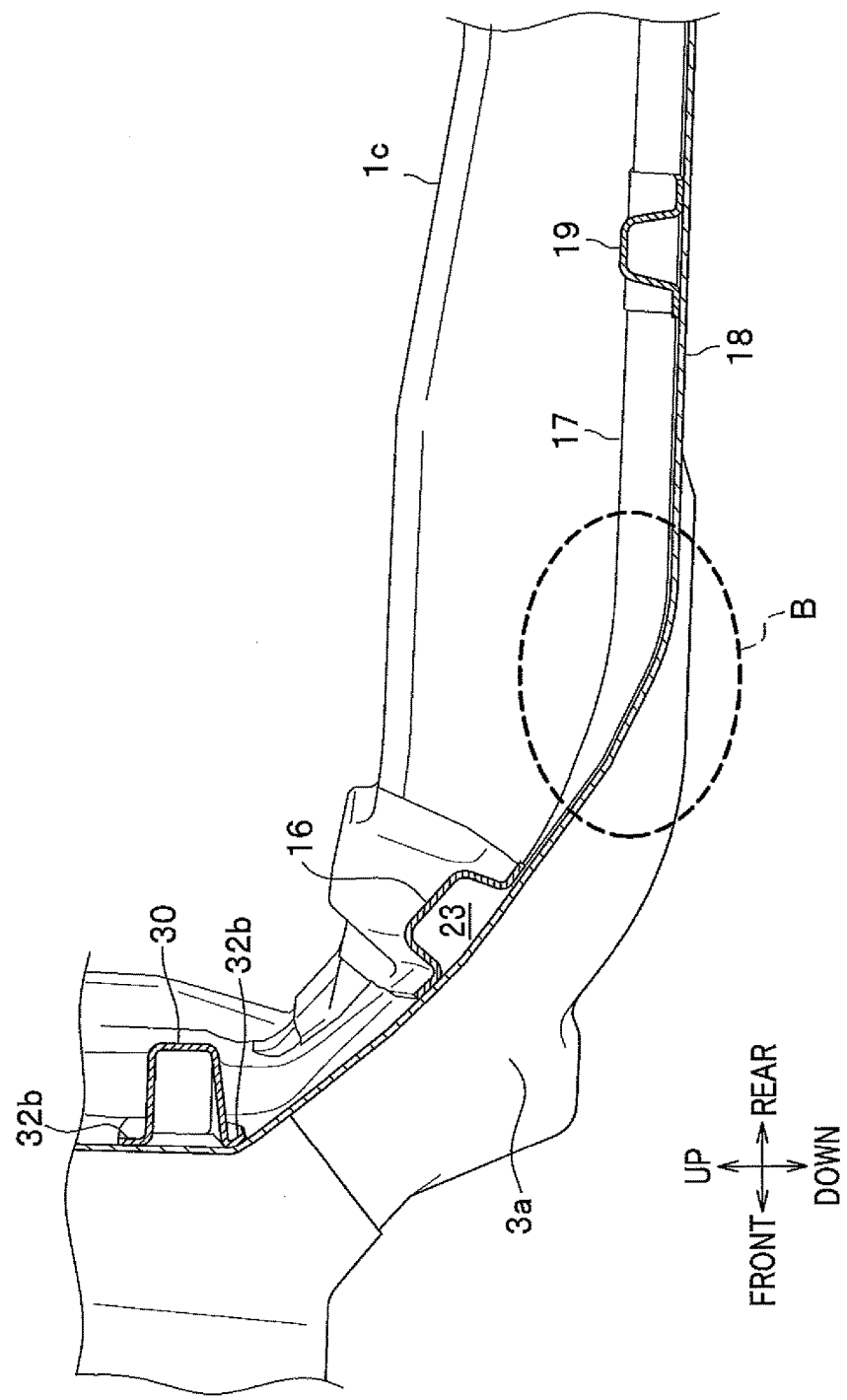
FIG. 17 is a cross-sectional view showing an overlapping portion of a floor frame and a rear end portion of a front side frame.

As shown in FIG. 17, the dash cross member 16 is disposed in a forward position than an overlapping portion B of the floor frame 17 and the rear end portion 3a of the front side frame 3. Therefore, it is possible to ensure a constant closed cross-section 23 such as a rectangular shape, and not to protrude the dash cross member 16 at the feet of passengers.

The vehicle C1, which is applied with the vehicle body bottom structure according to the present embodiment, is basically constructed as described above, and its operation and effects will be described in the following.

FIG. 19A is a perspective view showing the initial state when the vehicle applied with the vehicle body bottom structure according to the present embodiment has the narrow offset collision with the utility pole, and FIG. 19B is a perspective view showing the late state when the vehicle has the narrow offset collision.

As shown in FIGS. 19A and 19B, when the vehicle C1 according to the present embodiment has the narrow offset collision, for example, with a utility pole P which is the collision object, the collision load is transmitted to the left end portion of the front bulkhead 2 on the vehicle body front left side and the outside of the front side frame 3, and the front wheel house upper member 5, the front wheel T, the front pillar 7, the front end portion 10c of the side sill 10, and the jack-up reinforcing plate 13 are pushed toward the rear of the vehicle to be crushed by the utility pole P which is in contact with the vehicle C1. In particular, the utility pole P pushes the wheel W of the front wheel T in front of the side sill 10, and then the wheel W pushes the front end portion 10c of the side sill 10 toward the rear side.

In this case, at a position close to the front end portion 10c of the side sill 10, the crushing area A is formed to improve absorption performance for the collision load, and the bulkhead 26 and the side sill reinforcing bracket 28 are provided inside a zone behind the crushing area A to improve the strength and the rigidity. Furthermore, the vehicle compartment side of the installation site of the bulkhead 26 is supported by the reinforcing frame 12, so that the side sill 10 is restricted from bending toward the vehicle compartment side. Therefore, in the side sill 10, the strengths of the connecting portion of the reinforcing frame 12 and the installation site of the bulkhead 26 are set stronger than that of the crushing area A in front of them.

As a result, the side sill 10 absorbs the collision load by being locally crushed due to the collision load in the crushing area A of the front end portion 10c in front of the installation site of the bulkhead 26, and thus it is possible to appropriately restrict deformation of the rear side of the installation site of the bulkhead 26.

If each crushing area A of the front end portions 10c of the side sills 10, 10 is locally crushed by the collision load, since the wheel housing portion 62b of the dash lower 62 is clamped between the dash cross member 16 and the outrigger 20, and three of the dash lower 62, the dash cross member 16, and the outrigger 20 are integrally joined to one another while being vertically stacked, it is possible to increase the wheel collision reaction force at the time of the narrow offset collision by reinforcing the wheel housing portion 62b, thereby reducing the retraction amount of the dash lower 62 to the vehicle compartment side. At the same time, since the dash cross member 16 is connected to both the side sill inners 10a, 10a of the front portions 10c of the side sills 10, 10, it is possible to reduce the ingression amount of the front wheel T to the vehicle interior side at the time of the narrow offset collision.

Further, since the strength of the installation site of the bulkhead 26 is strong, and the reinforcing frame 12 is connected from the installation site toward the obliquely rearward, the collision load which is applied to the front end portion 10c of the side sill 10 is transmitted to be dispersed to the side sill 10 and the reinforcing frame 12, and the collision load dispersed to the reinforcing frame 12 side is transmitted to the floor frame 17. In other words, the collision load which is applied to the front end portion 10c of the side sill 10 is received by the installation position of the bulkhead 26 in the side sill 10, and thus it is possible to prevent the side sill 10 from bending.

Therefore, in a door opening portion over the side sill 10 behind the crushing area A, since the side sill 10 is not bent, a front side door (not shown) is restricted from being difficult to open, and the shape of the door opening portion is maintained, and thus it is in a state capable of opening and closing the door even after the narrow offset collision. Further, although the side sill 10 is deformed by the collision load in the crushing area A of the front end portion 10c, it is possible to restrict the shape of the door opening portion from being deformed, because the side sill 10 has a structure which is difficult to be deformed at a zone behind the installation position of the bulkhead 26 in the front end portion 10c.

Further, since the reinforcing frame 12 is connected to the side sill 10 at one end thereof and connected to the floor frame 17 at the other end thereof to be bridged therebetween, it is possible to firmly hold the floor surface of the vehicle compartment R.

From the above, with a vehicle body bottom structure according to the present embodiment, at the time of the narrow offset collision or the offset collision, it is possible to facilitate the deformation of the front portion 10c of the side sill 10 to improve absorption performance for the collision load, and is possible to avoid influencing the opening and closing of the door and the shape of the vehicle compartment R, by a further improvement of absorption performance for the collision load with use of the crushing area A of the front end portion 10c of the side sill 10, by an improvement of strength of the rear site of the crushing area A with use of the bulkhead 26, and by prevention of inclination of the side sill 10 with use of the reinforcing frame 12 which supports the vehicle compartment side of the installation site of the bulkhead 26, and the dash cross member 16 which supports the side sill inner 10a of the front end portion 10c to restrict the ingression of the front wheel T to the vehicle interior side.

<Third Embodiment>

Next, a third embodiment of the present invention will be described in detail with reference to the accompanying drawings appropriately. Note that, "front and rear" and "up and down" indicated by arrows in each FIG. respectively indicate the vehicle front-rear direction and the vehicle up-down direction, and "left and right" indicates the left-right direction (vehicle width direction) viewed from the driver's seat. Further, a longitudinal cross-section means a vertical cross-section. Note that, since a gusset 30 has the same structure as the first embodiment, a detailed description thereof will be omitted.

Figure 20:
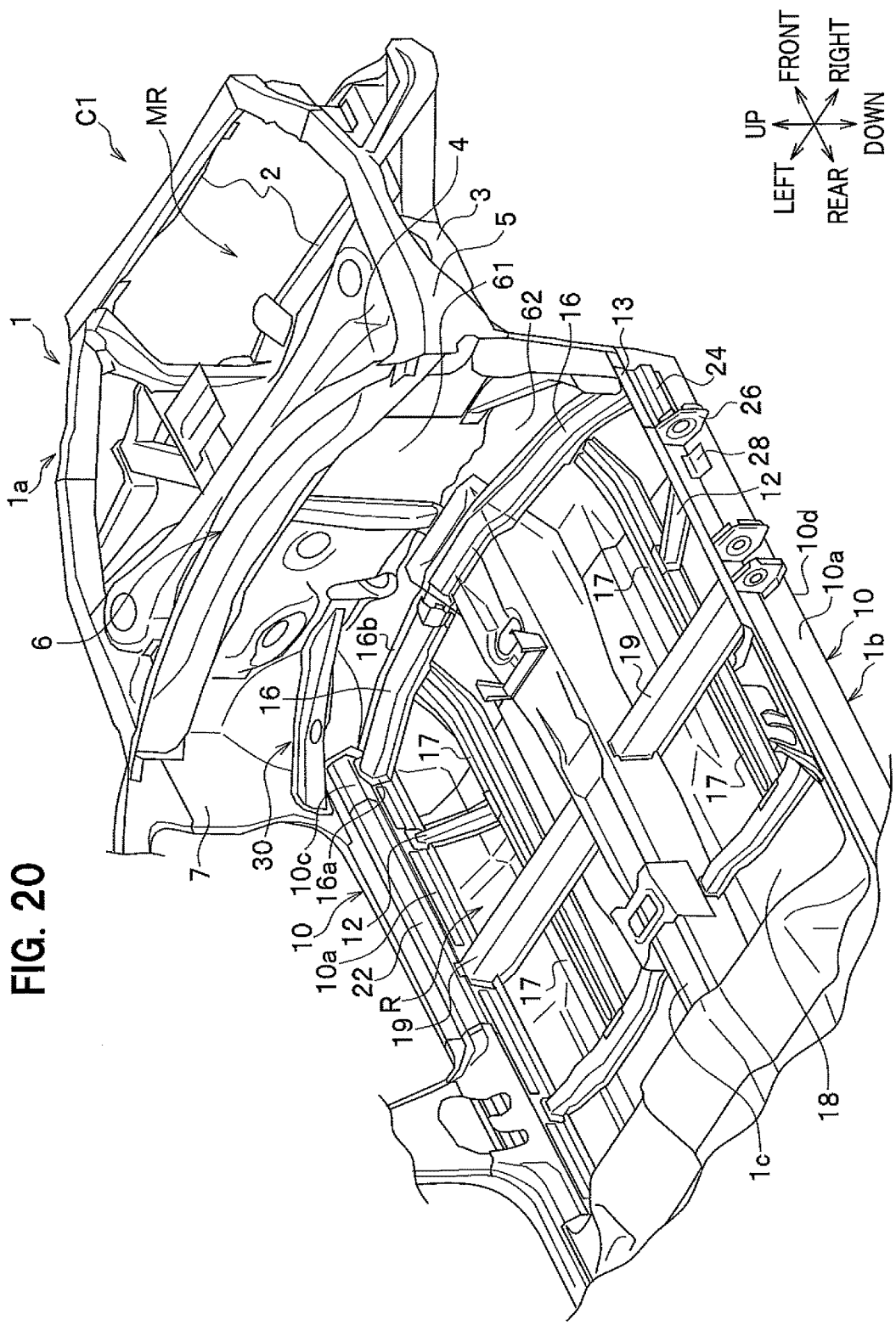
FIG. 20 is a perspective view of a vehicle body front portion applied with a vehicle body bottom structure according to an embodiment of the present invention.

As shown in FIG. 20, a vehicle C1 is made of an automobile, which includes a power mounted room MR disposed in a vehicle body front portion 1a, and a vehicle compartment R disposed to be separated by a partition wall 6 from the power mounted room MR. The automobile includes automobiles such as a FR (Front engine Rear drive) type, a FF (Front engine Front drive) type, and a four wheel drive type.

Incidentally, as for the vehicle C1 which is applied with the present invention, it is sufficient to have a pair of left and right side sills 10 disposed on the left and right outsides of a vehicle body 1, and a floor frame 17 disposed on the vehicle body center side of the side sills 10. Hereinafter, a case in which the vehicle body bottom structure according to the present embodiment is applied to the FR type automobile will be described as an example.

As shown in FIG. 20, the vehicle body 1 is for forming the entire vehicle C1, and mainly includes, for example, a variety of metallic vehicle body frames such as a side sill 10, the floor frame 17, and a front side frame 3, metallic vehicle body panels (not shown) such as an engine hood and a fender panel, and a bumper face made of resin or metal.

The vehicle body front portion 1a and a vehicle body bottom portion 1b of the vehicle body 1 respectively includes components such as a front bulkhead 2, a bumper beam (not shown), the front side frame 3, a windshield lower 4, a front wheel house upper member 5, the partition wall 6, a front pillar 7, the side sill 10, a reinforcing frame 12, the floor frame 17, a jack-up reinforcing plate 13, an outrigger 20 (see FIG. 23), a dash cross member 16, and the like, which will be described later. The components are provided to extend in a vehicle front-rear direction in a left-right pair, or are laterally disposed to be substantially bilaterally symmetrical. Since the vehicle body bottom portion 1b is arranged to be substantially bilaterally symmetrical in this manner, hereinafter, the left side part of the vehicle body 1 will be mainly described, and the description of the right side part of the vehicle body 1 will be omitted.

The power mounted room MR is, for example, a housing space, in which a power unit (not shown) composed of an electric motor, an engine, a transmission, and the like is disposed, and is defined by panel members and frames which are arranged in a periphery of the housing space. In the power mounted room MR, the front bulkhead 2, the bumper beam (not shown), and the like are disposed on the front side, and the partition wall 6 is disposed on the rear side. Further, on the left and right upper sides of the power mounted room MR, the front wheel house upper members 5, the front pillars 7, and the like are disposed. On the left and right lower sides of the power mounted room MR, a pair of front side frames 3 extending in the front-rear direction of the vehicle body 1 is disposed.

As shown in FIG. 20, the front bulkhead 2 is a frame member made of a frame body having a substantially rectangular shape so as to surround a radiator (not shown) in a vehicle body front portion of the power mounted room MR, and the whole is disposed in the vehicle width direction.

As shown in FIG. 20, the front side frame 3 is a pair of left and right frame members, each of which is disposed in the vehicle body front portion 1a and extends in the front-rear direction of the vehicle body 1, and is, for example, composed of a steel rectangular pipe material or the like of a cross-sectional rectangular shape (rectangular tube shape) having a rigidity up to a rear end from a front end thereof. To the front end of the front side frame 3, the bumper beam is connected via a bumper beam extension which is not shown. The floor frame 17 is provided consecutively to a rear end portion of the front side frame 3 and extends toward the rear, and the partition wall 6 is bridged between the front side frames 3, 3.

The front wheel house upper member 5 is a frame member disposed in the vehicle front-rear direction on the upper side of the vehicle body side portion of the power mounted room MR. The front wheel house upper member 5 is connected to a head upper side of the front bulkhead 2 at a front end thereof, and is connected to the front pillar 7 at a rear end thereof.

As shown in FIG. 20, the partition wall 6 is a partition member for partitioning the vehicle compartment R and the power mounted room MR, and is, for example, composed of a dash upper 61 made of a steel plate or the like, a dash lower 62 which is joined to inner side walls of the side sills 10 at left and right end portions thereof, a dash cross member 16 made of a frame member, a reinforcing member for reinforcement, and the like.

The front pillars 7 are frame members, which are provided to extend from front end portions 10c (crushing areas A) of the side sills 10 disposed in the vehicle body bottom portion 1b up to left and right side portions of a windshield (not shown) over the front end portions 10c. As described later, an upper end of the jack-up reinforcing plate 13 is joined to a lower end of a front pillar inner 7a (see FIG. 23).

As shown in FIG. 20, the side sill 10 is a hollow frame member, which is provided to extend in the vehicle front-rear direction along an outside end portion in the vehicle width direction of the floor panel 18 of the vehicle body 1 from a lower end portion of the front pillar 7, and made of a metal plate such as a steel plate of a substantially rectangular shape in a vertical cross-sectional view. In the side sill 10, a side sill inner 10a, which is disposed inside the vehicle body and is made of a high-strength steel plate substantially U-shaped in a vertical cross-sectional view, and a side sill outer 10b, which is disposed outside the vehicle body and has a substantially U-shape in a vertical cross-sectional view, are joined to each other so as to form a closed cross-section 34 (see FIG. 25).

Figure 25:
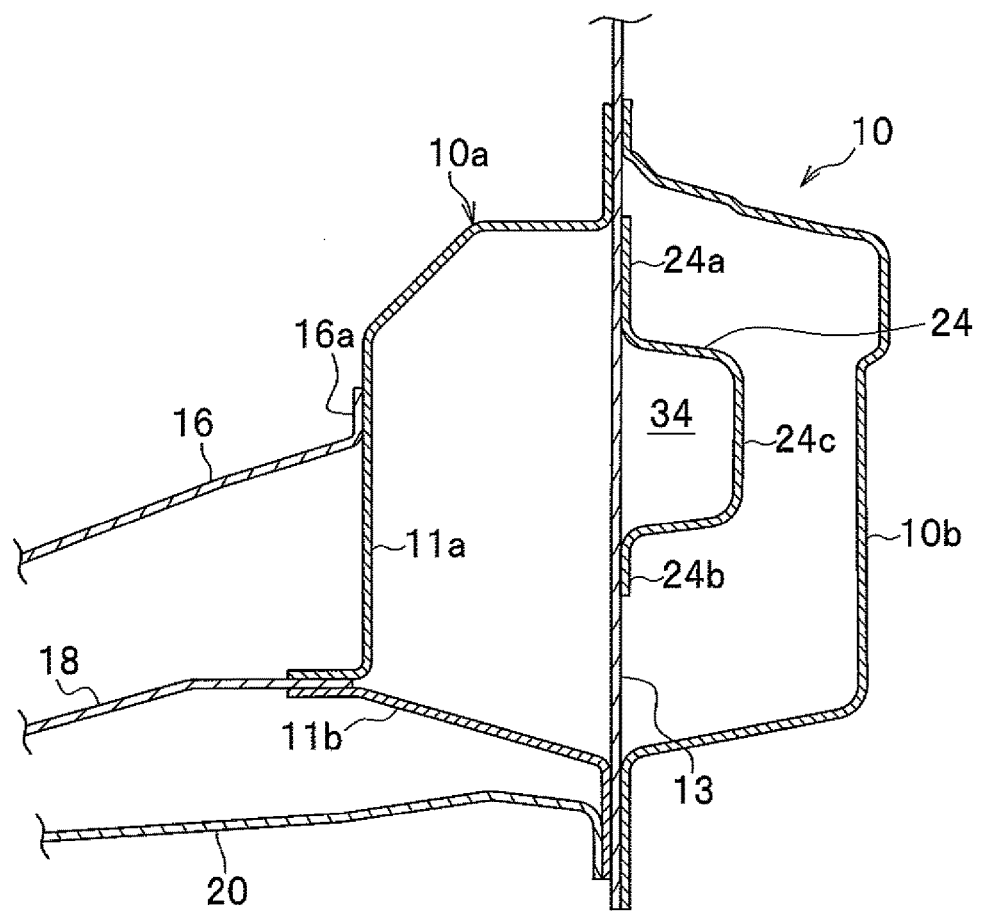
FIG. 25 is an end view taken along a line XXV-XXV in FIG. 24.

Further, as shown in FIG. 25, the side sill inner 10a is configured to be divided into two parts of a side sill inner upper 11a at an upper portion side thereof and a side sill inner lower 11b at a lower portion side thereof. In the present embodiment, the floor panel 18 is sandwiched to be clamped between the side sill inner upper 11a and the side sill inner lower 11b. Further, three pieces of stacked members of the side sill inner upper 11a, the floor panel 18, and the side sill inner lower 11b are, for example, joined together by welding, and thus it is possible to restrict deformation of the side sill inner 10a to the vehicle interior side by increasing a proof stress against a shearing load at the time of the narrow offset collision.

Figure 21:
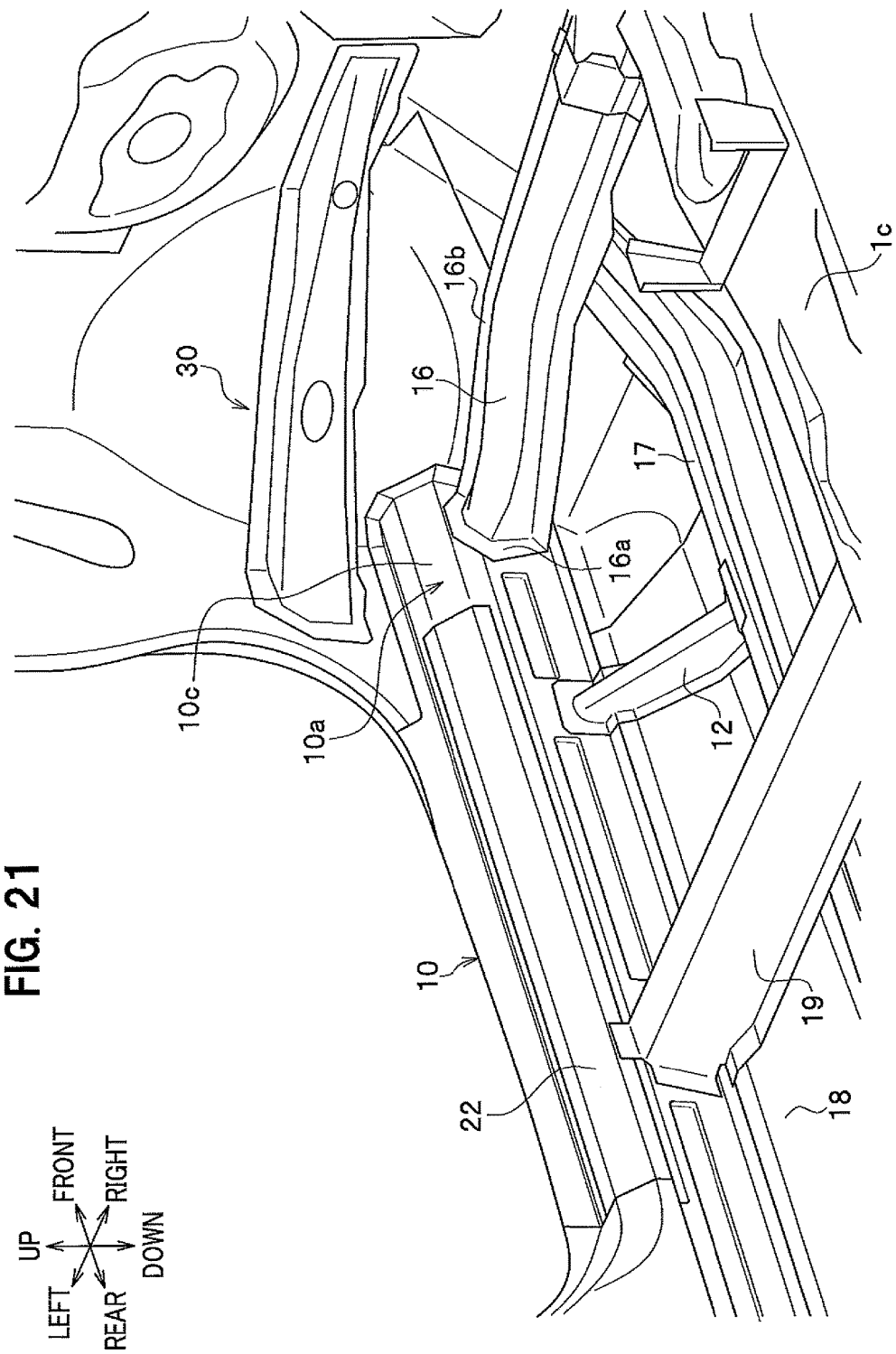
FIG. 21 is a partially enlarged perspective view including a left side sill of the vehicle body front portion shown in FIG. 20.

Further, as shown in FIG. 21, the side sill inner 10a (side sill inner upper 11a) is provided with a deformation restricting member 22 extending in the front-rear direction. The front end in the front-rear direction of the deformation restricting member 22 extends up to a substantially central portion of the crushing area A (see FIG. 23), and the rear end of the deformation restricting member 22 extends up to a rear end of the side sill inner 10a. By providing this deformation restricting member 22, it is possible to restrict bending deformation to the vehicle interior side of a deformable member 24 to be described later.

Figure 23:
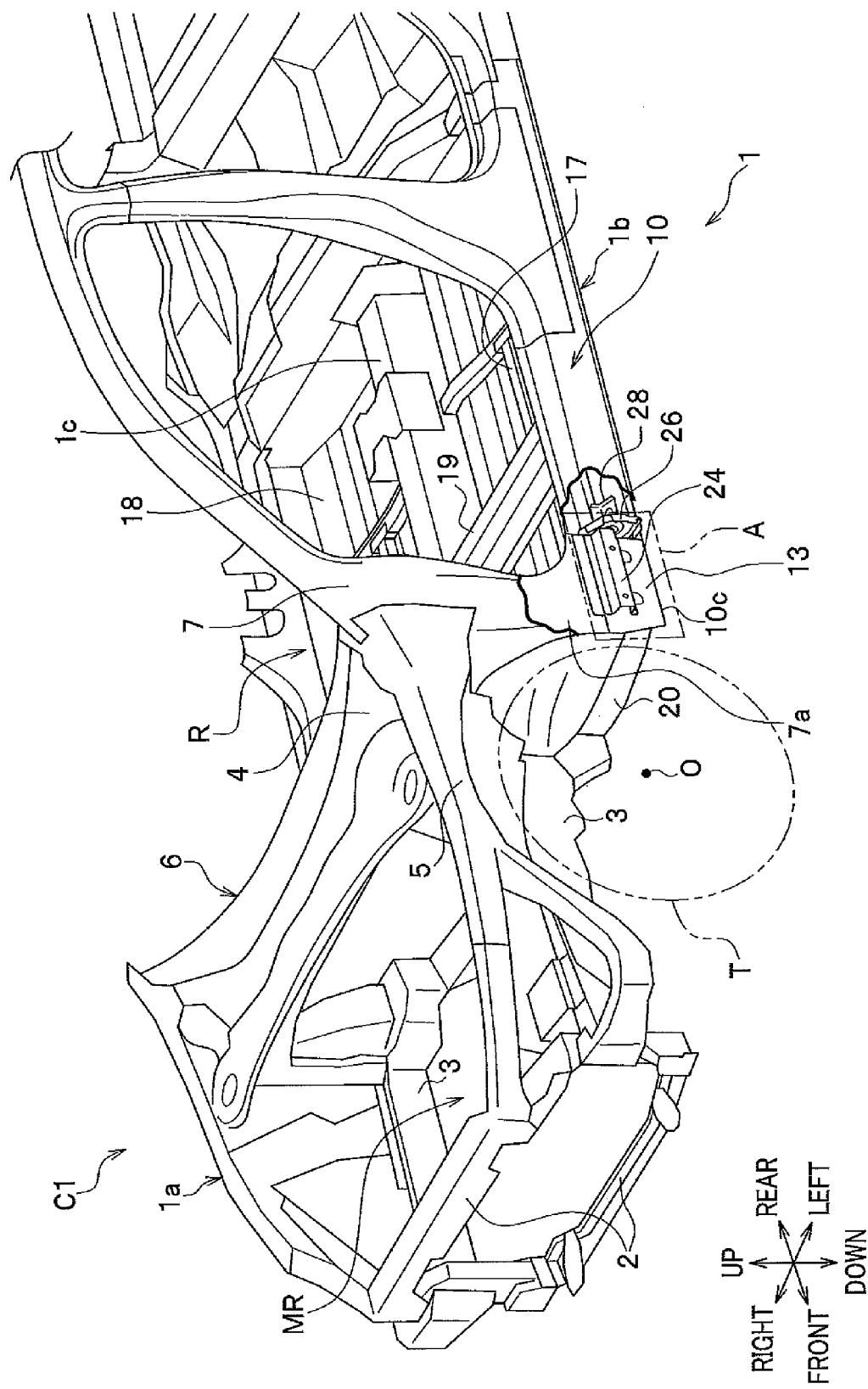
FIG. 23 is a partially cutaway perspective view of the vehicle body front portion viewed from the left front.
Figure 24:
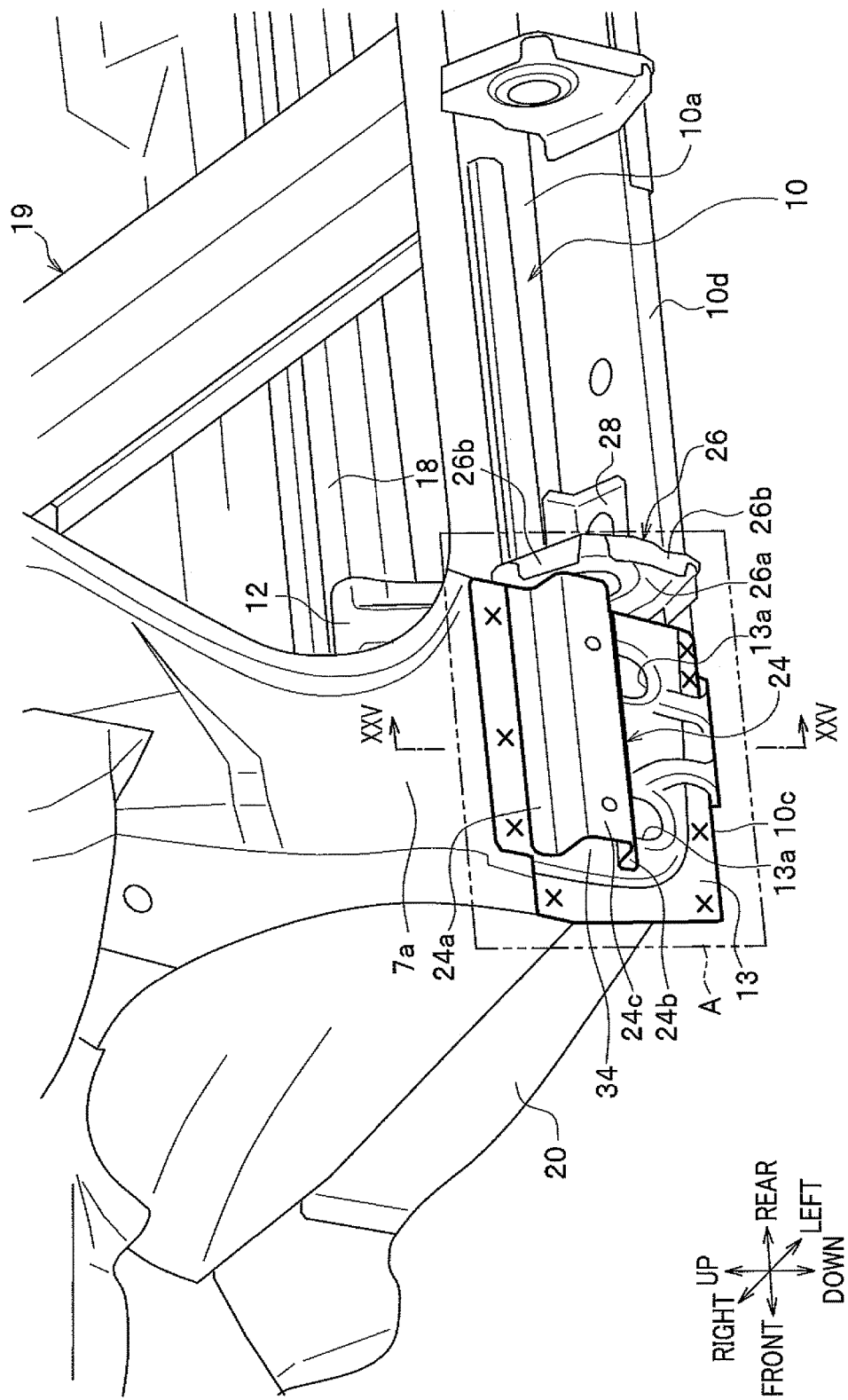
FIG. 24 is a partially enlarged perspective view of the front end portion of the side sill shown in FIG. 23.

As shown in FIGS. 23 and 24, the crushing area A is provided at the most forward position of the front end portion 10c of the side sill 10, and a jack-up reinforcing plate 13 and the deformable member 24 are provided to be integrally joined to the crushing area A. A bulkhead 26 and a side sill reinforcing bracket 28 are provided inside the rear of the crushing area A.

A front side of the front end portion 10c of the side sill 10 is connected to the lower end of the front pillar 7, and the outrigger 20 is connected to the rear end portion of the front side frame 3 in the vehicle width direction substantially perpendicular to the front side frame 3 (see FIG. 23). Further, in the front end portion 10c of the side sill 10, the bulkhead 26 is provided behind the crushing area A to be described later so as to partition the inside of the side sill 10 in the front-rear direction. The vehicle interior side surfaces of the side sills 10 are joined with the dash cross members 16, the outriggers 20, and the reinforcing frames 12, which are respectively arranged in the vehicle width direction, and hold the left and right end portions of the floor panel 18.

As shown in FIG. 24, the bulkhead 26 is a reinforcing member for reinforcing the front end portion 10c of the side sill 10 behind the crushing area A, and is made of a metallic plate member disposed so as to form a knot in the side sill 10. The bulkhead 26 is provided in order to prevent the U-shaped vertical cross-section of the side sill inner 10a from being open or recessed to crush, in particular, at the time of the narrow offset collision. The bulkhead 26 is formed with a partition surface 26a disposed so as to partition the inside of the side sill inner 10a in the front-rear direction, and a flange portion 26b formed by being bent at an outer peripheral edge of the partition surface 26a.

The bulkhead 26 has a function of restricting cross-sectional deformation due to the collision load by supporting the side sill inner 10a from the vehicle compartment side so as to concentrate the collision load on the crushing area A, as well as transmitting the collision load, which is applied to the side sill 10, to the reinforcing frame 12, so that the collision load is dispersed, at the time of the narrow offset collision.

The crushing area A is, for example, a portion formed to absorb the collision load by crushing upon receiving the collision load when a collision object such as an oncoming vehicle collides with the vehicle C1. The reinforcing frame 12 is connected to a position apart rearward by a predetermined distance from the front end of the side sill 10, and the strength of the front end portion 10c (crushing area A) in front of the connecting portion is set smaller than the strength obtained by combining the reinforcing frame 12 with the side sill 10 behind the connecting portion.

The crushing area A is composed of a range in the front-rear direction to the front end of the side sill 10 from an installation position (connecting portion) of the bulkhead 26 provided in the side sill 10, and a range in the up-down direction to the upper end from the lower end of the side sill 10. In the crushing area A, provided is the jack-up reinforcing plate 13 for reinforcing a portion where an unillustrated jack that is used when raising the vehicle body 1 is set.

Figure 22:
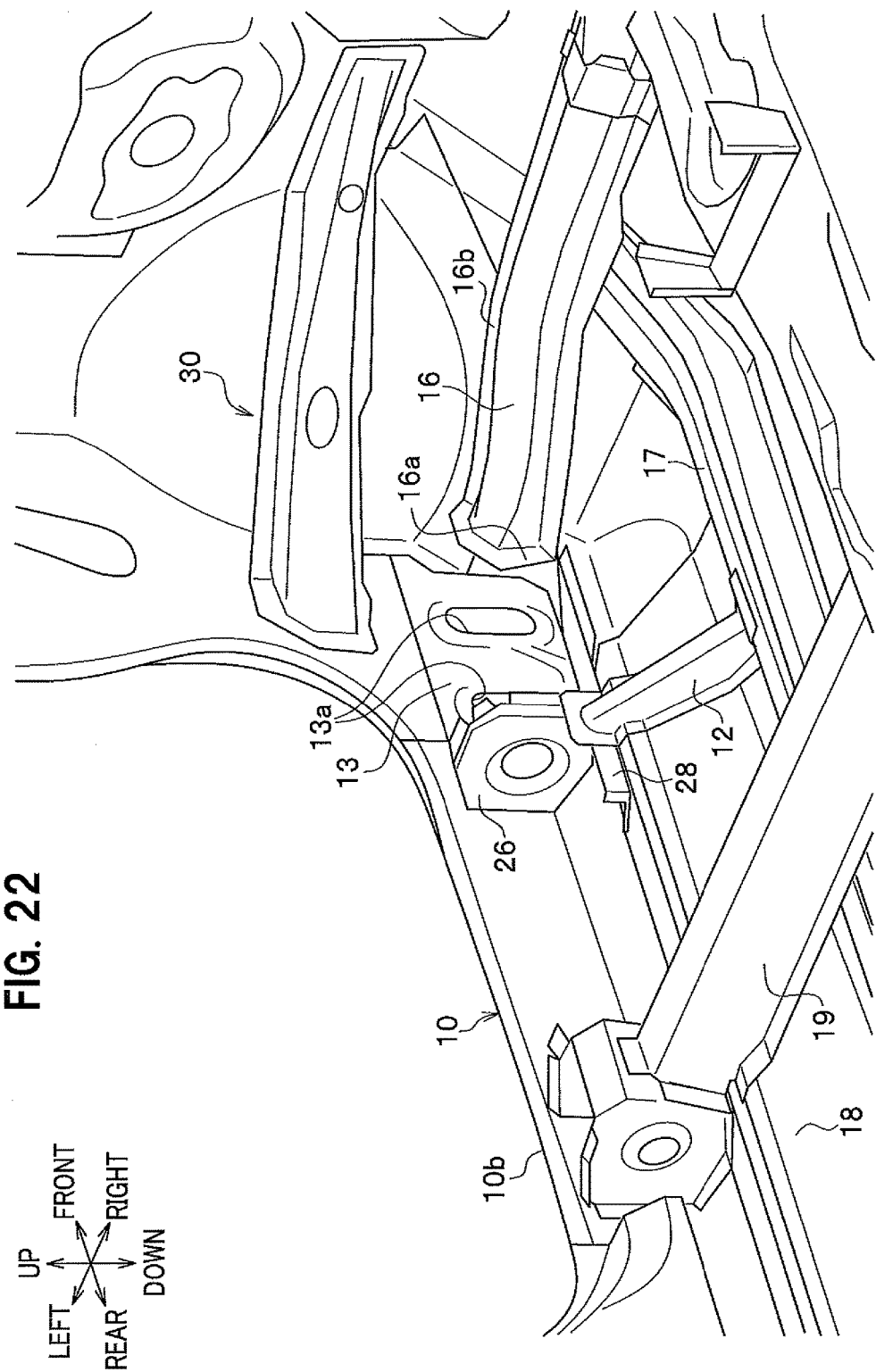
FIG. 22 is a partially enlarged perspective view showing a state in which a side sill inner is removed from the left side sill shown in FIG. 21.

As shown in FIGS. 22 and 24, the jack-up reinforcing plate 13 is made resistant to a load in the up-down direction, for example, by forming a plurality of parallel through-holes 13a of a substantially elliptical shape whose major axis is formed in the up-down direction, and is formed of a metal plate material, which is weak against a load in the front-rear direction, so as to be easily crushed at the time of the narrow offset collision.

The upper end of the jack-up reinforcing plate 13 formed in a substantially rectangular shape in a side view is joined to the lower end of the front pillar inner 7a (see FIG. 24), and the lower end of the jack-up reinforcing plate 13 is joined to a lower flange 10d provided on a vehicle exterior side surface of the front end portion of the side sill inner 10a (see FIG. 25). Incidentally, in FIG. 24, "x" marks respectively show joint portions, for example, in case of spot welding.

With this configuration, the crushing area A is provided in a corner portion formed by the lower end of the front pillar inner 7a and the front end of the side sill 10, and the deformable member 24 and the jack-up reinforcing plate 13 provided inside the crushing area A are integrally deformed to be bent at the time of the narrow offset collision, and thus it is possible to increase the absorption amount of the collision energy. This point will be described in detail later.

The deformable member 24 having a hat-shaped vertical cross-section (see FIG. 25) is integrally joined to a vehicle exterior side surface of the jack-up reinforcing plate 13. The deformable member 24 is, for example, made of a bent plate which is formed by bending a longitudinal cross-section (vertical cross-section) thereof in a substantially hat-shape, to form a closed cross-section 34 of a constant cross-section extending in the front-rear direction. The central axis of the bent plate is substantially the same height as the center O of the front wheel T, and the bent plate is provided to extend by a predetermined length in the front-rear direction (see FIG. 23).

As shown in FIG. 24, the deformable member 24 includes a pair of upper-side joint flange portion 24a and lower-side joint flange portion 24b, which are respectively joined to the side surface of the jack-up reinforcing plate 13 at upper and lower positions, and a hollow projection portion 24c, which is continuous to the upper-side and lower-side joint flange portions 24a, 24b and forms the closed cross-section 34 together with the side surface of the jack-up reinforcing plate 13.

With the hat-shaped cross-section of the deformable member 24, it is possible to make a difference in strength between the up-down direction and the front-rear direction of the jack-up reinforcing plate 13, thereby achieving all of a jack-up function, weight reduction, and absorption performance for the collision energy.

Note that, in the present embodiment, the bent plate of a hat-shaped vertical cross-section is shown as an example of the deformable member 24, but it is not limited thereto. For example, it is sufficient to have the closed cross-section 34 which extends in the front-rear direction and is made of a constant cross-section, and the hollow projection portion 24c can have various shapes including, for example, a vertical cross-section V-shape, a vertical cross-section U-shape, a vertical cross-section W-shape, a vertical cross-section semi-circular shape, a vertical cross-section arc shape, and a vertical cross-section semi-elliptical shape.

As shown in FIGS. 20 to 21, the reinforcing frame 12 is a reinforcing frame member for receiving the collision load while holding the vehicle interior side surface of the side sill 10, so that the side sill 10 does not deform to be inclined inwardly when the collision object has the narrow offset collision with the vehicle C1. The reinforcing frame 12 is made of a steel plate which is bent by a press or the like in a substantial hat-shape in a vertical cross-sectional view. One end side of the reinforcing frame 12 is joined to an outer surface on the vehicle interior side of an installation site where the bulkhead 26 is provided inside the side sill 10, and the reinforcing frame 12 is provided to be inclined inwardly and rearwardly in the vehicle width direction from the joint portion. The other end side of the reinforcing frame 12 is joined to the floor frame 17.

As shown in FIG. 20, the dash cross member 16 is joined to the side sill inner 10a on the front end of the side sill 10.

The dash cross member 16 is a lateral bridge member which is laterally bridged in the vehicle width direction between the side sills 10, 10 on both the left and right sides, and is made of a metal thick plate such as a rigid steel plate which is open on the lower side thereof and has a substantially hat-shaped vertical cross-section.

The dash cross member 16 is formed with flange portions 16a, 16b for reinforcing and joining, respectively on the left and right end portions and the front and rear lower end portions. Specifically, the joint flange portions 16a, which are formed on both the left and right end portions of the dash cross member 16, are joined to inner side surfaces of the side sills 10, and the joint flange portions 16b, which are formed on the lower end portions of the dash cross member 16, are joined to the dash lower 62, to be provided to extend in the vehicle width direction.

The dash cross member 16 is connected to both the side sill inners 10a, 10a on the front ends of a pair of side sills 10, 10, and thus it is possible to reduce an ingression amount of the front wheel T to the vehicle interior side at the time of the narrow offset collision.

As shown in FIG. 20, the floor cross members 19 are frame members made of steel plates having substantially hat-shaped vertical cross-sections, which are respectively bridged between the tunnel portion 1c and the left and right side sills 10, 10. On a bottom surface of a substantially middle portion in the vehicle width direction of each floor cross member 19, each floor frame 17 is disposed to be perpendicular to the corresponding floor cross member 19.

As shown in FIG. 20, the floor frames 17 are frame members having substantially hat-shaped vertical cross-sections which hold the floor panel 18 of the vehicle body floor, and are respectively joined to the same positions on both top and bottom floor surfaces of the floor panel 18. The floor frames 17 are connected to rear portions of the front side frames 3 at the front ends thereof, and connected to bottom surfaces of the floor cross members 19 and vehicle interior side joint portions of the reinforcing frames 12 at vehicle body center sides thereof, and are bent outwardly at the rear ends thereof, to be joined to the vehicle interior side surfaces of the left and right side sills 10 at vehicle body outsides thereof.

As shown in FIG. 20, the floor panel 18 is a metal plate member for forming the floor surface of the vehicle compartment R, and is bridged between the tunnel portion 1c and the side sill 10.

The vehicle C1, which is applied with the vehicle body bottom structure according to the present embodiment, is basically constructed as described above, and its operation and effects will be described in the following.

Figure 26A:
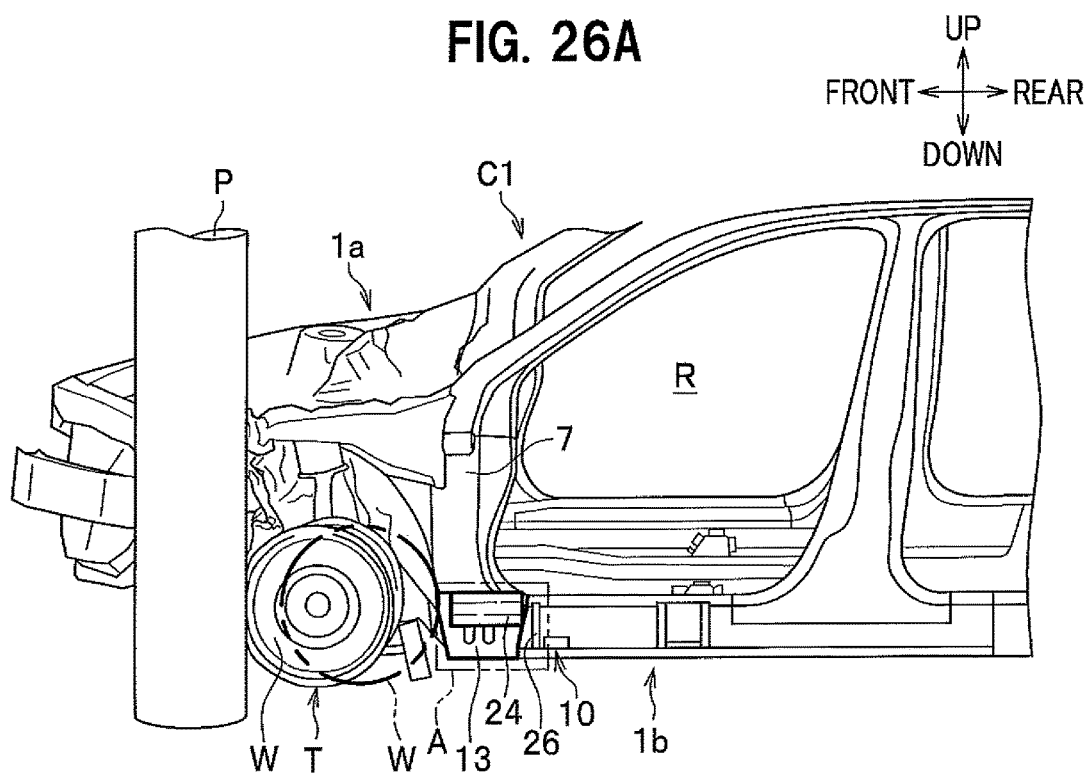
FIG. 26A is a perspective view showing the initial state when the vehicle applied with the vehicle body bottom structure according to the present embodiment has the narrow offset collision with the utility pole.
Figure 26B:
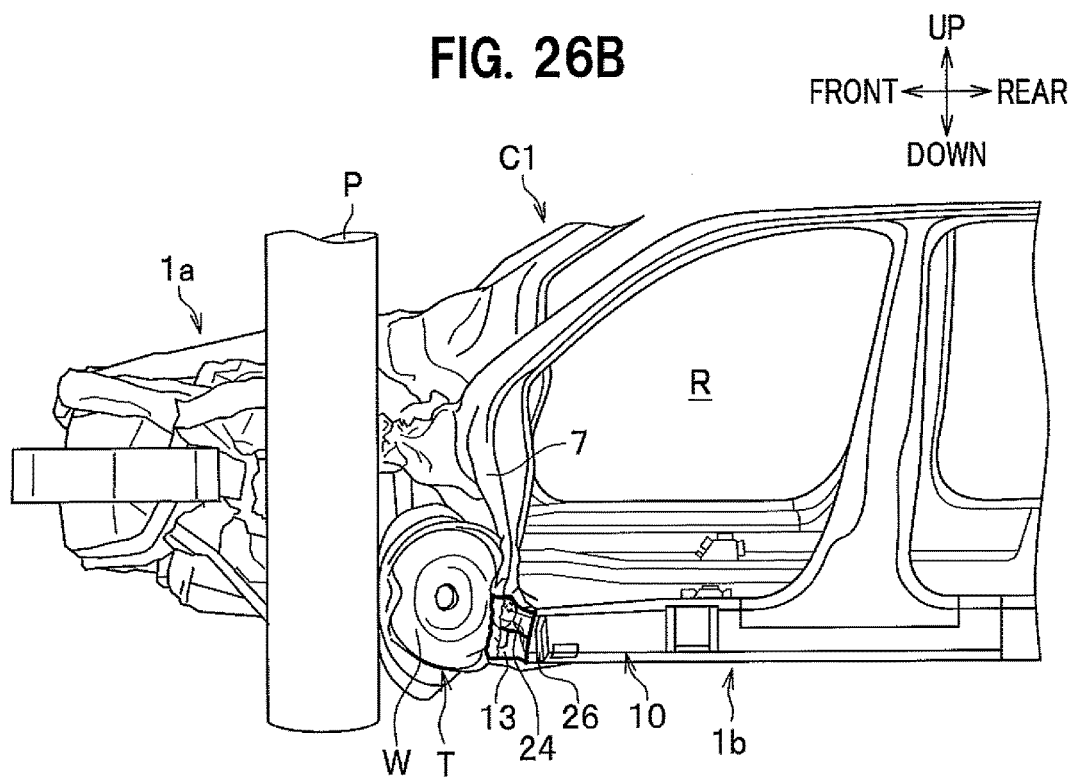
FIG. 26B is a perspective view showing the late state when the vehicle has the narrow offset collision.
Figure 27:
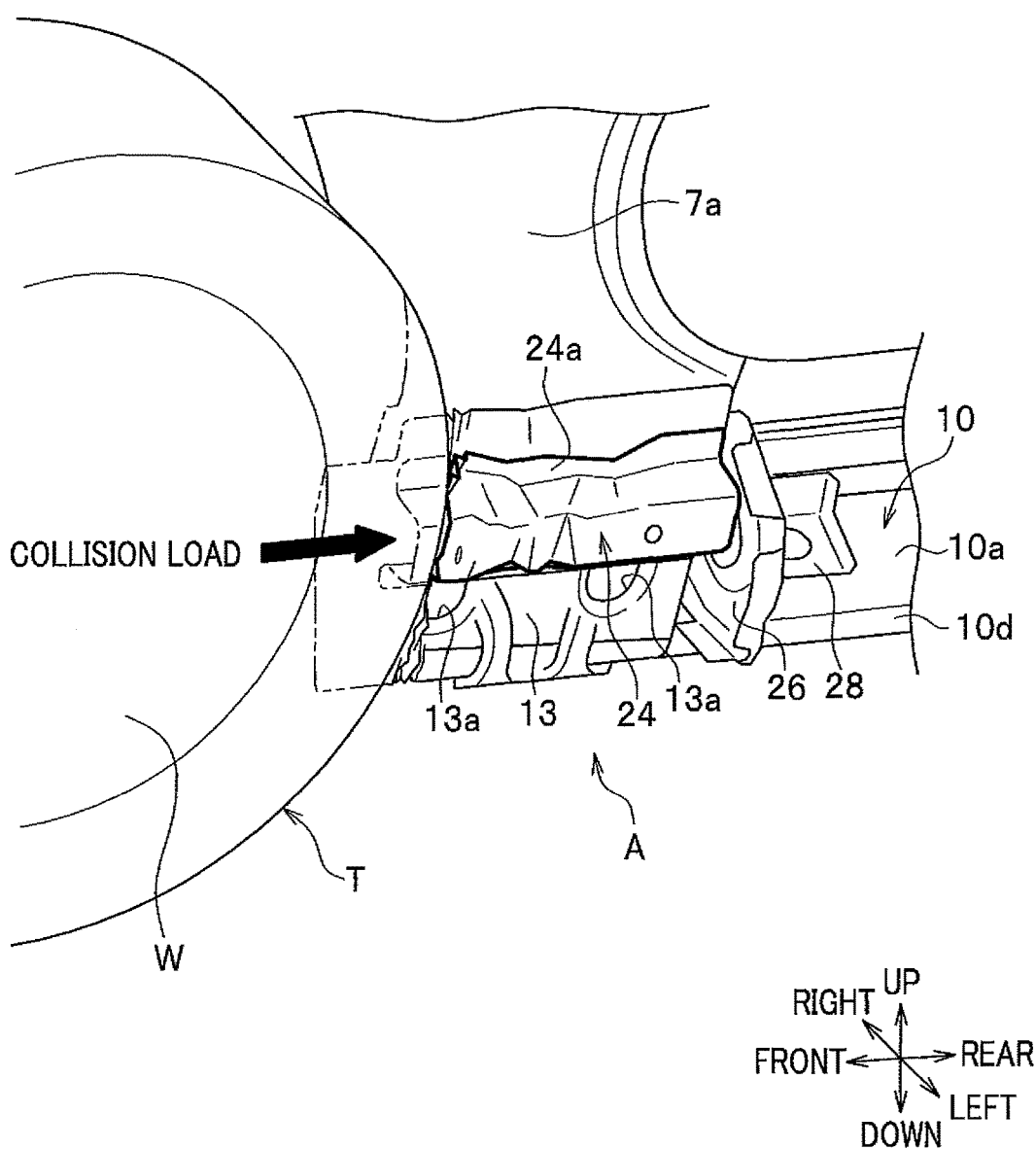
FIG. 27 is a perspective view showing a state in which a deformable member is deformed earlier than a jack-up reinforcing plate at the time of the narrow offset collision, in the vehicle applied with the vehicle body bottom structure according to the present embodiment.

FIG. 26A is a perspective view showing the initial state when the vehicle applied with the vehicle body bottom structure according to the present embodiment has the narrow offset collision with the utility pole, FIG. 26B is a perspective view showing the late state when the vehicle has the narrow offset collision, and FIG. 27 is a perspective view showing a state in which a deformable member is deformed earlier than a jack-up reinforcing plate at the time of the narrow offset collision, in the vehicle applied with the vehicle body bottom structure according to the present embodiment.

As shown in FIGS. 26A and 26B, when the vehicle C1 according to the present embodiment has the narrow offset collision, for example, with a utility pole P which is the collision object, the collision load is transmitted to the left end portion of the front bulkhead 2 on the vehicle body front left side and the outside of the front side frame 3, and the front wheel house upper member 5, the front wheel T, the front pillar 7, the front end portion 10c of the side sill 10, and the jack-up reinforcing plate 13 are pushed toward the rear of the vehicle to be crushed by the utility pole P which is in contact with the vehicle C1. In particular, the utility pole P pushes the wheel W of the front wheel T in front of the side sill 10, and then the wheel W pushes the front end portion 10c of the side sill 10 toward the rear side.

In the present embodiment, when the wheel W of the front wheel T pushes the jack-up reinforcing plate 13 provided on the front end portion 10c of the side sill 10, the deformable member 24 is deformed to be bent at first by a pushing force by the rear end surface of the front wheel T, because the deformable member 24 is disposed to extend in the front-rear direction at substantially the same height as the center O (see FIG. 23) of the front wheel T (see FIG. 27). Then, the jack-up reinforcing plate 13 is deformed by the rear surface of the front wheel T except for the rear end surface of the front wheel T (see FIG. 26B). As a result, in the present embodiment, it is possible to restrict deformation of the rear portion of the crushing area A, while increasing the absorption amount of the energy at the time of the narrow offset collision compared to the prior art.

In other words, in the present embodiment, at the narrow offset collision, when the collision load is applied to the jack-up reinforcing plate 13 provided in the crushing area A, as shown in FIG. 27, the collision load is applied to the deformable member 24 before the jack-up reinforcing plate 13, and the collision load can be absorbed by the deformable member 24, which has the closed cross-section 34 and extends in the same direction as the collision load is applied. Therefore, in the present embodiment, it is possible to further increase the absorption amount of the energy at the time of the narrow offset collision by an amount of the collision load absorbed by the deformable member 24 compared to the prior art, and also to restrict deformation of a zone behind the crushing area A.

Further, at a site in the vicinity of the front end portion 10c of the side sill 10, the crushing area A is formed to improve absorption performance for the collision load, and the bulkhead 26 and the side sill reinforcing bracket 28 are provided inside a zone behind the crushing area A to improve the strength and the rigidity. Furthermore, the vehicle compartment side of the installation site of the bulkhead 26 is supported by the reinforcing frame 12, so that the side sill 10 is restricted from bending toward the vehicle compartment side. Therefore, in the side sill 10, the strengths of the connecting portion of the reinforcing frame 12 and the installation site of the bulkhead 26 are set stronger than that of the crushing area A in front of them.

As a result, the side sill 10 absorbs the collision load by being locally crushed due to the collision load in the crushing area A of the front end portion 10c in front of the installation site of the bulkhead 26, and thus it is possible to appropriately restrict deformation of the rear side of the installation site of the bulkhead 26.

Note that, even if each crushing area A of the front end portions 10c of the side sills 10, 10 is locally crushed by the collision load, since the dash cross member 16 is connected to both the side sill inners 10a, 10a of the front portions 10c of the side sills 10, 10, it is possible to reduce the ingression amount of the front wheel T to the vehicle interior side at the time of the narrow offset collision.

Furthermore, since the strength of the installation site of the bulkhead 26 is strong, and the reinforcing frame 12 is connected from the installation site toward the obliquely rearward, the collision load which is applied to the front end portion 10c of the side sill 10 is transmitted to be dispersed to the side sill 10 and the reinforcing frame 12, and the collision load dispersed to the reinforcing frame 12 side is transmitted to the floor frame 17. In other words, the collision load which is applied to the front end portion 10c of the side sill 10 is received by the installation position of the bulkhead 26 in the side sill 10, and thus it is possible to prevent the side sill 10 from bending.

Therefore, in a door opening portion over the side sill 10 behind the crushing area A, since the side sill 10 is not bent, a front side door (not shown) is restricted from being difficult to open, and the shape of the door opening portion is maintained, and thus it is in a state capable of opening and closing the door even after the narrow offset collision. Further, although the side sill 10 is deformed by the collision load in the crushing area A of the front end portion 10c, it is possible to restrict the shape of the door opening portion from being deformed, because the side sill 10 has a structure which is difficult to be deformed at the rear site of the installation position of the bulkhead 26 in the front end portion 10c.

Furthermore, since the reinforcing frame 12 is connected to the side sill 10 at one end thereof and connected to the floor frame 17 at the other end thereof to be bridged therebetween, it is possible to firmly hold the floor surface of the vehicle compartment R.

From the above, with a vehicle body bottom structure according to the present embodiment, at the time of the narrow offset collision, it is possible to facilitate the deformation of the front portion 10c of the side sill 10 to improve absorption performance for the collision load, and is possible to avoid influencing the opening and closing of the door and the shape of the vehicle compartment R, by a further improvement of absorption performance for the collision load with use of the crushing area A of the front end portion 10c of the side sill 10, by an improvement of strength of a zone behind the crushing area A with use of the bulkhead 26, and by prevention of inclination of the side sill 10 with use of the reinforcing frame 12 which supports the vehicle compartment side of the installation site of the bulkhead 26, and the dash cross member 16 which supports the side sill inner 10a of the front end portion 10c to restrict the ingression of the front wheel T to the vehicle interior side.

<Fourth Embodiment>

Next, a fourth embodiment of the present invention will be described in detail with reference to the accompanying drawings appropriately. Note that, "front and rear" and "up and down" indicated by arrows in each FIG. respectively indicate the vehicle front-rear direction and the vehicle up-down direction, and "left and right" indicates the left-right direction (vehicle width direction) viewed from the driver's seat. Note that, since a gusset 30 has the same structure as the first embodiment, a detailed description thereof will be omitted.

Figure 28:
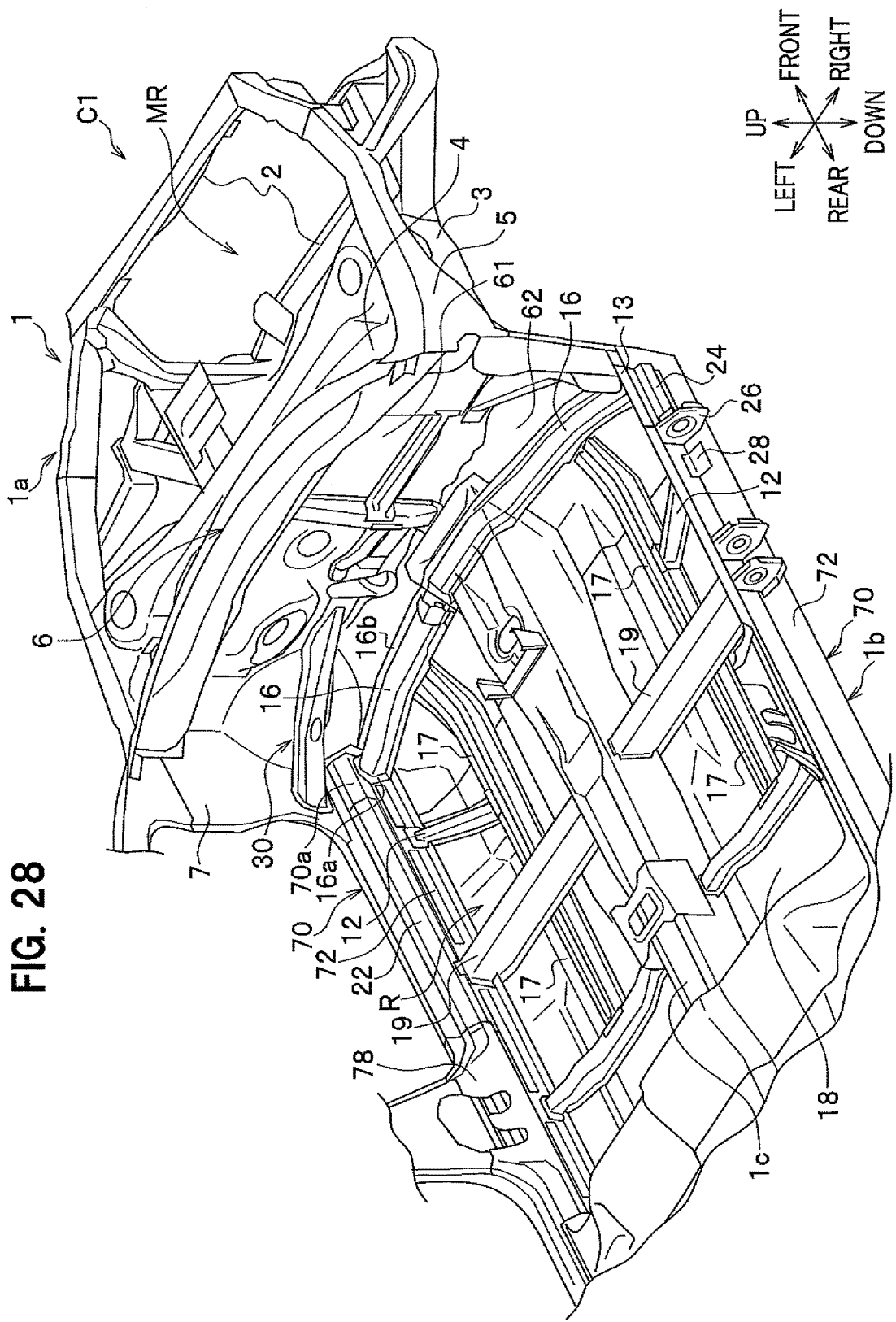
FIG. 28 is a perspective view of a vehicle body front portion applied with a vehicle body bottom structure according to an embodiment of the present invention.

As shown in FIG. 28, a vehicle C1 is made of an automobile, which includes a power mounted room MR disposed in a vehicle body front portion 1a, and a vehicle compartment R disposed to be separated by a partition wall 6 from the power mounted room MR. The automobile includes an automobile such as a FR (Front engine Rear drive) type, a FF (Front engine Front drive) type, and a four wheel drive type.

Incidentally, as for the vehicle C1 which is applied with the present invention, it is sufficient to have a pair of left and right side sills 70 disposed on the left and right outsides of a vehicle body 1. Hereinafter, a case in which the vehicle body bottom structure according to the present embodiment is applied to the FR type automobile will be described as an example.

As shown in FIG. 28, the vehicle body 1 is for forming the entire vehicle C1, and mainly includes, for example, a variety of metallic vehicle body frames such as a side sill 70, the floor frame 17, and a front side frame 3, metallic vehicle body panels (not shown) such as an engine hood and a fender panel, and a bumper face made of resin or metal.

The vehicle body front portion 1a and a vehicle body bottom portion 1b of the vehicle body 1 respectively includes components such as a front bulkhead 2, a bumper beam (not shown), the front side frame 3, a windshield lower 4, a front wheel house upper member 5, the partition wall 6, a front pillar 7, the side sill 70, a reinforcing frame 12, the floor frame 17, a jack-up reinforcing plate 13, a dash cross member 16, and the like, which will be described later. The components are provided to extend in a vehicle front-rear direction in a left-right pair, or are laterally disposed to be substantially bilaterally symmetrical. Since the vehicle body bottom portion 1b is arranged to be substantially bilaterally symmetrical in this manner, hereinafter, the left side part of the vehicle body 1 will be mainly described, and the description of the right side part of the vehicle body 1 will be omitted.

The power mounted room MR which is an engine room is, for example, a housing space, in which a power unit (not shown) composed of an electric motor, an engine, a transmission, and the like is disposed, and is defined by panel members and frames which are arranged in a periphery of the housing space. In the power mounted room MR, the front bulkhead 2, the bumper beam (not shown), and the like are disposed on the front side, and the partition wall 6 is disposed on the rear side. Further, on the left and right upper sides of the power mounted room MR, the front wheel house upper members 5, the front pillars 7, and the like are disposed. On the left and right lower sides of the power mounted room MR, a pair of front side frames 3 extending in the front-rear direction of the vehicle body 1 is disposed.

As shown in FIG. 28, the front bulkhead 2 is a frame member made of a frame body having a substantially rectangular shape so as to surround a radiator (not shown) in a vehicle body front portion of the power mounted room MR, and the whole is disposed in the vehicle width direction.

As shown in FIG. 28, the front side frame 3 is a pair of left and right frame members, which is disposed in the vehicle body front portion 1a and extends in the front-rear direction of the vehicle body 1, and is, for example, composed of a steel rectangular pipe material or the like of a cross-sectional rectangular shape (rectangular tube shape) having a rigidity up to a rear end from a front end thereof. To the front end of the front side frame 3, the bumper beam is connected via a bumper beam extension which is not shown. The floor frame 17 is provided consecutively to a rear end portion of the front side frame 3 and extends toward the rear, and the partition wall 6 is bridged between the front side frames 3, 3.

The windshield lower 4 is a steel member, which is secured to an upper end portion of the dash lower 62 to be described later, and extends forward from the upper end portion to support a windshield (not shown) by a cantilever structure, and further extends in the vehicle width direction.

The front wheel house upper member 5 is a frame member disposed in the vehicle front-rear direction on the upper side of the vehicle body side portion of the power mounted room MR. The front wheel house upper member 5 is connected to a head upper side of the front bulkhead 2 at a front end thereof, and is connected to the front pillar 7 at a rear end thereof.

As shown in FIG. 28, the partition wall 6 is a partition member for partitioning the vehicle compartment R and the power mounted room MR, and is, for example, composed of a dash upper 61 made of a steel plate or the like, a dash lower 62 which is joined to the front end portion 70*a* of the side sills 70 at left and right end portions thereof, a dash cross member 16 made of a frame member, a reinforcing frame for reinforcement, and the like.

The front pillars 7 are frame members, which are provided to extend from front end portions 70*a* of the side sills 70 disposed in the vehicle body bottom portion 1*b* up to left and right side portions of a windshield (not shown) over the front end portions 70*a*.

Figure 30:
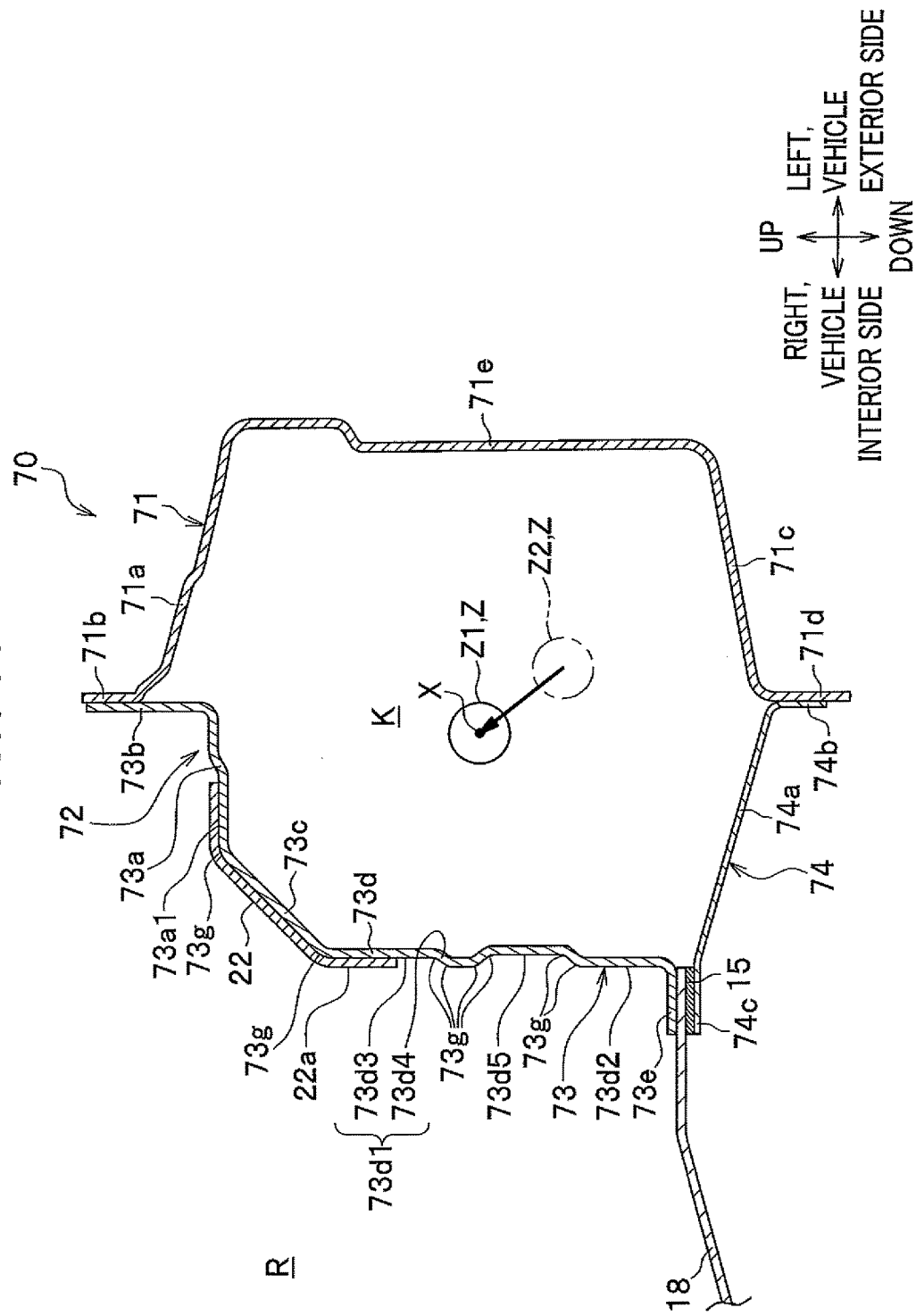
FIG. 30 is a cross-sectional view taken along a line XXX-XXX in FIG. 29.
Figure 31:
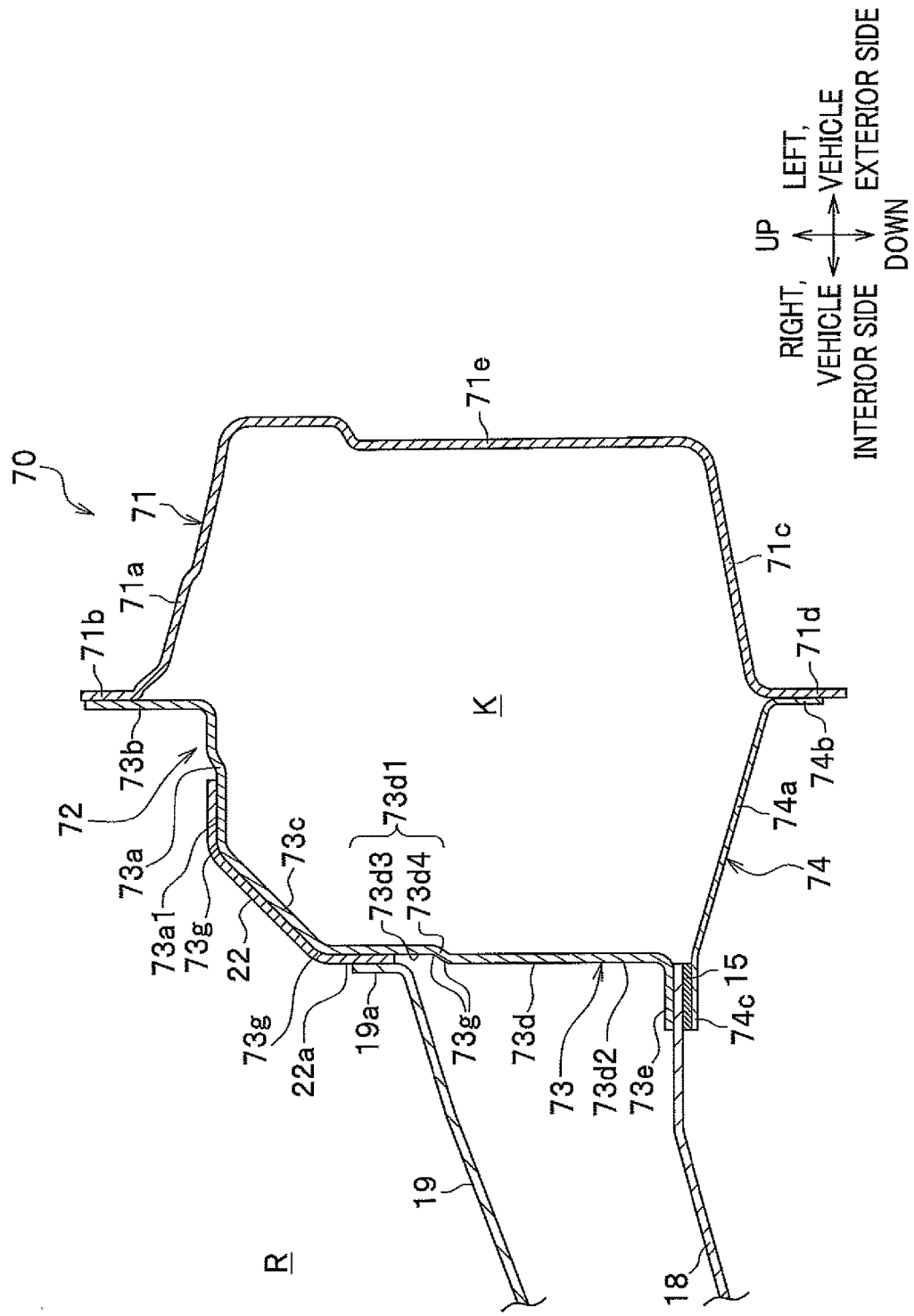
FIG. 31 is a cross-sectional view taken along a line XXXI-XXXI in FIG. 29.

As shown in FIG. 28, the side sill 70 is a hollow frame member, which is provided to extend in the vehicle front-rear direction along an outside end portion in the vehicle width direction of the floor panel 18 of the vehicle body 1 from a lower end portion of the front pillar 7, and made of a metal plate of a substantially rectangular shape in a vertical cross-sectional view. As shown in FIGS. 30 and 31, in the side sill 70, a side sill outer 71, which is disposed on the vehicle exterior side and has a substantially U-shape in a vertical cross-sectional view, and a side sill inner 72, which is disposed on the vehicle interior side and has a substantially U-shape in a vertical cross-sectional view, are joined to each other so as to form a closed cross-section K.

As shown in FIG. 30, the side sill outer 71 is a member made of a high-strength steel plate which is formed by bending a plurality of portions thereof. The side sill outer 71 is composed of an upper wall portion 71*a*, an upper flange portion 71*b*, a lower wall portion 71*c*, a lower flange portion 71*d*, and a vertical wall portion 71*e*.

The upper wall portion 71*a* is a portion which has a predetermined width in the vehicle width direction and is inclined downwardly and toward the outside in the vehicle width direction. The upper flange portion 71*b* is a vertical portion which is formed to extend upwardly from an inside in the vehicle width direction of the upper wall portion 71*a*.

The lower wall portion 71*c* is a substantially horizontal portion which has a predetermined width in the vehicle width direction and is gradually inclined upwardly and toward the outside in the vehicle width direction. The upper wall portion 71*c* is provided under the upper wall portion 71*a* and spaced apart from the upper wall portion 71*a* by a predetermined distance. The lower flange portion 71*d* is a vertical portion which is formed to extend downwardly from an inside in the vehicle width direction of the lower wall portion 71*c*.

The vertical wall portion 71*e* is a substantially vertical portion which connects the outsides in the vehicle width direction of the upper wall portion 71*a* and the lower wall portion 71*c* to each other and has a predetermined length.

As shown in FIG. 30, the side sill inner 72 is a member made of a steel plate which is formed by bending a plurality of portions thereof. The side sill inner 72 is configured to be divided into two of an upper member 73 disposed on the upper side and a lower member 74 disposed on the lower side.

Figure 29:
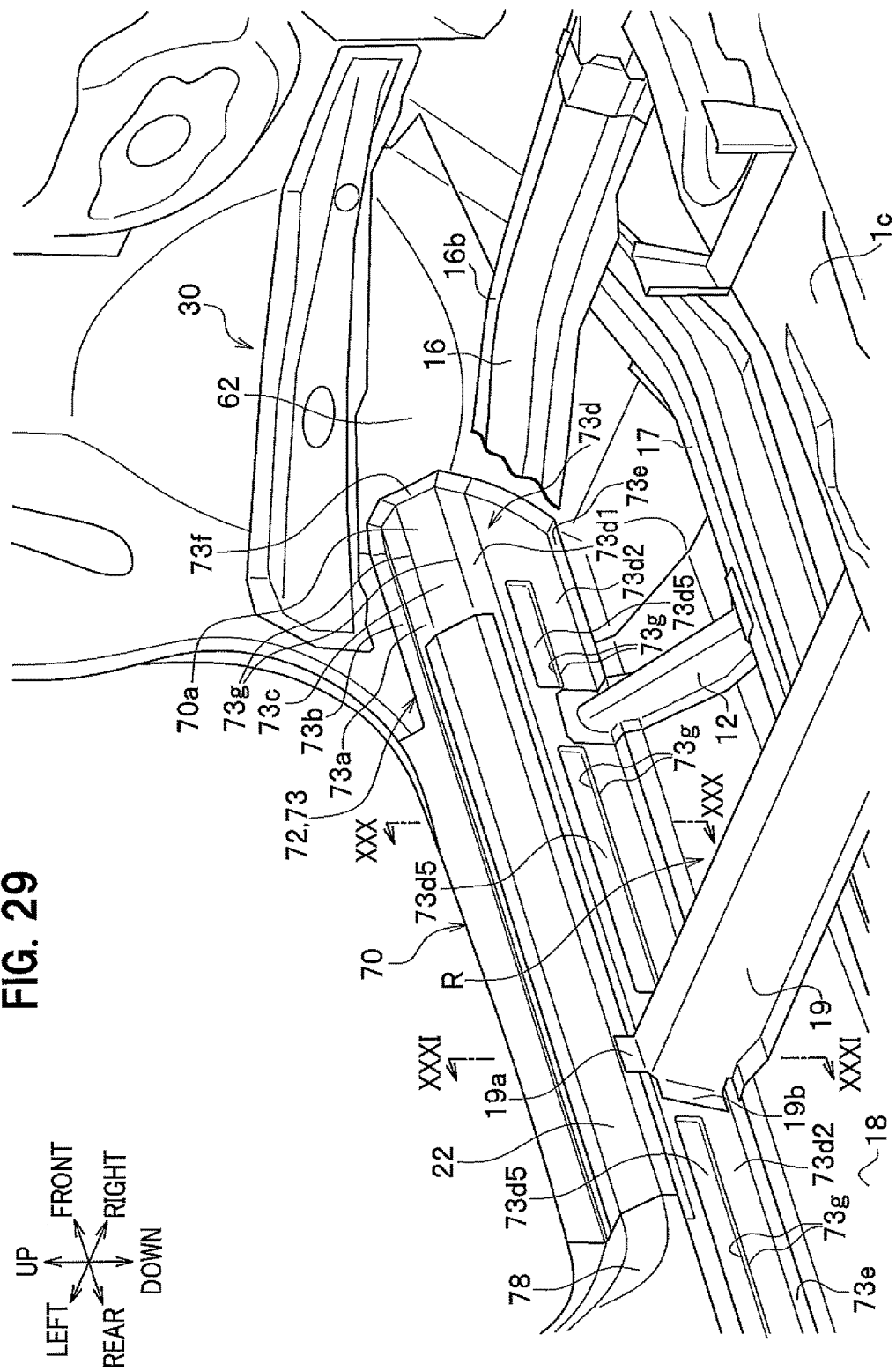
FIG. 29 is a partially enlarged perspective view including a left side sill of the vehicle body front portion shown in FIG. 28.

The upper member 73 is a member which is formed at a height substantially equal to a height of the side sill outer 71 (specifically, at a height equal to a height from the upper end of the upper flange portion 71*b* to a vicinity of a boundary between the lower wall portion 71*c* and the vertical wall portion 71*e*), and is composed of a upper wall portion 73*a*, an outer flange portion 73*b*, an inclined wall portion 73*c*, a vertical wall portion 73*d*, an inner flange portion 73*e*, and a front flange portion 73*f* (see FIG. 29).

The upper wall portion 73*a*, which is an inner wall portion, is a portion which has a predetermined width in the vehicle width direction and is formed stepwise so as to be lower toward an inside thereof in the vehicle width direction. In the present embodiment, the upper wall portion 73*a* is disposed at a position lower than the upper wall portion 71*a* of the side sill outer 71. Hereby, a space for placing a harness can be ensured over the upper wall portion 73*a*. On the inclined wall portion 73*c* side of the upper wall portion 73*a*, a horizontal surface 73*a*1 parallel to the vehicle width direction is formed.

The outer flange portion 73*b* is a vertical portion which is formed to extend upwardly from the outside in the vehicle width direction of the upper wall portion 73*a*. In the present embodiment, the outer flange portion 73*b* and the upper flange portion 71*b* of the side sill outer 71 are superimposed in the vehicle width direction and are joined to each other by spot welding.

The inclined wall portion 73*c* is an inclined straight portion which extends downwardly and to the vehicle interior side from the inside in the vehicle width direction of the upper wall portion 73*a*. By providing this inclined wall portion 73*c*, it is possible to reduce a volume (an expansion volume) of the upper member 73, thereby achieving expansion of an interior space.

The vertical wall portion 73*d* is a substantially vertical portion extending downwardly from an inside in the vehicle width direction of the inclined wall portion 73*c*. As shown in FIG. 31, the vertical wall portion 73*d* includes a recessed portion 73*d*1 which is continuous with the inside in the vehicle width direction of the inclined wall portion 73*c* and extends in the up-down direction, and a flat surface portion 73*d*2 which extends downwardly from a lower end of the recessed portion 73*d*1.

The recessed portion 73*d*1 includes a bottom surface 73*d*3 which is positioned outside in the vehicle width direction of the flat surface portion 73*d*2, and a stepped portion 73*d*4 which connects an upper end of the flat surface portion 73*d*2 and a lower end of the recessed portion 73*d*3. The bottom surface 73*d*3 is formed in a vertical plane in the up-down direction.

As shown in FIG. 29, in appropriate positions of the flat surface portion 73*d*2, a plurality of groove portions 73*d*5, 73*d*5 extending in the front-rear direction are provided. The groove portions 73*d*5 are provided with intervals from one another in the front-rear direction. Between each of the groove portions 73*d*5 out of the flat portion 73*d*2, the end portions of the reinforcing frame 12 and the floor cross member 19 are joined to. In the present embodiment, as shown in FIGS. 29 and 30, by including the inclined wall portion 73*c*, the recessed portion 73*d*1, and the groove portion 73*d*5, the upper member 73 has a plurality of ridge portions 73*g*, 73*g* in the front-rear direction. Hereby, it is possible to improve the flexural rigidity of the upper member 73 against a load at a time of a side collision and a crushing load at a time of a frontal collision.

As shown in FIG. 30, the inner flange portion 73*e* is a portion of a horizontal shape which is formed to extend inwardly in the vehicle width direction from a lower end of the vertical wall portion 73*d*. The inner flange portion 73*e* is positioned inside in the vehicle width direction with respect to the outer flange portion 73*b*.

As shown in FIG. 29, the front flange portion 73*f* is a portion which is joined by spot welding to a rear surface of the dash lower 62. The front flange portion 73f is provided to extend in directions (the up-down direction and the left-right direction) perpendicular to the front-rear direction up to the front end of the inner flange portion 73e from the front end of the outer flange portion 73b.

Further, as shown in FIG. 29, a deformation restricting member 22 extending in the front-rear direction is provided on an outer surface of the side sill inner 72 (upper member 73). As shown in FIG. 30, the deformation restricting member 22 is provided across to the bottom surface 73d3 of the recessed portion 73d1 from the horizontal surface 73a1 of the upper wall portion 73a. By providing this deformation restricting member 22, it is possible to restrict bending deformation to the vehicle interior side of a deformable member 24 to be described later. As shown in FIG. 31, a portion of the deformation restricting member 22, which is disposed on the recessed portion 73d1, includes an inside surface 22a which is positioned on the vehicle most interior side, and this inside surface 22a is set so as to be flush with the flat surface portion 73d2. As a result, when installing the floor cross member 19, the floor cross member 19 can be appropriately installed from above, while avoiding interference between the deformation restricting member 22 and a flange portion 19b (see FIG. 29) of the floor cross member 19 to be described later. Incidentally, by appropriately adjusting a recess amount of the recessed portion 73d1, the inside surface 22a may be set outside in the vehicle width direction of the flat surface portion 73d2. Besides the deformation restricting member 22, as shown in FIG. 29, a lower end of a center pillar inner 78 is joined to the outer surface of the side sill inner 72 by welding or the like.

As shown in FIG. 30, the lower member 74 is a member, which is formed thinner than a plate thickness of the upper member 73, and disposed substantially horizontally between the side sill outer 71 and the floor panel 18. The lower member 74 is composed of a main body portion 74a, an outer flange portion 74b, and an inner flange portion 74c.

The main body portion 74a is a substantially horizontal portion which is inclined gradually downwardly toward the outside in the vehicle width direction.

The outer flange portion 74b is a vertical portion which extends downward from the outside in the vehicle width direction of the main body portion 74a. In the present embodiment, the outer flange portion 74b and the lower flange portion 71d of the side sill outer 71 are superimposed in the vehicle width direction and are joined to each other by spot welding.

The inner flange portion 74c is a horizontal portion which extends to the vehicle interior side from an inside in the vehicle width direction of the main body 74a. In the present embodiment, the floor panel 18 is sandwiched to be vertically clamped between the inner flange portion 73e of the upper member 73 and the inner flange portion 74c of the lower member 74, and three pieces of stacked members of the upper member 73, the floor panel 18, and the lower member 74 are joined together by welding, and thus it is possible to restrict deformation of the side sill inner 72 to the vehicle interior side by increasing a proof stress against a shearing load at the time of the side collision. Incidentally, joint portions of the three members are formed horizontally. Further, between the floor panel 18 and the lower member 74, is provided a waterproof seal member 15 for filling a gap formed between the spot welding portions.

Here, a relationship between a cross-sectional center X and a neutral axis Z of the side sill 70 will be described with reference to FIG. 30. The neutral axis Z of the side sill 70 varies mainly due to a plate thickness, a cross-sectional shape, and the like of the side sill 70. For example, in a case where the side sill 70 has the cross-sectional shape of the upper wall portion 73a and the inclined wall portion 73c, and the plate thickness of the entire side sill 70 is uniform, a neutral axis Z2 (refer to a two-dot chain line in FIG. 30) of the side sill 70 does not coincide with the cross-sectional center X. Therefore, in the present embodiment, by adopting a configuration in which the side sill inner 72 is composed of two members, and the plate thicknesses of the upper member 73 and the lower member 74 are different from each other, a neutral axis Z1 of the side sill 70 is set to coincide with the cross-sectional center X. In other words, the cross-sectional shape and the plate thickness of the side sill 70 are adjusted so that the neutral axis Z1 of the side sill 70 coincides with the cross-sectional center X where a proof stress against a bending moment is maximized Therefore, even in a case of adopting a configuration, in which the space for placing the harness is ensured and a volume of the upper member 73 is reduced, it is possible to adjust the neutral axis Z1 of the side sill 70 to coincide with the cross-sectional center X.

As shown in FIG. 28, at the most forward position of the front end portion 70a of the side sill 70, the jack-up reinforcing plate 13 and the deformable member 24 are provided to be integrally joined together. A bulkhead 26 and a side sill reinforcing bracket 28 are provided inside the rear of the jack-up reinforcing plate 13 and the deformable member 24. The bulkhead 26 is provided so as to partition an inside of the side sill 70. The bulkhead 26 has a function of restricting cross-sectional deformation due to the collision load by supporting the side sill inner 72 from the vehicle compartment side so as to concentrate the collision load on the jack-up reinforcing plate 13 and the deformable member 24, as well as transmitting the collision load, which is applied to the side sill 70, to the reinforcing frame 12, so that the collision load is dispersed, at the time of the narrow offset collision.

Note that, the narrow offset collision means a collision in which a collision object such as an oncoming vehicle collides with a vehicle C1 in a state of being shifted to the right side or the left side of the front end of the vehicle C1, that is, a hard structure such as a front side frame of the collision object slightly collides with the front end portion 70a of the side sill 70 of the vehicle body 1.

The deformable member 24 having a hat-shaped longitudinal cross-section (vertical cross-section) is integrally joined to a vehicle exterior side surface of the jack-up reinforcing plate 13. The deformable member 24 is, for example, made of a bent plate which is formed by bending the vertical cross-section thereof in a substantially hat-shape, to form a closed cross-section of a constant cross-section extending in the front-rear direction.

The vehicle interior side surfaces of the side sills 70 are joined with the dash cross members 16 and the reinforcing frames 12, which are respectively arranged in the vehicle width direction, and hold the left and right end portions of the floor panel 18.

As shown in FIGS. 28 and 29, the reinforcing frame 12 is a reinforcing frame member for receiving the collision load by holding the vehicle interior side surface of the side sill 70, so that the side sill 70 does not deform to be inclined inwardly when the collision object has the narrow offset collision with the vehicle C1. The reinforcing frame 12 is made of a steel plate which is bent by a press or the like in a substantial hat-shape in a vertical cross-sectional view. One end side of the reinforcing frame 12 is joined to an outer surface on the vehicle interior side of an installation site where the bulkhead 26 is provided inside the side sill 70, and the reinforcing frame 12 is provided to be inclined inwardly and rearwardly in the vehicle width direction from the joint portion. The other end side of the reinforcing frame 12 is joined to the floor frame 17.

As shown in FIG. 28, the dash cross member 16 is joined to the front end of the side sill inner 72 of the side sill 70. The dash cross member 16 is a lateral bridge member which is laterally bridged in the vehicle width direction between the side sills 70, 70 on both the left and right sides, and is made of a metal thick plate such as a rigid steel plate which is open on the lower side thereof and has a substantially hat-shaped vertical cross-section.

The dash cross member 16 is formed with flange portions 16a, 16b for reinforcing and joining, respectively on the left and right end portions and the front and rear lower end portions. Specifically, the flange portions 16a, which are formed on both the left and right end portions of the dash cross member 16, are joined to inner side surfaces of the side sills 70, and the flange portions 16b, which are formed on the lower end portions of the dash cross member 16, are joined to the dash lower 62, to be provided to extend in the vehicle width direction.

The dash cross member 16 is connected to both the front ends of the side sill inners 72, 72 of a pair of side sills 70, 70, and thus it is possible to reduce an ingression amount of the front wheel to the vehicle interior side at the time of the narrow offset collision.

As shown in FIG. 28, the floor cross members 19 are provided over the floor panel 18, and are frame members made of steel plates having substantially hat-shaped vertical cross-sections, which are respectively bridged between the tunnel portion 1c and the left and right side sills 70, 70. As shown in FIG. 29, the floor cross member 19 is formed with flange portions 19a, 19b for joining on the outside in the vehicle width direction. Specifically, the flange portion 19a is formed to extend upwardly from an upper outer end of the floor cross member 19, to be joined to the deformation restricting member 22. On the other hand, the flange portions 19b are formed to extend forwardly and rearwardly respectively from the front and rear outer ends of the floor cross member 19 (a rearward flange portion 19b only is shown in FIG. 29), and are joined to the flat surface portion 73d2 of the side sill inner 72. As shown in FIG. 28, on a bottom surface of a substantially middle portion in the vehicle width direction of each floor cross member 19, each floor frame 17 is disposed to be perpendicular to the corresponding floor cross member 19.

The floor frames 17 are frame members having substantially hat-shaped vertical cross-sections which hold the floor panel 18 of the vehicle body floor, and are respectively joined to the same positions on both top and bottom floor surfaces of the floor panel 18. The floor frames 17 are connected to rear portions of the front side frames 3 at the front ends thereof, and connected to bottom surfaces of the floor cross members 19 and vehicle interior side joint portions of the reinforcing frames 12 at vehicle body center sides thereof, and are bent outwardly at the rear ends thereof, to be joined to the vehicle interior side surfaces of the left and right side sills 70 at vehicle body outsides thereof.

As shown in FIG. 28, the floor panel 18 is a metal plate member for forming the floor surface of the vehicle compartment R, and is bridged between the tunnel portion 1c and the side sill 70.

The vehicle C1, which is applied with the vehicle body bottom structure according to the present embodiment, is basically constructed as described above, and its operation and effects will be described in the following.

According to the present embodiment, the side sill inner 72 is configured to be vertically divided into two of the upper member 73 and the lower member 74, and the lower member 74 is disposed substantially horizontally between the floor panel 18 and the side sill outer 71, and thus it is possible to form the upper member 73 at substantially the same height as the height of the side sill outer 71, thereby forming a plurality of ridge portions 73g, 73g in the front-rear direction in the upper member 73. Thus, it is possible to improve a flexural rigidity (bending proof stress) of the upper member 73 against the load at the time of the side collision, and the crushing load at the time of the frontal collision. Further, according to the present embodiment, the lower member 74 is disposed substantially horizontally between the floor panel 18 and the side sill outer 71 made of a high-strength steel plate, and thus it is possible to transmit the load at the time of the side collision to the floor panel 18 without releasing the load, thereby improving the flexural rigidity of the lower member 74 against the load at the time of the side collision. Therefore, according to the present embodiment, compared to the prior art (for example, the invention in Patent Document 1), it is possible to improve the crushing load and the flexural rigidity of the side sill inner 72.

Further, according to the present embodiment, by including the above configuration, it is possible to improve the crushing load and the flexural rigidity of the side sill inner 72, and thus it is possible to minimize the plate thicknesses of the upper member 73 and the lower member 74, and also to omit the reinforcing member which has been disposed inside the side sill in the prior art, thereby achieving weight reduction of the vehicle body 1.

Further, according to the present embodiment, the side portion in the vehicle width direction of the floor panel 18 is sandwiched to be vertically clamped between the upper member 73 and the lower member 74, and the three pieces of stacked members of the upper member 73, the floor panel 18, and the lower member 74 are joined together by spot welding, and thus it is possible to increase a coupling strength between the floor panel 18 and the side sill inner 72, thereby improving toughness against a spot peeling at the time of the side collision. That is, it is possible to restrict deformation of the side sill inner 72 to the vehicle interior side by increasing the proof stress against the shearing load at the time of the side collision.

Further, according to the present embodiment, the sites, which are joined by spot welding to one another, of the floor panel 18, the upper member 73, and the lower member 74, are formed in a horizontal shape, and thus such three members are vertically stacked, to be joined to one another by spot welding. Therefore, it is possible to set a welding direction (stacking direction of the three members) of spot welding and a load input direction at the time of the side collision so as to be substantially perpendicular to each other. Thus, at the time of the side collision, even if the load in the shearing direction is applied to the spot welding portion, the spot welding portion is hard to be peeled off, and it is possible to improve toughness against the spot peeling at the time of the side collision. That is, it is possible to restrict deformation of the side sill inner 72 to the vehicle interior side by increasing the proof stress against the shearing load at the time of the side collision.

Further, according to the present embodiment, the side sill inner 72 is provided with the deformation restricting member 22 which extends in the front-rear direction, and thus the rigidity of the side sill inner 72 against the load at the time of the side collision is increased. Therefore, it is possible to restrict deformation to the vehicle interior side of the side sill 72, thereby restricting deformation of the floor panel 18.

Further, according to the present embodiment, since the upper member 73 is joined by spot welding to the rear surface of the dash lower 62 via the front flange portion 73f, it is possible to increase joint strength between the upper member 73 and the dash lower 62. Further, it is possible to support the front wheel which retracts at the time of the narrow offset collision by the side sill 70 having the closed cross-section K, thereby restricting deformation of the floor panel 18.

Further, according to the present embodiment, since the upper wall portion 73a of the upper member 73 is disposed at the position lower than the upper wall portion 71a of the side sill outer 71, it is possible to ensure the space for placing the harness above the upper wall portion 73a.

Further, according to the present embodiment, since the upper member 73 has the inclined wall portion 73c which extends downwardly and to the vehicle interior side from the inside in the vehicle width direction of the upper wall portion 73a, it is possible to reduce the volume of the upper member 73, thereby achieving expansion of an interior space.

Further, according to the present embodiment, by adopting a configuration, in which the side sill inner 72 is composed of two members and the plate thicknesses of the upper member 73 and the lower member 74 are different from each other, even in a case of including a configuration, in which the space for placing the harness is ensured and the volume of the upper member 73 is reduced, it is possible to adjust the neutral axis Z1 of the side sill 70 to coincide with the cross-sectional center X.

Figure 32:
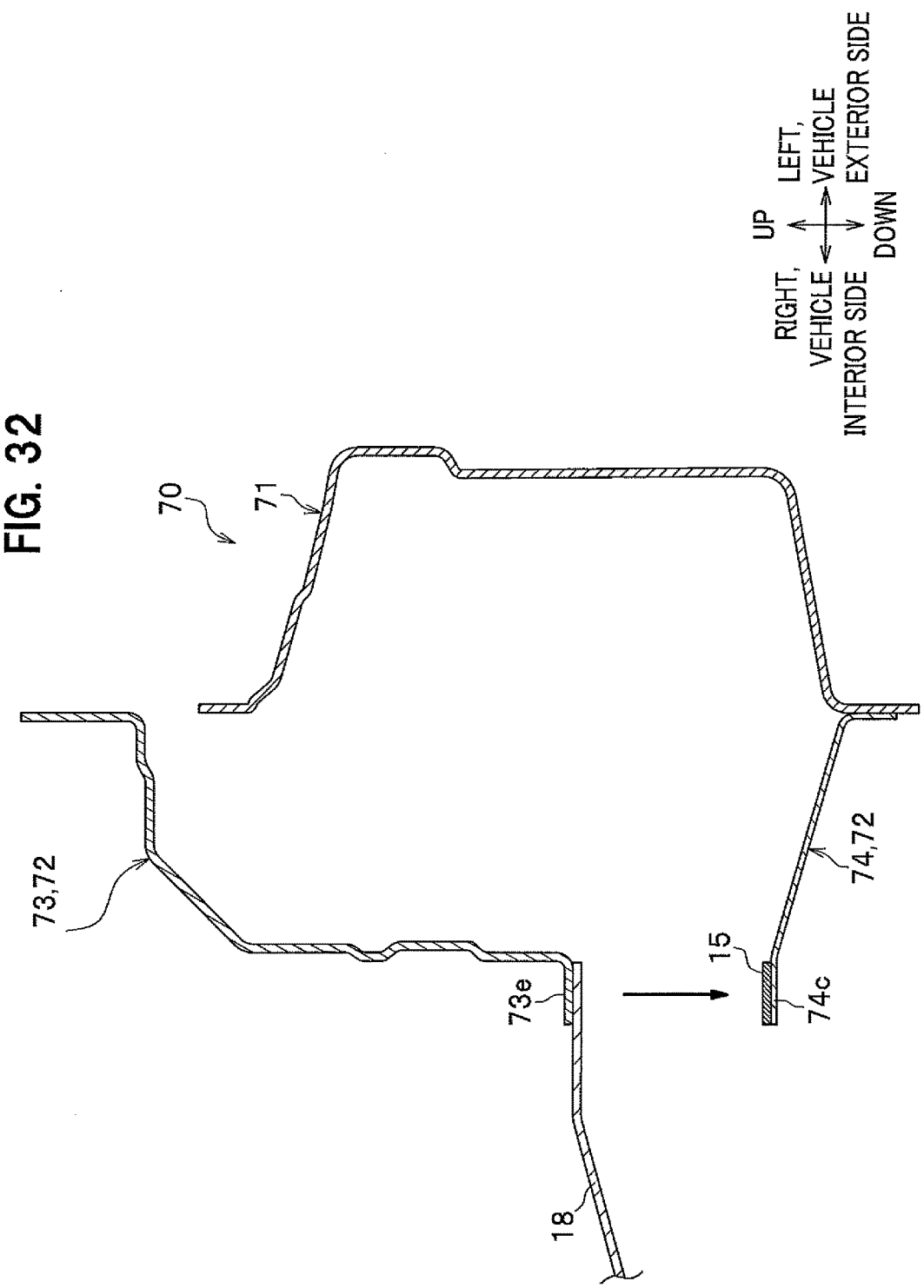
FIG. 32 is a cross-sectional view showing an assembly process of a lower member and a floor panel.
Figure 33:
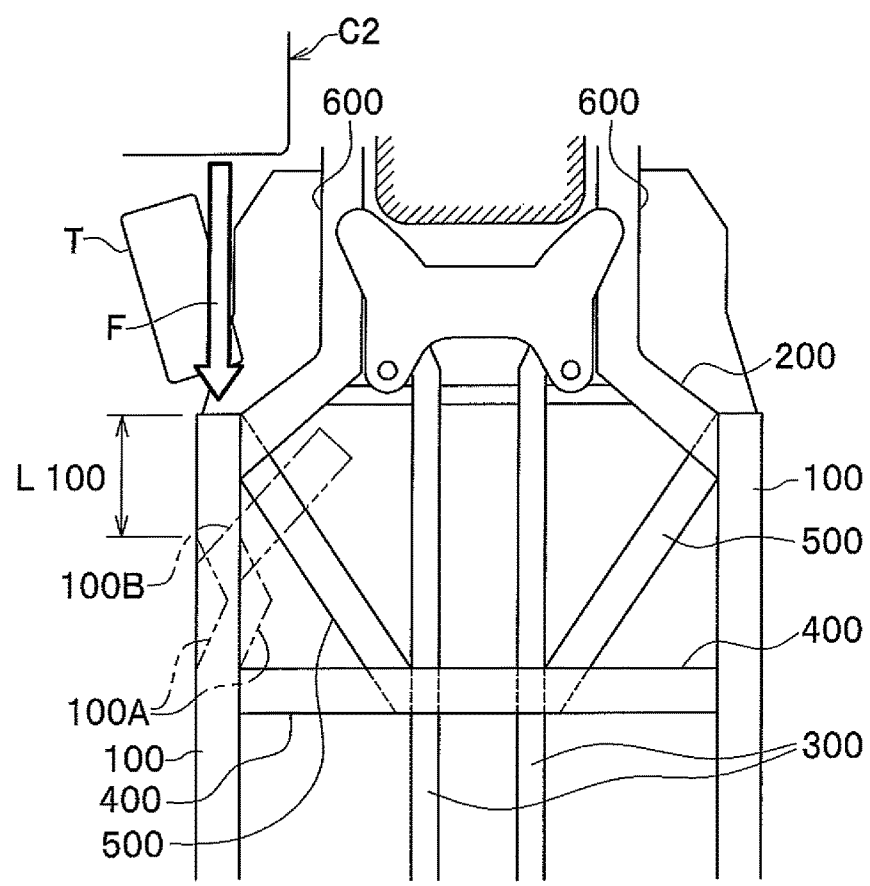
FIG. 33 is a schematic plan view of a vehicle body, showing a state in which a collision load is applied at a time of a narrow offset collision of a vehicle described in Patent Document 1.
Figure 34:
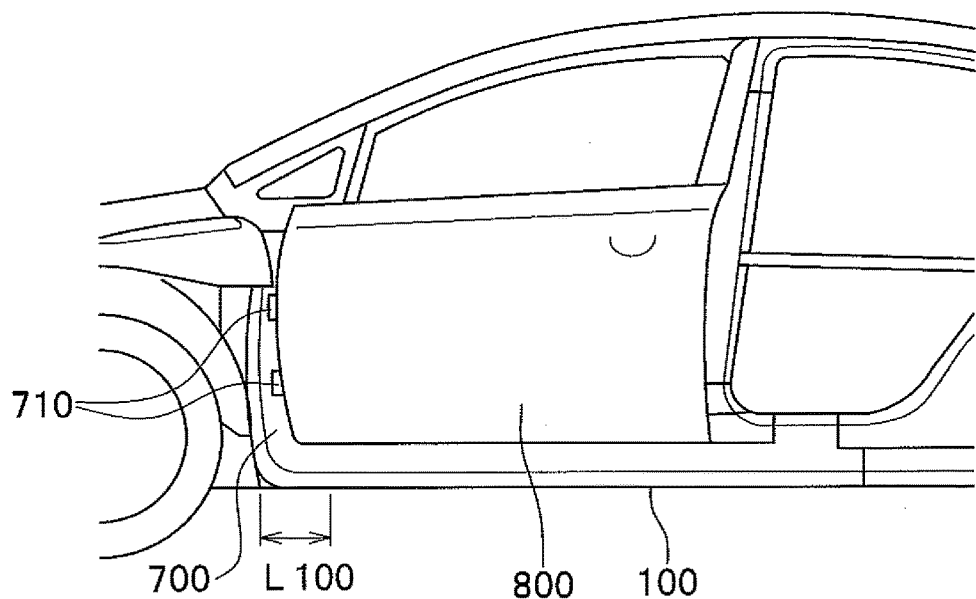
FIG. 34 is a main part left side view of the vehicle body, showing a state of a door at the time of the narrow offset collision of the vehicle described in Patent Document 1.

Further, according to the present embodiment, as shown in FIG. 32, after applying the seal member 15 to the lower member 14 and temporarily joining the upper member 73 with the floor panel 18, the floor panel 18 can be placed from above on the inner flange portion 74c of the lower member 74. Thus, it is possible to reduce abrasion of the seal member 15 by preventing the seal member 15 and the side sill inner 72 from rubbing each other, thereby preventing the sealing failure. Incidentally, the seal member 15 may be applied to the floor panel 18 side.

Further, according to the present embodiment, the portion of the deformation restricting member 22, which is disposed on the recessed portion 73d1, includes the inside surface 22a which is positioned on the vehicle most interior side, and this inside surface 22a is set so as to be flush with the flat surface portion 73d2. Therefore, even in a case of providing the deformation restricting member 22, the floor cross member 19 can be appropriately installed from above, while avoiding interference between the deformation restricting member 22 and the floor cross member 19 (flange portion 19b).

Further, according to the present embodiment, since the upper member 73 has the horizontal surface 73a1 and the bottom surface 73d3 which is formed in the vertical surface, the positioning of the deformation restricting member 22 with respect to the upper member 73 can be facilitated.

Further, according to the present embodiment, since the floor panel 18 is placed on the horizontal inner flange portion 74c of the lower member 74 from above, the positioning of the floor panel 18 with respect to the lower member 74 can be facilitated.

Further, according to the present embodiment, by joining the center pillar inner 78 to the upper member 73, it is possible to integrally connect the floor panel 18, the upper member 73, and the center pillar inner 78 and then to assemble them to the lower member, thereby performing installation work of the floor panel 18 and the like simply and in a short time.

Hereinabove, the embodiments of the present invention has been described in detail with reference to the drawings, however, the present invention is not limited thereto, and can be appropriately modified in a scope of not departing from the spirit of the invention.

The side sill 70 of the present embodiment is made of a steel member, however, the present invention is not limited thereto, and may be, for example, formed by press molding of other metal plate material such as an aluminum plate.

The upper member 73 of the present embodiment has the plurality of ridge portions 73g, 73g by including the inclined wall portion 73c, the recessed portion 73d1, and the groove portion 73d5, however, the present invention is not limited thereto, and may be, for example, configured to have the plurality of ridge portions 73g, 73g by other methods such as projecting portions (beads).

The upper member 73 and the lower member 74 of the present embodiment are formed of the same materials and different plate thicknesses from each other, however, the present invention is not limited thereto, and may be, for example, formed of the same plate thicknesses and different materials from each other, and further may be formed of different plate thicknesses and materials from each other.

In the present embodiment, the sites, which are joined by spot welding to one another, of the floor panel 18, the upper member 73, and the lower member 74, are formed in a horizontal shape, however, the present invention is not limited thereto, and may be formed in a substantially horizontal shape by being gradually inclined.

REFERENCE SIGNS LIST

1: Vehicle body
1b: vehicle body bottom portion
3: front side frame
6: partition wall
62: dash lower
7: front pillar
10: side sill
12: reinforcing frame
16: dash cross member
30: gusset
C1: vehicle
A: crushing area
S: crushing space
W: wheel

The invention claimed is:
1. A vehicle body bottom structure comprising:
left and right side sills which are provided to extend in a vehicle front-rear direction along outside end portions of a vehicle body in a vehicle width direction;
a dash cross member which is coupled to front ends of the left and right side sills, and extends in the vehicle width direction; and
an outrigger which is connected to a rear end of a front side frame, and coupled to each of the front ends of the left and right side sills, to extend in the vehicle width direction,
wherein a dash lower having a wheel housing portion is clamped to be joined between the dash cross member and the outrigger.

2. The vehicle body bottom structure according to claim 1, further comprising a front pillar,
wherein each of the left and right side sills includes a side sill inner and a side sill outer, and
wherein in a lower portion of the front pillar, a jack-up reinforcing plate is sandwiched between the side sill inner and the side sill outer, and the outrigger extends outwardly more than the dash cross member, to be joined to the side sill outer while sandwiching the side sill inner and the jack-up reinforcing plate therebetween.

3. The vehicle body bottom structure according to claim 1, further comprising a lateral frame, wherein the dash cross member is coupled to each of the outrigger and the lateral frame.

4. The vehicle body bottom structure according to claim 1, further comprising a floor frame, wherein the dash cross member is disposed in a position forward of overlapping portions of the floor frame and the rear end of the front side frame.

5. The vehicle body bottom structure according to claim 1, wherein an inner rear end edge of a wheel is supported by a gusset member on an upper side of the rear end edge of the wheel and the dash cross member on a lower side of the rear end edge of the wheel at a time of narrow offset collision.

6. The vehicle body bottom structure according to claim 1, wherein a vertical member connecting a cowl portion and a tunnel portion in an up-down direction is coupled to the dash lower.

7. The vehicle body bottom structure according to claim 1, wherein a reinforcing frame connecting a side sill and a floor frame is provided behind the dash cross member.

* * * * *